US010517021B2

(12) United States Patent
Feldman et al.

(10) Patent No.: US 10,517,021 B2
(45) Date of Patent: Dec. 24, 2019

(54) LONG TERM EVOLUTION-PRIMARY WIFI (LTE-PW)

(71) Applicant: Evolve Cellular Inc., Westlake Hills, TX (US)

(72) Inventors: Lowell P. Feldman, Austin, TX (US); David E. Feldman, Austin, TX (US); Alan E. Berrey, Boxborough, MA (US); Brian P. Davis, Boston, MA (US)

(73) Assignee: Evolve Cellular Inc., Westlake Hills, TX (US)

( * ) Notice: Subject to any disclaimer, the term of this patent is extended or adjusted under 35 U.S.C. 154(b) by 93 days.

(21) Appl. No.: 15/636,274

(22) Filed: Jun. 28, 2017

(65) Prior Publication Data

US 2018/0007587 A1  Jan. 4, 2018

Related U.S. Application Data

(60) Provisional application No. 62/356,951, filed on Jun. 30, 2016, provisional application No. 62/385,647, filed on Sep. 9, 2016.

(51) Int. Cl.
*H04W 4/00* (2018.01)
*H04W 36/00* (2009.01)
(Continued)

(52) U.S. Cl.
CPC ....... *H04W 36/005* (2013.01); *H04L 65/1006* (2013.01); *H04W 36/18* (2013.01)

(58) Field of Classification Search
CPC . H04L 29/06; H04L 65/1006; H04L 65/1016; H04L 65/1073; H04W 36/0011; H04W 36/005; H04W 36/08; H04W 36/14; H04W 36/18; H04W 80/04; H04W 84/12; H04W 84/18; H04W 88/06; H04W 88/08
See application file for complete search history.

(56) References Cited

U.S. PATENT DOCUMENTS 5,608,786 A *  3/1997  Gordon ................ G06Q 10/107
                                                    358/402
6,574,216 B1 *  6/2003  Farris .................. H04L 41/5009
                                                    370/237

(Continued)

*Primary Examiner* — Frank Duong
(74) *Attorney, Agent, or Firm* — Tully Rinckey PLLC; Steven M. Hoffberg

(57) ABSTRACT

A system and method of communication, comprising establishing a first connection between the user equipment and a first non-public packet switched network which assigns a first non-public packet switched network address to user equipment; establishing an open signaling channel which communicates between the user equipment and a remote server through a cellular telephone network according to a public switched telephone network address associated with an International mobile subscriber identity; communicating an identification of the first non-public network and the first non-public packet switched network address over the open signaling channel to the remote server; and establishing a real time voice communication from the remote server to the user equipment through the first connection based on a call routed through the remote server to the public switched telephone network address.

19 Claims, 15 Drawing Sheets

(51) Int. Cl.
*H04L 29/06* (2006.01)
*H04W 36/18* (2009.01)

(56) References Cited

U.S. PATENT DOCUMENTS

| | | | |
|---|---|---|---|
| 7,187,923 B2 * | 3/2007 | Mousseau | H04W 36/0066 |
| | | | 455/416 |
| 7,356,001 B1 * | 4/2008 | Jones | H04W 84/02 |
| | | | 370/331 |
| 7,440,472 B2 | 10/2008 | Delaney et al. | |
| 7,471,655 B2 * | 12/2008 | Gallagher | H04W 16/16 |
| | | | 370/329 |
| 7,492,266 B2 | 2/2009 | Bhavani | |
| 7,738,488 B2 | 6/2010 | Marsico et al. | |
| 7,945,477 B2 | 5/2011 | Werbitt | |
| 7,995,728 B1 | 8/2011 | Martin et al. | |
| 8,005,114 B2 | 8/2011 | Mishra et al. | |
| 8,019,289 B2 | 9/2011 | Gorbachov | |
| 8,023,931 B2 | 9/2011 | Katz et al. | |
| 8,027,335 B2 | 9/2011 | Ansari et al. | |
| 8,027,444 B1 | 9/2011 | Martin et al. | |
| 8,027,456 B1 | 9/2011 | Zhang et al. | |
| 8,050,627 B2 | 11/2011 | Makhlouf et al. | |
| 8,073,400 B2 | 12/2011 | Gorbachov | |
| 8,073,401 B2 | 12/2011 | Gorbachov | |
| 8,078,119 B2 | 12/2011 | Gorbachov | |
| 8,126,461 B2 | 2/2012 | Sengupta et al. | |
| 8,135,355 B2 | 3/2012 | Gorbachov | |
| 8,140,025 B2 | 3/2012 | Gorbachov | |
| 8,175,541 B2 | 5/2012 | Gorbachov | |
| 8,265,567 B2 | 9/2012 | Gorbachov | |
| 8,265,589 B2 | 9/2012 | Heit et al. | |
| 8,295,851 B2 | 10/2012 | Finnegan et al. | |
| 8,301,084 B2 | 10/2012 | Gorbachov | |
| 8,325,632 B2 | 12/2012 | Gorbachov | |
| 8,396,489 B2 * | 3/2013 | Platt | G06Q 10/107 |
| | | | 455/414.2 |
| 8,405,471 B2 | 3/2013 | Chang et al. | |
| 8,417,286 B2 | 4/2013 | Gorbachov et al. | |
| 8,445,826 B2 | 5/2013 | Verfuerth | |
| 8,467,738 B2 | 6/2013 | Gorbachov | |
| 8,472,462 B2 | 6/2013 | Mignot et al. | |
| 8,503,340 B1 | 8/2013 | Xu | |
| 8,559,369 B2 | 10/2013 | Barkan | |
| 8,565,793 B1 | 10/2013 | Koodli | |
| 8,601,146 B2 | 12/2013 | Pascual Avila et al. | |
| 8,611,893 B2 | 12/2013 | Rosenberg et al. | |
| 8,630,637 B2 | 1/2014 | Garg et al. | |
| 8,649,739 B2 | 2/2014 | Gorbachov | |
| 8,649,830 B1 | 2/2014 | Rao et al. | |
| 8,669,903 B2 | 3/2014 | Thill et al. | |
| 8,682,729 B2 | 3/2014 | Werbitt | |
| 8,737,318 B2 * | 5/2014 | Fan | H04M 15/00 |
| | | | 370/329 |
| 8,744,537 B1 | 6/2014 | Rao et al. | |
| 8,811,187 B1 | 8/2014 | Macias et al. | |
| 8,819,219 B2 | 8/2014 | Vandwalle et al. | |
| 8,831,694 B1 | 9/2014 | Rao et al. | |
| 8,880,047 B2 | 11/2014 | Konicek et al. | |
| 8,886,209 B2 * | 11/2014 | Shaw | H04W 36/22 |
| | | | 370/331 |
| 8,903,381 B2 | 12/2014 | Garg et al. | |
| 8,904,017 B2 | 12/2014 | Yoon et al. | |
| 8,971,898 B2 | 3/2015 | Maveddat | |
| 8,983,497 B2 | 3/2015 | Ziskind et al. | |
| 8,989,825 B1 | 3/2015 | Rao et al. | |
| 9,042,306 B2 | 5/2015 | Barkan | |
| 9,093,967 B2 | 7/2015 | Gorbachov | |
| 9,100,384 B2 | 8/2015 | Li | |
| 9,100,494 B1 | 8/2015 | Rao et al. | |
| 9,125,065 B2 | 9/2015 | Koo | |
| 9,137,171 B2 | 9/2015 | Koodli et al. | |
| 9,143,184 B2 | 9/2015 | Gorbachov et al. | |
| 9,175,967 B2 | 11/2015 | Abramson et al. | |
| 9,178,991 B2 | 11/2015 | Finnegan et al. | |
| 9,202,244 B2 | 12/2015 | Werbitt | |
| 9,204,269 B1 | 12/2015 | Cham et al. | |
| 9,210,728 B2 | 12/2015 | Koodli et al. | |
| 9,219,525 B2 | 12/2015 | Liu et al. | |
| 9,231,680 B2 | 1/2016 | Gorbachov | |
| 9,253,333 B1 | 2/2016 | Cowick | |
| 9,264,898 B2 * | 2/2016 | Schroeder | H04W 12/06 |
| 9,280,978 B2 | 3/2016 | Kim et al. | |
| 9,294,609 B2 | 3/2016 | Wassingbo et al. | |
| 9,307,449 B2 | 4/2016 | Duda | |
| 9,319,943 B2 | 4/2016 | Lee et al. | |
| 9,326,208 B2 | 4/2016 | Salkintzis | |
| 9,332,465 B2 | 5/2016 | Valliappan et al. | |
| 9,332,480 B2 | 5/2016 | Griot et al. | |
| 9,350,770 B2 | 5/2016 | Yang et al. | |
| 9,351,193 B2 * | 5/2016 | Raleigh | H04L 41/145 |
| 9,351,255 B2 | 5/2016 | Nakao | |
| 9,377,522 B2 | 6/2016 | Edge et al. | |
| 9,386,057 B2 | 7/2016 | Kent et al. | |
| 9,386,505 B2 | 7/2016 | Park et al. | |
| 9,386,615 B2 | 7/2016 | Huang | |
| 9,392,508 B2 | 7/2016 | Senarath et al. | |
| 9,398,563 B2 | 7/2016 | Zhang et al. | |
| 9,402,258 B2 | 7/2016 | Hunukumbure et al. | |
| 9,408,067 B1 | 8/2016 | Hoadley et al. | |
| 9,408,177 B2 | 8/2016 | Koodli | |
| 9,414,386 B2 | 8/2016 | Khawer et al. | |
| 9,420,089 B1 | 8/2016 | Rao et al. | |
| 9,439,197 B1 | 9/2016 | Ngo et al. | |
| 9,462,117 B2 | 10/2016 | Liang et al. | |
| 9,462,448 B2 | 10/2016 | Edge | |
| 9,467,835 B2 | 10/2016 | Hiben | |
| 9,473,981 B2 | 10/2016 | Bhushan et al. | |
| 9,479,915 B2 | 10/2016 | Gupta | |
| 9,485,109 B2 | 11/2016 | Bao et al. | |
| 9,485,753 B2 | 11/2016 | Agardh et al. | |
| 9,490,891 B2 | 11/2016 | Frerking et al. | |
| 9,491,575 B2 | 11/2016 | Edge et al. | |
| 9,491,610 B2 * | 11/2016 | Zehavi | H04W 8/02 |
| 9,500,738 B2 | 11/2016 | Edge et al. | |
| 9,503,918 B2 | 11/2016 | Han et al. | |
| 9,509,853 B2 | 11/2016 | Mufti et al. | |
| 9,510,208 B2 | 11/2016 | Wei et al. | |
| 9,510,222 B2 | 11/2016 | Yerramalli et al. | |
| 9,516,549 B1 | 12/2016 | Aksu | |
| 9,516,640 B2 | 12/2016 | Pazhyannur et al. | |
| 9,516,688 B2 | 12/2016 | Konstantinou et al. | |
| 9,520,906 B2 | 12/2016 | Butterfield et al. | |
| 9,529,761 B2 | 12/2016 | Kawai | |
| 9,531,409 B2 | 12/2016 | Butterfield et al. | |
| 9,537,642 B2 | 1/2017 | Belghoul et al. | |
| 9,538,441 B2 | 1/2017 | Meredith et al. | |
| 9,549,080 B2 | 1/2017 | Tabet et al. | |
| 9,549,360 B2 | 1/2017 | Khawer et al. | |
| 9,553,913 B2 | 1/2017 | Yang et al. | |
| 9,560,579 B2 | 1/2017 | Batta et al. | |
| 9,565,593 B2 | 2/2017 | Bhushan et al. | |
| 9,584,351 B2 | 2/2017 | Fechtel | |
| 9,585,118 B2 | 2/2017 | Garg | |
| 9,590,764 B2 | 3/2017 | Ben Ami et al. | |
| 9,591,596 B2 | 3/2017 | Seo | |
| 9,591,644 B2 | 3/2017 | Chen et al. | |
| 9,603,164 B2 | 3/2017 | Davydov et al. | |
| 9,608,678 B1 | 3/2017 | Sun et al. | |
| 9,609,568 B1 | 3/2017 | Karimli et al. | |
| 9,609,666 B2 | 3/2017 | Sun et al. | |
| 9,615,279 B2 | 4/2017 | Davydov | |
| 9,622,089 B1 | 4/2017 | Ngo et al. | |
| 9,622,133 B1 | 4/2017 | Guvenc | |
| 9,622,237 B2 | 4/2017 | Noh et al. | |
| 9,628,521 B2 | 4/2017 | Zhu et al. | |
| 9,635,636 B1 | 4/2017 | Cai et al. | |
| 9,638,537 B2 | 5/2017 | Abramson et al. | |
| 9,642,186 B1 | 5/2017 | Dureja | |
| 9,655,005 B2 | 5/2017 | Ahmavaara | |
| 9,655,048 B2 | 5/2017 | Liu et al. | |
| 9,655,064 B2 | 5/2017 | Ahn et al. | |
| 9,667,459 B1 | 5/2017 | Naim et al. | |
| 9,668,285 B2 | 5/2017 | Zhang et al. | |

(56) References Cited

U.S. PATENT DOCUMENTS

| | | |
|---|---|---|
| 9,674,704 B1 | 6/2017 | Narasimha et al. |
| 9,674,733 B2 | 6/2017 | Faccin et al. |
| 9,680,617 B2 | 6/2017 | Wei |
| 9,680,678 B2 | 6/2017 | Bashar et al. |
| 9,686,064 B2 | 6/2017 | He et al. |
| 9,686,688 B2 | 6/2017 | Hedayat et al. |
| 9,693,235 B2 | 6/2017 | Agardh et al. |
| 9,698,945 B2 | 7/2017 | Erceg et al. |
| 9,699,324 B1 | 7/2017 | Rashid et al. |
| 9,699,786 B2 | 7/2017 | Ngo et al. |
| 9,705,774 B2 | 7/2017 | Yi et al. |
| 9,706,571 B2 | 7/2017 | Gao |
| 9,706,591 B2 | 7/2017 | Panteleev et al. |
| 9,712,195 B2 | 7/2017 | Wang et al. |
| 9,713,035 B2 | 7/2017 | Bhushan et al. |
| 9,713,154 B2 | 7/2017 | Tabet et al. |
| 9,713,170 B2 | 7/2017 | Abraham et al. |
| 9,716,531 B2 | 7/2017 | Zhao et al. |
| 9,716,686 B2 | 7/2017 | Erickson et al. |
| 9,716,788 B2 * | 7/2017 | Bendi ............. H04M 3/4288 |
| 9,717,071 B2 | 7/2017 | Chen et al. |
| 9,717,098 B2 | 7/2017 | Bhushan et al. |
| 9,722,803 B1 | 8/2017 | Ellingson et al. |
| 9,723,516 B2 | 8/2017 | Bhushan et al. |
| 9,729,283 B2 | 8/2017 | Kwon et al. |
| 9,730,006 B1 | 8/2017 | Krishnamoorthy et al. |
| 9,730,105 B2 | 8/2017 | Bhushan et al. |
| 9,730,157 B2 | 8/2017 | Puranik et al. |
| 9,736,829 B2 | 8/2017 | Chen et al. |
| 9,736,845 B1 | 8/2017 | Yi et al. |
| 9,743,323 B2 | 8/2017 | Lee et al. |
| 9,743,333 B1 | 8/2017 | Wang et al. |
| 9,743,392 B2 | 8/2017 | Nimbalker et al. |
| 9,743,432 B2 | 8/2017 | Ji et al. |
| 9,749,884 B1 | 8/2017 | Cummings |
| 9,749,925 B2 | 8/2017 | Chrisikos et al. |
| 9,756,611 B2 | 9/2017 | Yavuz et al. |
| 9,763,150 B2 | 9/2017 | Lee et al. |
| 9,763,225 B2 | 9/2017 | Ji et al. |
| 9,763,267 B2 | 9/2017 | Abraham et al. |
| 9,768,936 B2 | 9/2017 | Levy |
| 9,769,836 B2 | 9/2017 | Khawer et al. |
| 9,772,196 B2 | 9/2017 | Abramson et al. |
| 9,774,436 B2 | 9/2017 | Jeon et al. |
| 9,774,476 B2 | 9/2017 | Nammi et al. |
| 9,775,048 B2 | 9/2017 | Reddy et al. |
| 9,775,087 B2 | 9/2017 | Chou et al. |
| 9,775,089 B2 | 9/2017 | Payyappilly et al. |
| 9,775,153 B2 | 9/2017 | Khawer et al. |
| 9,775,165 B2 | 9/2017 | Ben Ami et al. |
| 9,781,233 B2 | 10/2017 | Wattwood et al. |
| 9,781,742 B2 | 10/2017 | Gu et al. |
| 9,781,771 B2 | 10/2017 | Shitara |
| 9,785,157 B2 | 10/2017 | Wang et al. |
| 9,787,569 B2 | 10/2017 | Somasundaram et al. |
| 9,788,217 B2 | 10/2017 | Andreoli-Fang et al. |
| 9,794,015 B2 | 10/2017 | Tabet et al. |
| 9,794,033 B2 | 10/2017 | Fwu et al. |
| 9,794,821 B2 | 10/2017 | Jeon et al. |
| 9,794,899 B2 | 10/2017 | Moon et al. |
| 9,794,935 B2 | 10/2017 | Khawer |
| 9,794,960 B2 | 10/2017 | Ng |
| 9,801,187 B1 | 10/2017 | Zhou et al. |
| 9,807,618 B2 | 10/2017 | Liu et al. |
| 9,807,619 B2 | 10/2017 | Tsai et al. |
| 9,807,625 B2 | 10/2017 | Ngo et al. |
| 9,807,767 B2 | 10/2017 | Chen et al. |
| 9,807,821 B2 | 10/2017 | Jha et al. |
| 9,813,944 B2 | 11/2017 | Arslan et al. |
| 9,819,467 B2 | 11/2017 | Damnjanovic et al. |
| 9,825,748 B2 | 11/2017 | Liang et al. |
| 9,825,752 B2 | 11/2017 | Jindal et al. |
| 9,826,014 B2 | 11/2017 | Kent et al. |
| 9,826,460 B2 | 11/2017 | Patil et al. |
| 9,826,480 B2 | 11/2017 | Damnjanovic et al. |
| 9,832,654 B2 | 11/2017 | Koskinen et al. |
| 9,832,659 B2 | 11/2017 | Yi et al. |
| 9,832,791 B2 | 11/2017 | Ngo et al. |
| 9,832,808 B2 | 11/2017 | Pazhyannur et al. |
| 9,838,191 B2 | 12/2017 | Chandwani et al. |
| 9,838,865 B2 | 12/2017 | Park et al. |
| 9,838,983 B2 | 12/2017 | Ahn et al. |
| 9,839,038 B2 | 12/2017 | Lin et al. |
| 9,839,049 B2 | 12/2017 | Bashar et al. |
| 9,841,802 B2 | 12/2017 | Emami et al. |
| 9,848,424 B2 | 12/2017 | Wang et al. |
| 9,848,433 B2 | 12/2017 | Frerking et al. |
| 9,848,440 B2 | 12/2017 | Li et al. |
| 9,853,682 B2 | 12/2017 | Jung et al. |
| 9,853,797 B2 | 12/2017 | Tabet et al. |
| 9,854,569 B2 | 12/2017 | Yang et al. |
| 9,860,776 B2 | 1/2018 | Yerramalli et al. |
| 9,865,107 B2 | 1/2018 | Chang et al. |
| 9,867,053 B2 | 1/2018 | Prasad et al. |
| 9,867,056 B2 | 1/2018 | Han et al. |
| 9,867,154 B2 | 1/2018 | Levy et al. |
| 9,869,750 B2 | 1/2018 | Cheng et al. |
| 9,871,287 B2 | 1/2018 | Achour |
| 9,872,181 B2 | 1/2018 | Hwang et al. |
| 9,872,233 B2 | 1/2018 | Jeon et al. |
| 9,876,613 B2 | 1/2018 | Venkatsuresh et al. |
| 9,877,174 B2 | 1/2018 | Li et al. |
| 9,877,177 B2 | 1/2018 | Lesage et al. |
| 9,877,203 B2 | 1/2018 | Yoo et al. |
| 9,882,287 B2 | 1/2018 | Talty et al. |
| 9,888,054 B2 | 2/2018 | Yang et al. |
| 9,888,388 B2 | 2/2018 | Wei |
| 9,888,501 B2 | 2/2018 | Borges et al. |
| 9,893,758 B2 | 2/2018 | HomChaudhuri et al. |
| 9,893,852 B2 | 2/2018 | Yerramalli et al. |
| 9,893,854 B2 | 2/2018 | Luo et al. |
| 9,893,865 B2 | 2/2018 | Hsieh |
| 9,893,941 B1 | 2/2018 | Balasubramanian et al. |
| 9,894,190 B2 | 2/2018 | Panchal et al. |
| 9,894,500 B2 | 2/2018 | Dong et al. |
| 9,894,534 B2 | 2/2018 | Boudreau et al. |
| 9,898,550 B2 | 2/2018 | Ho |
| 9,900,134 B2 | 2/2018 | Kwon et al. |
| 9,900,757 B2 | 2/2018 | Li et al. |
| 9,900,801 B2 | 2/2018 | Papa et al. |
| 9,900,881 B2 | 2/2018 | Han et al. |
| 9,900,908 B2 | 2/2018 | Noh et al. |
| 9,906,997 B2 | 2/2018 | Lee et al. |
| 9,907,085 B2 | 2/2018 | Li et al. |
| 9,912,804 B2 | 3/2018 | Lee et al. |
| 9,913,095 B2 | 3/2018 | Talluri et al. |
| 9,913,282 B2 | 3/2018 | Aksu |
| 9,913,297 B2 | 3/2018 | Ahn et al. |
| 9,913,311 B1 | 3/2018 | Amerga et al. |
| 9,917,676 B2 | 3/2018 | Ng et al. |
| 9,918,227 B2 | 3/2018 | Narasimha et al. |
| 9,918,232 B2 | 3/2018 | Khawer et al. |
| 9,918,336 B2 | 3/2018 | Verma et al. |
| 9,918,341 B2 | 3/2018 | Papaleo et al. |
| 9,923,610 B2 | 3/2018 | Sandhu et al. |
| 9,923,764 B2 | 3/2018 | Garg et al. |
| 9,924,370 B2 | 3/2018 | Cai et al. |
| 9,924,489 B2 | 3/2018 | Garg |
| 9,924,518 B2 | 3/2018 | Yi et al. |
| 9,924,519 B2 | 3/2018 | Green et al. |
| 9,930,535 B2 | 3/2018 | Hedayat et al. |
| 9,930,652 B2 | 3/2018 | Rashid et al. |
| 9,930,670 B2 | 3/2018 | Yi et al. |
| 9,935,743 B2 | 4/2018 | Khawer et al. |
| 9,936,393 B2 | 4/2018 | Pao et al. |
| 9,936,414 B2 | 4/2018 | Chai et al. |
| 9,936,453 B1 | 4/2018 | Iyer et al. |
| 9,942,762 B2 | 4/2018 | Griot et al. |
| 9,942,772 B2 | 4/2018 | Singh et al. |
| 9,942,848 B2 | 4/2018 | Gokingco et al. |
| 9,942,896 B2 | 4/2018 | Chandwani et al. |
| 9,942,901 B2 | 4/2018 | Chandrasekhar et al. |
| 9,942,919 B2 | 4/2018 | Mukherjee et al. |
| 9,948,481 B1 | 4/2018 | Rico Alvarino et al. |

(56) References Cited

U.S. PATENT DOCUMENTS

| | | |
|---|---|---|
| 9,948,486 B2 | 4/2018 | Wang et al. |
| 9,949,167 B2 | 4/2018 | You et al. |
| 9,949,169 B2 | 4/2018 | Yenamalli et al. |
| 9,949,220 B2 | 4/2018 | Abedini et al. |
| 9,949,275 B2 | 4/2018 | Chen et al. |
| 9,949,292 B2 | 4/2018 | Bhushan et al. |
| 9,949,295 B2 | 4/2018 | You et al. |
| 9,955,357 B2 | 4/2018 | Moon et al. |
| 9,955,460 B2 | 4/2018 | Tavildar et al. |
| 9,955,482 B2 | 4/2018 | Valliappan et al. |
| 9,959,888 B2 | 5/2018 | Gummadi et al. |
| 9,960,890 B2 | 5/2018 | Lei et al. |
| 9,961,598 B2 | 5/2018 | Hoidis et al. |
| 9,961,646 B2 | 5/2018 | Jeon et al. |
| 9,967,293 B2 | 5/2018 | Li et al. |
| 9,967,752 B2 | 5/2018 | Luo et al. |
| 9,967,771 B2 | 5/2018 | Pazhyannur et al. |
| 9,967,910 B2 | 5/2018 | Maaref |
| 9,973,244 B2 | 5/2018 | Chen et al. |
| 9,973,907 B1 | 5/2018 | Cham et al. |
| 9,973,935 B2 | 5/2018 | Garg et al. |
| 9,973,937 B2 | 5/2018 | Morioka |
| 9,973,963 B2 | 5/2018 | Mishra et al. |
| 9,974,099 B2 | 5/2018 | Sivanesan et al. |
| 9,979,577 B2 | 5/2018 | Naim et al. |
| 9,980,130 B2 | 5/2018 | Rayment et al. |
| 9,980,222 B2 | 5/2018 | de Jager et al. |
| 9,980,226 B2 | 5/2018 | Zisimopoulos et al. |
| 9,980,274 B2 | 5/2018 | Harada et al. |
| 9,985,909 B2 | 5/2018 | Shihab et al. |
| 9,986,303 B2 | 5/2018 | Takehara et al. |
| 9,986,402 B2 | 5/2018 | Noor |
| 9,986,440 B2 | 5/2018 | Guvenc |
| 9,986,586 B2 | 5/2018 | Lee et al. |
| 9,991,875 B2 | 6/2018 | Gathman et al. |
| 9,992,610 B2 | 6/2018 | Michaud et al. |
| 9,992,690 B2 | 6/2018 | Butchko et al. |
| 9,992,785 B2 | 6/2018 | Fischer et al. |
| 9,998,856 B2 | 6/2018 | Edge |
| 9,999,055 B2 | 6/2018 | Ngo et al. |
| 10,194,383 B2 * | 1/2019 | Cili ............... H04W 24/08 |
| 2004/0068441 A1 | 4/2004 | Werbitt |
| 2005/0030224 A1 | 2/2005 | Koch |
| 2005/0080718 A1 | 4/2005 | Desai |
| 2005/0249196 A1 | 11/2005 | Ansari et al. |
| 2005/0286452 A1 | 12/2005 | Hardgrave et al. |
| 2006/0019659 A1 | 1/2006 | Rosenberg et al. |
| 2006/0111112 A1 | 5/2006 | Maveddat |
| 2006/0294245 A1 | 12/2006 | Raguparan et al. |
| 2007/0032225 A1 | 2/2007 | Konicek et al. |
| 2007/0198748 A1 | 8/2007 | Ametsitsi et al. |
| 2007/0252695 A1 | 11/2007 | Bhavani |
| 2007/0297373 A1 * | 12/2007 | Saifullah ............ H04W 48/18 370/338 |
| 2008/0096553 A1 | 4/2008 | Saksena et al. |
| 2008/0102832 A1 | 5/2008 | Sengupta et al. |
| 2008/0146155 A1 | 6/2008 | Makhlouf et al. |
| 2008/0146156 A1 | 6/2008 | Makhlouf et al. |
| 2008/0146172 A1 | 6/2008 | Makhlouf et al. |
| 2008/0205414 A1 | 8/2008 | Katz et al. |
| 2008/0207184 A1 | 8/2008 | Wassingbo et al. |
| 2008/0214143 A1 | 9/2008 | Heit et al. |
| 2008/0254845 A1 | 10/2008 | Chang et al. |
| 2009/0109959 A1 * | 4/2009 | Elliott ............... H04L 12/14 370/352 |
| 2009/0286534 A1 | 11/2009 | Garg et al. |
| 2009/0296671 A1 | 12/2009 | Beach |
| 2009/0296672 A1 | 12/2009 | Beach |
| 2009/0296673 A1 | 12/2009 | Beach |
| 2010/0067546 A1 | 3/2010 | Mishra et al. |
| 2010/0128565 A1 | 5/2010 | Golparian |
| 2010/0251331 A1 | 9/2010 | Li |
| 2010/0296441 A1 | 11/2010 | Barkan |
| 2010/0296466 A1 | 11/2010 | Mignot et al. |
| 2010/0316033 A1 | 12/2010 | Atwal |
| 2011/0019652 A1 | 1/2011 | Atwal |
| 2011/0106958 A1 | 5/2011 | Thompson et al. |
| 2011/0131337 A1 | 6/2011 | Yoon et al. |
| 2011/0153818 A1 | 6/2011 | Vandwalle et al. |
| 2011/0165896 A1 * | 7/2011 | Stromberg ............ G06Q 20/32 455/466 |
| 2011/0173092 A1 | 7/2011 | Werbitt |
| 2011/0202645 A1 | 8/2011 | Abdelal et al. |
| 2011/0221544 A1 | 9/2011 | Chang et al. |
| 2012/0040606 A1 | 2/2012 | Verfuerth |
| 2012/0044836 A1 | 2/2012 | Sivavakeesar et al. |
| 2012/0112964 A1 | 5/2012 | Thill et al. |
| 2012/0278199 A1 | 11/2012 | Werbitt |
| 2012/0302203 A1 | 11/2012 | Heit et al. |
| 2013/0034709 A1 | 2/2013 | Takahashi et al. |
| 2013/0044603 A1 | 2/2013 | Macias et al. |
| 2013/0079011 A1 | 3/2013 | Duda |
| 2013/0089055 A1 * | 4/2013 | Keevill ............ H04L 12/5692 370/329 |
| 2013/0115972 A1 | 5/2013 | Ziskind et al. |
| 2013/0155849 A1 | 6/2013 | Koodli et al. |
| 2013/0155851 A1 | 6/2013 | Koodli et al. |
| 2013/0155965 A1 | 6/2013 | Koodli |
| 2013/0198642 A1 | 8/2013 | Carney et al. |
| 2013/0210472 A1 | 8/2013 | Yan et al. |
| 2013/0225759 A1 | 8/2013 | Takahashi et al. |
| 2013/0238994 A1 | 9/2013 | Yurasits |
| 2013/0262122 A1 | 10/2013 | Kim et al. |
| 2013/0310000 A1 | 11/2013 | Prasad et al. |
| 2014/0086101 A1 | 3/2014 | Barkan |
| 2014/0113623 A1 | 4/2014 | Garg et al. |
| 2014/0136601 A1 | 5/2014 | Kent et al. |
| 2014/0185581 A1 | 7/2014 | Senarath et al. |
| 2014/0247740 A1 | 9/2014 | Koo |
| 2014/0286308 A1 | 9/2014 | Lee et al. |
| 2014/0324952 A1 | 10/2014 | Irwin et al. |
| 2014/0341018 A1 | 11/2014 | Bhushan et al. |
| 2014/0341024 A1 | 11/2014 | Bhushan et al. |
| 2014/0341035 A1 | 11/2014 | Bhushan et al. |
| 2014/0341053 A1 | 11/2014 | Bhushan et al. |
| 2014/0341135 A1 | 11/2014 | Bhushan et al. |
| 2014/0341207 A1 | 11/2014 | Bhushan et al. |
| 2014/0342745 A1 | 11/2014 | Bhushan et al. |
| 2014/0362729 A1 | 12/2014 | Michaud et al. |
| 2015/0024781 A1 | 1/2015 | Konicek et al. |
| 2015/0026008 A1 | 1/2015 | Werbitt |
| 2015/0031382 A1 | 1/2015 | Damnjanovic et al. |
| 2015/0043523 A1 | 2/2015 | Luo et al. |
| 2015/0049712 A1 | 2/2015 | Chen et al. |
| 2015/0049715 A1 | 2/2015 | Yerramalli et al. |
| 2015/0049741 A1 | 2/2015 | Chen et al. |
| 2015/0055541 A1 | 2/2015 | Zhang et al. |
| 2015/0055588 A1 | 2/2015 | Yerramalli et al. |
| 2015/0056931 A1 | 2/2015 | Yerramalli et al. |
| 2015/0065110 A1 | 3/2015 | Nakao |
| 2015/0071060 A1 | 3/2015 | Bhushan et al. |
| 2015/0071229 A1 | 3/2015 | Yoon et al. |
| 2015/0078300 A1 | 3/2015 | Xu et al. |
| 2015/0079982 A1 | 3/2015 | Wu et al. |
| 2015/0085792 A1 | 3/2015 | Reddy et al. |
| 2015/0085793 A1 | 3/2015 | Luo et al. |
| 2015/0085794 A1 | 3/2015 | Chen et al. |
| 2015/0085797 A1 | 3/2015 | Ji et al. |
| 2015/0092702 A1 | 4/2015 | Chen et al. |
| 2015/0098349 A1 | 4/2015 | Wei et al. |
| 2015/0098412 A1 | 4/2015 | Yerramalli et al. |
| 2015/0099525 A1 | 4/2015 | Ji et al. |
| 2015/0103685 A1 | 4/2015 | Butchko et al. |
| 2015/0103715 A1 | 4/2015 | Chen et al. |
| 2015/0103777 A1 | 4/2015 | Chen et al. |
| 2015/0105067 A1 | 4/2015 | Valliappan et al. |
| 2015/0110065 A1 | 4/2015 | Gaal et al. |
| 2015/0111569 A1 | 4/2015 | Gupta |
| 2015/0131462 A1 | 5/2015 | Puranik et al. |
| 2015/0131493 A1 | 5/2015 | Navalekar et al. |
| 2015/0133057 A1 | 5/2015 | Yavuz et al. |
| 2015/0133173 A1 | 5/2015 | Edge et al. |
| 2015/0133184 A1 | 5/2015 | Sadek et al. |
| 2015/0141043 A1 | 5/2015 | Abramson et al. |

(56) References Cited

U.S. PATENT DOCUMENTS

| | | |
|---|---|---|
| 2015/0146562 A1 | 5/2015 | Sivanesan et al. |
| 2015/0146799 A1 | 5/2015 | Liu et al. |
| 2015/0155891 A1 | 6/2015 | Soliman |
| 2015/0163811 A1 | 6/2015 | Konstantinou et al. |
| 2015/0168174 A1 | 6/2015 | Abramson et al. |
| 2015/0168175 A1 | 6/2015 | Abramson et al. |
| 2015/0172986 A1 | 6/2015 | Salkintzis |
| 2015/0177010 A1 | 6/2015 | Abramson et al. |
| 2015/0180114 A1 | 6/2015 | Achour |
| 2015/0195849 A1 | 7/2015 | Bashar et al. |
| 2015/0201358 A1 | 7/2015 | Barkan |
| 2015/0215100 A1 | 7/2015 | Jeon et al. |
| 2015/0215827 A1 | 7/2015 | Zhang et al. |
| 2015/0215840 A1 | 7/2015 | Yiu et al. |
| 2015/0222410 A1 | 8/2015 | Belghoul et al. |
| 2015/0222414 A1 | 8/2015 | Tabet et al. |
| 2015/0223075 A1 | 8/2015 | Bashar et al. |
| 2015/0223115 A1 | 8/2015 | Liang et al. |
| 2015/0223243 A1 | 8/2015 | Tabet et al. |
| 2015/0223244 A1 | 8/2015 | Tabet et al. |
| 2015/0234442 A1 | 8/2015 | Emami et al. |
| 2015/0241231 A1 | 8/2015 | Abramson et al. |
| 2015/0242353 A1 | 8/2015 | Kawai |
| 2015/0245250 A1 | 8/2015 | Bhattacharjee et al. |
| 2015/0245376 A1 | 8/2015 | Bashar et al. |
| 2015/0249639 A1 | 9/2015 | Onno et al. |
| 2015/0250002 A1 | 9/2015 | Sun et al. |
| 2015/0256303 A1 | 9/2015 | Belghoul et al. |
| 2015/0264699 A1 | 9/2015 | Fwu et al. |
| 2015/0270925 A1 | 9/2015 | Lin et al. |
| 2015/0270936 A1 | 9/2015 | Han et al. |
| 2015/0271226 A1 | 9/2015 | Luby et al. |
| 2015/0271692 A1 | 9/2015 | Han et al. |
| 2015/0271849 A1 | 9/2015 | Gao |
| 2015/0280871 A1 | 10/2015 | Xu et al. |
| 2015/0281691 A1 | 10/2015 | Takehara et al. |
| 2015/0281966 A1 | 10/2015 | Griot et al. |
| 2015/0281981 A1 | 10/2015 | Msallem et al. |
| 2015/0282013 A1 | 10/2015 | Kim et al. |
| 2015/0282042 A1 | 10/2015 | Griot et al. |
| 2015/0288475 A1 | 10/2015 | Tabet et al. |
| 2015/0288734 A1 | 10/2015 | Harris et al. |
| 2015/0288809 A1 | 10/2015 | Liang et al. |
| 2015/0288828 A1 | 10/2015 | Lim et al. |
| 2015/0289121 A1 | 10/2015 | Lesage et al. |
| 2015/0289208 A1 | 10/2015 | Liu et al. |
| 2015/0293592 A1 | 10/2015 | Cheong et al. |
| 2015/0296359 A1 | 10/2015 | Edge |
| 2015/0296486 A1 | 10/2015 | Park et al. |
| 2015/0296516 A1 | 10/2015 | Jung |
| 2015/0304262 A1 | 10/2015 | Guan et al. |
| 2015/0312623 A1 | 10/2015 | Li et al. |
| 2015/0312775 A1 | 10/2015 | Yi et al. |
| 2015/0312793 A1 | 10/2015 | Jeon et al. |
| 2015/0312888 A1 | 10/2015 | Li et al. |
| 2015/0318605 A1 | 11/2015 | Talty et al. |
| 2015/0319701 A1 | 11/2015 | Ng et al. |
| 2015/0319753 A1 | 11/2015 | Chen et al. |
| 2015/0326612 A1 | 11/2015 | Faccin et al. |
| 2015/0327275 A1 | 11/2015 | Kwon et al. |
| 2015/0350290 A1 | 12/2015 | Yang et al. |
| 2015/0350598 A1 | 12/2015 | Yang et al. |
| 2015/0350859 A1 | 12/2015 | Hiben |
| 2015/0350954 A1 | 12/2015 | Faccin et al. |
| 2015/0350955 A1 | 12/2015 | Somasundaram et al. |
| 2015/0351105 A1 | 12/2015 | Lee et al. |
| 2015/0351115 A1 | 12/2015 | Jeon et al. |
| 2015/0365790 A1 | 12/2015 | Edge et al. |
| 2015/0365931 A1 | 12/2015 | Ng et al. |
| 2015/0365989 A1 | 12/2015 | Huang |
| 2015/0373674 A1 | 12/2015 | Han et al. |
| 2015/0373682 A1 | 12/2015 | Bashar et al. |
| 2015/0373726 A1 | 12/2015 | Zhao et al. |
| 2015/0373741 A1 | 12/2015 | Yerramalli et al. |
| 2015/0381215 A1 | 12/2015 | Butterfield et al. |
| 2015/0381401 A1 | 12/2015 | Butterfield et al. |
| 2015/0382398 A1 | 12/2015 | Guo |
| 2016/0007207 A1 | 1/2016 | Agardh et al. |
| 2016/0007322 A1 | 1/2016 | Agardh et al. |
| 2016/0007350 A1 | 1/2016 | Xiong et al. |
| 2016/0007368 A1 | 1/2016 | Moon et al. |
| 2016/0007373 A1 | 1/2016 | Davydov et al. |
| 2016/0007378 A1 | 1/2016 | Bertorelle et al. |
| 2016/0014586 A1 | 1/2016 | Stupar et al. |
| 2016/0014664 A1 | 1/2016 | Singh et al. |
| 2016/0021487 A1 | 1/2016 | Chen et al. |
| 2016/0021661 A1 | 1/2016 | Yerramalli et al. |
| 2016/0029229 A1 | 1/2016 | Malik et al. |
| 2016/0029246 A1 | 1/2016 | Mishra et al. |
| 2016/0037340 A1 | 2/2016 | Rayment et al. |
| 2016/0037401 A1 | 2/2016 | Lee et al. |
| 2016/0037490 A1 | 2/2016 | Pazhyannur et al. |
| 2016/0037550 A1 | 2/2016 | Barabell et al. |
| 2016/0037557 A1 | 2/2016 | Gu et al. |
| 2016/0043841 A1 | 2/2016 | Lunttila et al. |
| 2016/0043854 A1 | 2/2016 | Damnjanovic et al. |
| 2016/0044065 A1 | 2/2016 | Zhu et al. |
| 2016/0044516 A1 | 2/2016 | Hedayat et al. |
| 2016/0044531 A1 | 2/2016 | Papa et al. |
| 2016/0044565 A1 | 2/2016 | Lee et al. |
| 2016/0044667 A1 | 2/2016 | Chen et al. |
| 2016/0057668 A1 | 2/2016 | Lee et al. |
| 2016/0066195 A1 | 3/2016 | Moon et al. |
| 2016/0066204 A1 | 3/2016 | Khawer et al. |
| 2016/0066306 A1 | 3/2016 | Khawer et al. |
| 2016/0066325 A1 | 3/2016 | Kim et al. |
| 2016/0073265 A1 | 3/2016 | Vutukuri et al. |
| 2016/0073283 A1 | 3/2016 | Grayson et al. |
| 2016/0073299 A1 | 3/2016 | Liang et al. |
| 2016/0073344 A1 | 3/2016 | Vutukuri et al. |
| 2016/0073366 A1 | 3/2016 | Ng et al. |
| 2016/0073404 A1 | 3/2016 | Vutukuri et al. |
| 2016/0073405 A1 | 3/2016 | Khawer et al. |
| 2016/0073409 A1 | 3/2016 | Chen et al. |
| 2016/0073428 A1 | 3/2016 | Vutukuri et al. |
| 2016/0080108 A1 | 3/2016 | Ben Ami et al. |
| 2016/0080433 A1 | 3/2016 | Liu et al. |
| 2016/0081064 A1 | 3/2016 | Kwak et al. |
| 2016/0081082 A1 | 3/2016 | Cao et al. |
| 2016/0088585 A1 | 3/2016 | Garg |
| 2016/0088625 A1 | 3/2016 | Kadous et al. |
| 2016/0088631 A1 | 3/2016 | Hedayat et al. |
| 2016/0088642 A1 | 3/2016 | Yang et al. |
| 2016/0094317 A1 | 3/2016 | Erceg et al. |
| 2016/0095048 A1 | 3/2016 | Nory et al. |
| 2016/0095110 A1 | 3/2016 | Li et al. |
| 2016/0095130 A1 | 3/2016 | Ho |
| 2016/0099794 A1 | 4/2016 | Chendamarai Kannan et al. |
| 2016/0099799 A1 | 4/2016 | Bashar et al. |
| 2016/0100318 A1 | 4/2016 | Wei |
| 2016/0100331 A1 | 4/2016 | Ahmavaara |
| 2016/0100400 A1 | 4/2016 | Lu et al. |
| 2016/0100404 A1 | 4/2016 | Han et al. |
| 2016/0100405 A1 | 4/2016 | Hunukumbure et al. |
| 2016/0103201 A1 | 4/2016 | Lee |
| 2016/0105360 A1 | 4/2016 | Erickson et al. |
| 2016/0105880 A1 | 4/2016 | Bao et al. |
| 2016/0105897 A1 | 4/2016 | Liu et al. |
| 2016/0105915 A1 | 4/2016 | Zhang et al. |
| 2016/0112096 A1 | 4/2016 | Zhao et al. |
| 2016/0112851 A1 | 4/2016 | Li et al. |
| 2016/0112992 A1 | 4/2016 | Bhushan et al. |
| 2016/0113018 A1 | 4/2016 | Li |
| 2016/0119052 A1 | 4/2016 | Frerking et al. |
| 2016/0119791 A1 | 4/2016 | Koskinen et al. |
| 2016/0119846 A1 | 4/2016 | Chou et al. |
| 2016/0119867 A1 | 4/2016 | Garg |
| 2016/0119938 A1 | 4/2016 | Frerking et al. |
| 2016/0127057 A1 | 5/2016 | Yang |
| 2016/0127097 A1 | 5/2016 | Chen et al. |
| 2016/0127098 A1 | 5/2016 | Ng et al. |
| 2016/0127104 A1 | 5/2016 | Levy |
| 2016/0127108 A1 | 5/2016 | Jindal et al. |
| 2016/0127989 A1 | 5/2016 | Zhang et al. |

(56) References Cited

U.S. PATENT DOCUMENTS

| | | |
|---|---|---|
| 2016/0128008 A1 | 5/2016 | Levy et al. |
| 2016/0128020 A1 | 5/2016 | Agarwal et al. |
| 2016/0128080 A1 | 5/2016 | Verma et al. |
| 2016/0128084 A1 | 5/2016 | Novlan et al. |
| 2016/0128115 A1 | 5/2016 | Panteleev et al. |
| 2016/0135080 A1 | 5/2016 | Pazhyannur et al. |
| 2016/0135132 A1 | 5/2016 | Donepudi et al. |
| 2016/0135143 A1 | 5/2016 | Won et al. |
| 2016/0135148 A1 | 5/2016 | Novlan et al. |
| 2016/0135185 A1 | 5/2016 | Chandrasekhar et al. |
| 2016/0135189 A1 | 5/2016 | Chandrasekhar et al. |
| 2016/0142252 A1 | 5/2016 | Garg et al. |
| 2016/0142447 A1 | 5/2016 | Mufti et al. |
| 2016/0142880 A1 | 5/2016 | Talluri et al. |
| 2016/0142944 A1 | 5/2016 | Cao |
| 2016/0143014 A1 | 5/2016 | Mukherjee et al. |
| 2016/0156393 A1 | 6/2016 | Chen et al. |
| 2016/0156548 A1 | 6/2016 | Pazhyannur et al. |
| 2016/0156783 A1 | 6/2016 | Mufti et al. |
| 2016/0157162 A1 | 6/2016 | Batta et al. |
| 2016/0157173 A1 | 6/2016 | Shen |
| 2016/0157230 A1 | 6/2016 | Nord et al. |
| 2016/0157293 A1 | 6/2016 | Pazhyannur et al. |
| 2016/0165333 A1 | 6/2016 | Gokingco et al. |
| 2016/0165604 A1 | 6/2016 | Khawer et al. |
| 2016/0173249 A1 | 6/2016 | Kwon et al. |
| 2016/0173361 A1 | 6/2016 | Somasundaram et al. |
| 2016/0182204 A1 | 6/2016 | Hsieh |
| 2016/0182267 A1 | 6/2016 | Fechtel |
| 2016/0183097 A1 | 6/2016 | Richards et al. |
| 2016/0183131 A1 | 6/2016 | Khawer et al. |
| 2016/0183139 A1 | 6/2016 | Meredith et al. |
| 2016/0183204 A1 | 6/2016 | Seo |
| 2016/0183220 A1 | 6/2016 | Rashid et al. |
| 2016/0183263 A1 | 6/2016 | Liu et al. |
| 2016/0183313 A1 | 6/2016 | Vallabhu et al. |
| 2016/0192396 A1 | 6/2016 | Ng |
| 2016/0205562 A1 | 7/2016 | Wei |
| 2016/0205679 A1 | 7/2016 | Yoo et al. |
| 2016/0212629 A1 | 7/2016 | Wei et al. |
| 2016/0212649 A1 | 7/2016 | Chen et al. |
| 2016/0212734 A1 | 7/2016 | He et al. |
| 2016/0212755 A1 | 7/2016 | Cao et al. |
| 2016/0212798 A1 | 7/2016 | Jha et al. |
| 2016/0216130 A1 | 7/2016 | Abramson et al. |
| 2016/0218832 A1 | 7/2016 | Dabeer et al. |
| 2016/0218891 A1 | 7/2016 | Nammi et al. |
| 2016/0219448 A1 | 7/2016 | Davydov |
| 2016/0219487 A1 | 7/2016 | Khawer et al. |
| 2016/0219557 A1 | 7/2016 | He et al. |
| 2016/0219589 A1 | 7/2016 | Khawer et al. |
| 2016/0219590 A1 | 7/2016 | Khawer et al. |
| 2016/0219597 A1 | 7/2016 | Valliappan et al. |
| 2016/0219618 A1 | 7/2016 | Rico Alvarino et al. |
| 2016/0223641 A1 | 8/2016 | Cheng et al. |
| 2016/0226632 A1 | 8/2016 | Zhang et al. |
| 2016/0226923 A1 | 8/2016 | Purkop et al. |
| 2016/0227416 A1 | 8/2016 | Suzuki et al. |
| 2016/0227427 A1 | 8/2016 | Vajapeyam et al. |
| 2016/0227428 A1 | 8/2016 | Novlan et al. |
| 2016/0227519 A1 | 8/2016 | Nimbalker et al. |
| 2016/0227536 A1 | 8/2016 | Khawer et al. |
| 2016/0227548 A1 | 8/2016 | Nimbalker et al. |
| 2016/0227571 A1 | 8/2016 | Baek et al. |
| 2016/0227578 A1 | 8/2016 | Lee et al. |
| 2016/0233989 A1 | 8/2016 | Belghoul et al. |
| 2016/0234706 A1 | 8/2016 | Liu et al. |
| 2016/0234748 A1 | 8/2016 | Chrisikos et al. |
| 2016/0234763 A1 | 8/2016 | Um et al. |
| 2016/0234841 A1 | 8/2016 | Pao et al. |
| 2016/0234870 A1 | 8/2016 | Borges et al. |
| 2016/0240923 A1 | 8/2016 | Oh et al. |
| 2016/0242153 A1 | 8/2016 | Chen et al. |
| 2016/0242183 A1 | 8/2016 | Kang et al. |
| 2016/0242186 A1 | 8/2016 | Nissila |
| 2016/0248555 A1 | 8/2016 | Lei et al. |
| 2016/0249224 A1 | 8/2016 | Prasad et al. |
| 2016/0249255 A1 | 8/2016 | Khawer et al. |
| 2016/0249350 A1 | 8/2016 | Koutsimanis et al. |
| 2016/0255627 A1 | 9/2016 | Malik et al. |
| 2016/0255642 A1 | 9/2016 | Malik et al. |
| 2016/0255643 A1 | 9/2016 | Malik et al. |
| 2016/0255644 A1 | 9/2016 | Malik et al. |
| 2016/0255653 A1 | 9/2016 | Malik et al. |
| 2016/0255664 A1 | 9/2016 | Li |
| 2016/0259923 A1 | 9/2016 | Papa et al. |
| 2016/0261904 A1 | 9/2016 | Qian et al. |
| 2016/0262038 A1 | 9/2016 | Dunn et al. |
| 2016/0262184 A1 | 9/2016 | Wentink |
| 2016/0269460 A1 | 9/2016 | Kent et al. |
| 2016/0269941 A1 | 9/2016 | Chai et al. |
| 2016/0269943 A1 | 9/2016 | Ji et al. |
| 2016/0269978 A1 | 9/2016 | Bashar et al. |
| 2016/0270063 A1 | 9/2016 | Chen et al. |
| 2016/0270100 A1 | 9/2016 | Ng et al. |
| 2016/0270141 A1 | 9/2016 | Sharma et al. |
| 2016/0274215 A1 | 9/2016 | Edge et al. |
| 2016/0277165 A1 | 9/2016 | Wei |
| 2016/0277935 A1 | 9/2016 | Singh et al. |
| 2016/0277992 A1 | 9/2016 | Cao |
| 2016/0278074 A1 | 9/2016 | Yang et al. |
| 2016/0278118 A1 | 9/2016 | Yerramalli et al. |
| 2016/0285539 A1 | 9/2016 | Sadiq et al. |
| 2016/0285727 A1 | 9/2016 | Yi et al. |
| 2016/0285935 A1 | 9/2016 | Wu et al. |
| 2016/0286374 A1 | 9/2016 | Baghel et al. |
| 2016/0286438 A1 | 9/2016 | Weingertner |
| 2016/0286545 A1 | 9/2016 | Luo et al. |
| 2016/0286559 A1 | 9/2016 | Abedini et al. |
| 2016/0291665 A1 | 10/2016 | Wang et al. |
| 2016/0295420 A1 | 10/2016 | Luo et al. |
| 2016/0295494 A1 | 10/2016 | Gulati et al. |
| 2016/0295496 A1 | 10/2016 | Atarius et al. |
| 2016/0295499 A1 | 10/2016 | Tavildar et al. |
| 2016/0295510 A1 | 10/2016 | Zisimopoulos et al. |
| 2016/0295515 A1 | 10/2016 | Cai et al. |
| 2016/0295614 A1 | 10/2016 | Lee et al. |
| 2016/0295624 A1 | 10/2016 | Novlan et al. |
| 2016/0301504 A1 | 10/2016 | Toskala et al. |
| 2016/0302076 A1 | 10/2016 | Chou et al. |
| 2016/0302137 A1 | 10/2016 | Escott et al. |
| 2016/0302176 A1 | 10/2016 | Ahn et al. |
| 2016/0302183 A1 | 10/2016 | Yang et al. |
| 2016/0302184 A1 | 10/2016 | Belleschi et al. |
| 2016/0302230 A1 | 10/2016 | Novlan et al. |
| 2016/0308658 A1 | 10/2016 | Zhang et al. |
| 2016/0309309 A1 | 10/2016 | Dong et al. |
| 2016/0309354 A1 | 10/2016 | Yerramalli et al. |
| 2016/0309373 A1 | 10/2016 | Khawer et al. |
| 2016/0309463 A1 | 10/2016 | Khawer |
| 2016/0315751 A1 | 10/2016 | Chandwani et al. |
| 2016/0316426 A1 | 10/2016 | Kumar |
| 2016/0323720 A1 | 11/2016 | Patel et al. |
| 2016/0330630 A1 | 11/2016 | Yoo et al. |
| 2016/0330645 A1 | 11/2016 | Mishra et al. |
| 2016/0330678 A1 | 11/2016 | Yoon et al. |
| 2016/0330703 A1 | 11/2016 | Shim et al. |
| 2016/0330739 A1 | 11/2016 | Webb et al. |
| 2016/0330771 A1 | 11/2016 | Tan |
| 2016/0334837 A1 | 11/2016 | Dees et al. |
| 2016/0336983 A1 | 11/2016 | Wang et al. |
| 2016/0337007 A1 | 11/2016 | Seyedmehdi et al. |
| 2016/0337094 A1 | 11/2016 | Andreoli-Fang et al. |
| 2016/0337101 A1 | 11/2016 | Gao et al. |
| 2016/0337109 A1 | 11/2016 | Yasukawa et al. |
| 2016/0337279 A1 | 11/2016 | Lu et al. |
| 2016/0337817 A1 | 11/2016 | Malladi et al. |
| 2016/0337865 A1 | 11/2016 | Morioka |
| 2016/0337935 A1 | 11/2016 | Patil et al. |
| 2016/0337954 A1 | 11/2016 | Gulati et al. |
| 2016/0338019 A1 | 11/2016 | Ratasuk et al. |
| 2016/0338054 A1 | 11/2016 | Oh et al. |
| 2016/0338071 A1 | 11/2016 | Khosla et al. |
| 2016/0338096 A1 | 11/2016 | Vajapeyam et al. |

(56) References Cited

U.S. PATENT DOCUMENTS

| | | |
|---|---|---|
| 2016/0338097 A1 | 11/2016 | Andreoli-Fang et al. |
| 2016/0338118 A1 | 11/2016 | Vajapeyam et al. |
| 2016/0344782 A1 | 11/2016 | Cheng et al. |
| 2016/0345192 A1 | 11/2016 | Garg et al. |
| 2016/0345206 A1 | 11/2016 | Yerramalli et al. |
| 2016/0345265 A1 | 11/2016 | Lee et al. |
| 2016/0345284 A1 | 11/2016 | Yared |
| 2016/0345332 A1 | 11/2016 | Cheng et al. |
| 2016/0345345 A1 | 11/2016 | Malik et al. |
| 2016/0345360 A1 | 11/2016 | Papaleo et al. |
| 2016/0353437 A1 | 12/2016 | Sun et al. |
| 2016/0353452 A1 | 12/2016 | Chen et al. |
| 2016/0353467 A1 | 12/2016 | Nekovee |
| 2016/0353494 A1 | 12/2016 | Yang et al. |
| 2016/0358394 A1 | 12/2016 | Konicek et al. |
| 2016/0360420 A1 | 12/2016 | Liu et al. |
| 2016/0360458 A1 | 12/2016 | Lubenski |
| 2016/0360556 A1 | 12/2016 | Jeong et al. |
| 2016/0365879 A1 | 12/2016 | Soliman et al. |
| 2016/0366623 A1 | 12/2016 | Senarath et al. |
| 2016/0366638 A1 | 12/2016 | Kumar |
| 2016/0373235 A1 | 12/2016 | Oh et al. |
| 2016/0373935 A1 | 12/2016 | Smith et al. |
| 2016/0373944 A1 | 12/2016 | Jain et al. |
| 2016/0373958 A1 | 12/2016 | Cao et al. |
| 2016/0374079 A1 | 12/2016 | Yasukawa et al. |
| 2016/0380665 A1 | 12/2016 | Lee et al. |
| 2016/0381536 A1 | 12/2016 | Li et al. |
| 2016/0381567 A1 | 12/2016 | Bhushan et al. |
| 2016/0381600 A1 | 12/2016 | Aksu |
| 2016/0381618 A1 | 12/2016 | Sayem et al. |
| 2016/0381680 A1 | 12/2016 | Yasukawa et al. |
| 2017/0004665 A1 | 1/2017 | Chang et al. |
| 2017/0006535 A1 | 1/2017 | Verma et al. |
| 2017/0006583 A1 | 1/2017 | Tavildar et al. |
| 2017/0006626 A1 | 1/2017 | Lin et al. |
| 2017/0006632 A1 | 1/2017 | Elliott et al. |
| 2017/0012754 A1 | 1/2017 | Sun et al. |
| 2017/0013496 A1 | 1/2017 | Gupta |
| 2017/0013513 A1 | 1/2017 | Agarwal et al. |
| 2017/0013622 A1 | 1/2017 | Taylor |
| 2017/0019291 A1 | 1/2017 | Tapia et al. |
| 2017/0019315 A1 | 1/2017 | Tapia et al. |
| 2017/0019838 A1 | 1/2017 | Harada et al. |
| 2017/0019887 A1 | 1/2017 | Jiang et al. |
| 2017/0019909 A1 | 1/2017 | Si et al. |
| 2017/0026845 A1 | 1/2017 | Garg et al. |
| 2017/0026945 A1 | 1/2017 | Han et al. |
| 2017/0027002 A1 | 1/2017 | Yerramalli et al. |
| 2017/0033829 A1 | 2/2017 | HomChaudhuri et al. |
| 2017/0034745 A1 | 2/2017 | Dhanapal et al. |
| 2017/0034756 A1 | 2/2017 | Faccin et al. |
| 2017/0034767 A1 | 2/2017 | Griot et al. |
| 2017/0034831 A1 | 2/2017 | Yerramalli et al. |
| 2017/0034832 A1 | 2/2017 | Karimli et al. |
| 2017/0034851 A1 | 2/2017 | Kwon et al. |
| 2017/0034871 A1 | 2/2017 | Shitara |
| 2017/0041042 A1 | 2/2017 | Wei |
| 2017/0041158 A1 | 2/2017 | Morioka |
| 2017/0041803 A1 | 2/2017 | Shi et al. |
| 2017/0041805 A1 | 2/2017 | Chandrasekhar et al. |
| 2017/0041820 A1 | 2/2017 | Wei et al. |
| 2017/0041844 A1 | 2/2017 | Richards et al. |
| 2017/0041922 A1 | 2/2017 | Chen et al. |
| 2017/0041947 A1 | 2/2017 | Kim et al. |
| 2017/0041949 A1 | 2/2017 | Ngo et al. |
| 2017/0041954 A1 | 2/2017 | Tsai et al. |
| 2017/0041955 A1 | 2/2017 | Abraham et al. |
| 2017/0041956 A1 | 2/2017 | Abraham et al. |
| 2017/0041957 A1 | 2/2017 | Pazhyannur et al. |
| 2017/0048041 A1 | 2/2017 | Yi et al. |
| 2017/0048728 A1 | 2/2017 | Ngo et al. |
| 2017/0048748 A1 | 2/2017 | Susitaival et al. |
| 2017/0048855 A1 | 2/2017 | Garg et al. |
| 2017/0048858 A1 | 2/2017 | Ngo et al. |
| 2017/0048861 A1 | 2/2017 | Choi et al. |
| 2017/0048864 A1 | 2/2017 | Ngo et al. |
| 2017/0048875 A1 | 2/2017 | Martin et al. |
| 2017/0048919 A1 | 2/2017 | Gaal et al. |
| 2017/0055181 A1 | 2/2017 | Tiirola et al. |
| 2017/0055193 A1 | 2/2017 | Mueck et al. |
| 2017/0055268 A1 | 2/2017 | Aksu |
| 2017/0055282 A1 | 2/2017 | Sadiq et al. |
| 2017/0063479 A1 | 3/2017 | Kim et al. |
| 2017/0063498 A1 | 3/2017 | Venkatsuresh et al. |
| 2017/0064558 A1 | 3/2017 | Li |
| 2017/0064559 A1 | 3/2017 | Li |
| 2017/0064712 A1 | 3/2017 | Huang et al. |
| 2017/0064727 A1 | 3/2017 | Chrisikos |
| 2017/0064770 A1 | 3/2017 | Patwardhan et al. |
| 2017/0069963 A1 | 3/2017 | Wattwood et al. |
| 2017/0070436 A1 | 3/2017 | Lubenski et al. |
| 2017/0070617 A1 | 3/2017 | Vasudevan et al. |
| 2017/0070906 A1 | 3/2017 | Luo et al. |
| 2017/0070935 A1 | 3/2017 | Karimli et al. |
| 2017/0070993 A1 | 3/2017 | Ngo et al. |
| 2017/0078865 A1 | 3/2017 | Santhanam et al. |
| 2017/0078983 A1 | 3/2017 | Ahn et al. |
| 2017/0079013 A1 | 3/2017 | Noh et al. |
| 2017/0079060 A1 | 3/2017 | Keating et al. |
| 2017/0085292 A1 | 3/2017 | Jung et al. |
| 2017/0085326 A1 | 3/2017 | Li et al. |
| 2017/0085346 A1 | 3/2017 | Tiirola et al. |
| 2017/0086209 A1 | 3/2017 | Panchal et al. |
| 2017/0086216 A1 | 3/2017 | Patil et al. |
| 2017/0086225 A1 | 3/2017 | Ljung |
| 2017/0086226 A1 | 3/2017 | Wang |
| 2017/0090484 A1 | 3/2017 | Obaidi |
| 2017/0092996 A1 | 3/2017 | Rodriguez et al. |
| 2017/0093508 A1 | 3/2017 | Martin |
| 2017/0093620 A1 | 3/2017 | Um et al. |
| 2017/0094528 A1 | 3/2017 | Takeda et al. |
| 2017/0094535 A1 | 3/2017 | Nuss et al. |
| 2017/0094546 A1 | 3/2017 | Chai et al. |
| 2017/0094574 A1 | 3/2017 | Singh et al. |
| 2017/0094651 A1 | 3/2017 | Green et al. |
| 2017/0094681 A1 | 3/2017 | Takeda et al. |
| 2017/0099198 A1 | 4/2017 | Bhimavarapu et al. |
| 2017/0099204 A1 | 4/2017 | Park et al. |
| 2017/0099338 A1 | 4/2017 | Yang et al. |
| 2017/0099624 A1 | 4/2017 | Baghel et al. |
| 2017/0099625 A1 | 4/2017 | Li et al. |
| 2017/0099664 A1 | 4/2017 | Lunttila et al. |
| 2017/0099666 A1 | 4/2017 | Nama |
| 2017/0105193 A1 | 4/2017 | Liu et al. |
| 2017/0105218 A1 | 4/2017 | Tabet et al. |
| 2017/0111150 A1 | 4/2017 | Han et al. |
| 2017/0111217 A1 | 4/2017 | Kim et al. |
| 2017/0111754 A1 | 4/2017 | Baghel et al. |
| 2017/0111802 A1 | 4/2017 | Bhushan et al. |
| 2017/0111874 A1 | 4/2017 | Harada et al. |
| 2017/0111889 A1 | 4/2017 | Li et al. |
| 2017/0111931 A1 | 4/2017 | Damnjanovic et al. |
| 2017/0117997 A1 | 4/2017 | Park et al. |
| 2017/0118001 A1 | 4/2017 | Yi et al. |
| 2017/0118688 A1 | 4/2017 | Guvenc |
| 2017/0118708 A1 | 4/2017 | Alon et al. |
| 2017/0118728 A1 | 4/2017 | Harada et al. |
| 2017/0118763 A1 | 4/2017 | Zhao et al. |
| 2017/0118776 A1 | 4/2017 | Yasukawa et al. |
| 2017/0118792 A1 | 4/2017 | Rico Alvarino et al. |
| 2017/0123049 A1 | 5/2017 | Tsai et al. |
| 2017/0124008 A1 | 5/2017 | Chen et al. |
| 2017/0124013 A1 | 5/2017 | Vaillancourt et al. |
| 2017/0126288 A1 | 5/2017 | Sandhu et al. |
| 2017/0126300 A1 | 5/2017 | Park et al. |
| 2017/0126306 A1 | 5/2017 | Kim et al. |
| 2017/0126365 A1 | 5/2017 | Peng et al. |
| 2017/0127256 A1 | 5/2017 | Hua et al. |
| 2017/0127325 A1 | 5/2017 | Vikberg et al. |
| 2017/0127330 A1 | 5/2017 | Payyappilly et al. |
| 2017/0127362 A1 | 5/2017 | Tavildar et al. |
| 2017/0127409 A1 | 5/2017 | Mishra et al. |
| 2017/0127413 A1 | 5/2017 | Guan et al. |

(56) References Cited

U.S. PATENT DOCUMENTS

| | | |
|---|---|---|
| 2017/0127414 A1 | 5/2017 | Yi et al. |
| 2017/0127417 A1 | 5/2017 | Andreoli-Fang et al. |
| 2017/0127442 A1 | 5/2017 | Sun et al. |
| 2017/0127444 A1 | 5/2017 | Goto et al. |
| 2017/0127470 A1 | 5/2017 | Vajapeyam et al. |
| 2017/0134080 A1 | 5/2017 | Rahman et al. |
| 2017/0134199 A1 | 5/2017 | Wang et al. |
| 2017/0134241 A1 | 5/2017 | Jang et al. |
| 2017/0134294 A1 | 5/2017 | Li et al. |
| 2017/0135095 A1 | 5/2017 | Chandwani et al. |
| 2017/0139485 A1 | 5/2017 | Fogelmark et al. |
| 2017/0141463 A1 | 5/2017 | Wattwood et al. |
| 2017/0142592 A1 | 5/2017 | Fischer et al. |
| 2017/0142599 A1 | 5/2017 | Babaei et al. |
| 2017/0142653 A1 | 5/2017 | Qi et al. |
| 2017/0142711 A1 | 5/2017 | Yi et al. |
| 2017/0142720 A1 | 5/2017 | Andreoli-Fang et al. |
| 2017/0142728 A1 | 5/2017 | Tsai et al. |
| 2017/0142735 A1 | 5/2017 | Ben Ami et al. |
| 2017/0142740 A1 | 5/2017 | Gou |
| 2017/0142742 A1 | 5/2017 | Fischer et al. |
| 2017/0142743 A1 | 5/2017 | Yoon et al. |
| 2017/0142751 A1 | 5/2017 | Liu et al. |
| 2017/0142752 A1 | 5/2017 | Schmidt |
| 2017/0149444 A1 | 5/2017 | Lin et al. |
| 2017/0149484 A1 | 5/2017 | Nimbalker et al. |
| 2017/0149543 A1 | 5/2017 | Ang et al. |
| 2017/0149833 A1 | 5/2017 | Ngo et al. |
| 2017/0149846 A1 | 5/2017 | Mufti et al. |
| 2017/0150351 A1 | 5/2017 | Narasimha et al. |
| 2017/0150352 A1 | 5/2017 | Narasimha et al. |
| 2017/0150368 A1 | 5/2017 | Ngo et al. |
| 2017/0150382 A1 | 5/2017 | Martin et al. |
| 2017/0150500 A1 | 5/2017 | Ahn et al. |
| 2017/0150509 A1 | 5/2017 | Halabian et al. |
| 2017/0150514 A1 | 5/2017 | Li |
| 2017/0150524 A1 | 5/2017 | Oh et al. |
| 2017/0150548 A1 | 5/2017 | Shah et al. |
| 2017/0156075 A1 | 6/2017 | Harada et al. |
| 2017/0156149 A1 | 6/2017 | Lin et al. |
| 2017/0163297 A1 | 6/2017 | Hou et al. |
| 2017/0163298 A1 | 6/2017 | Hou et al. |
| 2017/0163388 A1 | 6/2017 | Wiemann et al. |
| 2017/0163484 A1 | 6/2017 | Hou et al. |
| 2017/0164177 A1 | 6/2017 | Wang et al. |
| 2017/0164195 A1 | 6/2017 | Stammers et al. |
| 2017/0164208 A1 | 6/2017 | Nielsen et al. |
| 2017/0164230 A1 | 6/2017 | You et al. |
| 2017/0164247 A1 | 6/2017 | Wiemann et al. |
| 2017/0164301 A1 | 6/2017 | Jeon et al. |
| 2017/0164345 A1 | 6/2017 | Goto et al. |
| 2017/0164352 A1 | 6/2017 | Yang et al. |
| 2017/0164384 A1 | 6/2017 | Wang et al. |
| 2017/0164402 A1 | 6/2017 | Zhang et al. |
| 2017/0164403 A1 | 6/2017 | Lindheimer et al. |
| 2017/0169458 A1 | 6/2017 | Singh |
| 2017/0169833 A1 | 6/2017 | Lecomte et al. |
| 2017/0170943 A1 | 6/2017 | Zeng et al. |
| 2017/0171761 A1 | 6/2017 | Guvenc |
| 2017/0171783 A1 | 6/2017 | Reddy et al. |
| 2017/0171815 A1 | 6/2017 | de Jager et al. |
| 2017/0171820 A1 | 6/2017 | Kronestedt et al. |
| 2017/0171840 A1 | 6/2017 | Mukherjee et al. |
| 2017/0171856 A1 | 6/2017 | Zeng et al. |
| 2017/0171883 A1 | 6/2017 | Noh et al. |
| 2017/0176539 A1 | 6/2017 | Younger |
| 2017/0180001 A1 | 6/2017 | Wang et al. |
| 2017/0180085 A1 | 6/2017 | Balasubramanian |
| 2017/0180938 A1 | 6/2017 | Smith |
| 2017/0180999 A1 | 6/2017 | Alderfer et al. |
| 2017/0181002 A1 | 6/2017 | Ngo et al. |
| 2017/0181003 A1 | 6/2017 | Chen et al. |
| 2017/0181015 A1 | 6/2017 | Ngo et al. |
| 2017/0181022 A1 | 6/2017 | Yang et al. |
| 2017/0181040 A1 | 6/2017 | Chandwani et al. |
| 2017/0181057 A1 | 6/2017 | Kishiyama et al. |
| 2017/0181119 A1 | 6/2017 | Garg |
| 2017/0181197 A1 | 6/2017 | Aguirre et al. |
| 2017/0181213 A1 | 6/2017 | Barkan |
| 2017/0187886 A1 | 6/2017 | Rashid et al. |
| 2017/0188183 A1 | 6/2017 | Lihosit et al. |
| 2017/0188284 A1 | 6/2017 | Karimli et al. |
| 2017/0188323 A1 | 6/2017 | Bhushan et al. |
| 2017/0188353 A1 | 6/2017 | Islam et al. |
| 2017/0188364 A1 | 6/2017 | Li et al. |
| 2017/0188391 A1 | 6/2017 | Rajagopal et al. |
| 2017/0195099 A1 | 7/2017 | Kahtava et al. |
| 2017/0195888 A1 | 7/2017 | Gou et al. |
| 2017/0195889 A1 | 7/2017 | Takeda et al. |
| 2017/0196009 A1 | 7/2017 | Martin et al. |
| 2017/0196020 A1 | 7/2017 | Mukherjee et al. |
| 2017/0201218 A1 | 7/2017 | Wang et al. |
| 2017/0201308 A1 | 7/2017 | Park et al. |
| 2017/0201461 A1 | 7/2017 | Cheng et al. |
| 2017/0201895 A1 | 7/2017 | Hassan et al. |
| 2017/0201935 A1 | 7/2017 | Um et al. |
| 2017/0201964 A1 | 7/2017 | Gupta et al. |
| 2017/0201997 A1 | 7/2017 | Cheng et al. |
| 2017/0202006 A1 | 7/2017 | Rao et al. |
| 2017/0202019 A1 | 7/2017 | You et al. |
| 2017/0202043 A1 | 7/2017 | Seo |
| 2017/0202052 A1 | 7/2017 | Xu et al. |
| 2017/0207880 A1 | 7/2017 | Sun et al. |
| 2017/0207894 A1 | 7/2017 | Wang et al. |
| 2017/0207895 A1 | 7/2017 | Yang et al. |
| 2017/0208475 A1 | 7/2017 | Yi et al. |
| 2017/0208560 A1 | 7/2017 | Papa et al. |
| 2017/0208588 A1 | 7/2017 | Park et al. |
| 2017/0208627 A1 | 7/2017 | You et al. |
| 2017/0208638 A1 | 7/2017 | Baghel et al. |
| 2017/0214655 A1 | 7/2017 | Bhushan et al. |
| 2017/0215081 A1 | 7/2017 | Yi et al. |
| 2017/0215082 A1 | 7/2017 | Hwang et al. |
| 2017/0215096 A1 | 7/2017 | Moon et al. |
| 2017/0215102 A1 | 7/2017 | Hassan et al. |
| 2017/0215157 A1 | 7/2017 | Yang et al. |
| 2017/0215171 A1 | 7/2017 | Sun et al. |
| 2017/0215172 A1 | 7/2017 | Yang et al. |
| 2017/0215179 A1 | 7/2017 | Choi et al. |
| 2017/0215183 A1 | 7/2017 | Gulati et al. |
| 2017/0215191 A1 | 7/2017 | Martin |
| 2017/0215202 A1 | 7/2017 | Yang et al. |
| 2017/0215205 A1 | 7/2017 | Takeda et al. |
| 2017/0215206 A1 | 7/2017 | Cheng et al. |
| 2017/0222661 A1 | 8/2017 | Sun et al. |
| 2017/0222746 A1 | 8/2017 | Kang et al. |
| 2017/0222763 A1 | 8/2017 | Lee et al. |
| 2017/0222951 A1 | 8/2017 | Shihab et al. |
| 2017/0223550 A1 | 8/2017 | Takeda et al. |
| 2017/0223561 A1 | 8/2017 | Radulescu et al. |
| 2017/0223643 A1 | 8/2017 | Ahn et al. |
| 2017/0223716 A1 | 8/2017 | Li et al. |
| 2017/0223723 A1 | 8/2017 | Das et al. |
| 2017/0223727 A1 | 8/2017 | Davydov et al. |
| 2017/0223738 A1 | 8/2017 | Seo et al. |
| 2017/0223742 A1 | 8/2017 | Shimomura et al. |
| 2017/0230213 A1 | 8/2017 | Wang et al. |
| 2017/0230818 A1 | 8/2017 | Park et al. |
| 2017/0230838 A1 | 8/2017 | Yerramalli et al. |
| 2017/0230844 A1 | 8/2017 | Li et al. |
| 2017/0230933 A1 | 8/2017 | Radulescu et al. |
| 2017/0230970 A1 | 8/2017 | Kim et al. |
| 2017/0230972 A1 | 8/2017 | Wang et al. |
| 2017/0231001 A1 | 8/2017 | Yang et al. |
| 2017/0231003 A1 | 8/2017 | Godana et al. |
| 2017/0231013 A1 | 8/2017 | Ahn et al. |
| 2017/0234691 A1 | 8/2017 | Abramson et al. |
| 2017/0237146 A1 | 8/2017 | Dureja |
| 2017/0238136 A1 | 8/2017 | Smith |
| 2017/0238188 A1 | 8/2017 | Youtz et al. |
| 2017/0238190 A1 | 8/2017 | Yang et al. |
| 2017/0238233 A1 | 8/2017 | Oh et al. |
| 2017/0238252 A1 | 8/2017 | Dalsgaard et al. |
| 2017/0238272 A1 | 8/2017 | You et al. |

(56) References Cited

U.S. PATENT DOCUMENTS

| | | |
|---|---|---|
| 2017/0238278 A1 | 8/2017 | Yadav |
| 2017/0238312 A1 | 8/2017 | Chen et al. |
| 2017/0238319 A1 | 8/2017 | Luft et al. |
| 2017/0238325 A1 | 8/2017 | Singh et al. |
| 2017/0238326 A1 | 8/2017 | Ahn et al. |
| 2017/0238330 A1 | 8/2017 | Jiang et al. |
| 2017/0244166 A1 | 8/2017 | Dong et al. |
| 2017/0245153 A1 | 8/2017 | Singh et al. |
| 2017/0245155 A1 | 8/2017 | Wang |
| 2017/0245156 A1 | 8/2017 | Gou et al. |
| 2017/0245168 A1 | 8/2017 | Yi et al. |
| 2017/0245280 A1 | 8/2017 | Yi et al. |
| 2017/0245302 A1 | 8/2017 | Mukherjee et al. |
| 2017/0245303 A1 | 8/2017 | Falconetti et al. |
| 2017/0245304 A1 | 8/2017 | Andreoli-Fang et al. |
| 2017/0250781 A1 | 8/2017 | Golitschek Edler Von Elbwart et al. |
| 2017/0251372 A1 | 8/2017 | Belghoul et al. |
| 2017/0251373 A1 | 8/2017 | Ding et al. |
| 2017/0251374 A1 | 8/2017 | Leinonen et al. |
| 2017/0251375 A1 | 8/2017 | Yang et al. |
| 2017/0251380 A1 | 8/2017 | Schabel et al. |
| 2017/0251454 A1 | 8/2017 | Yang et al. |
| 2017/0257773 A1 | 9/2017 | Boudreau et al. |
| 2017/0257776 A1 | 9/2017 | Agardh et al. |
| 2017/0257808 A1 | 9/2017 | Li |
| 2017/0257847 A1 | 9/2017 | Aguirre et al. |
| 2017/0257850 A1 | 9/2017 | Oh et al. |
| 2017/0257852 A1 | 9/2017 | Wu |
| 2017/0257865 A1 | 9/2017 | Halabian et al. |
| 2017/0257879 A1 | 9/2017 | Kang et al. |
| 2017/0257898 A1 | 9/2017 | Maaref |
| 2017/0264408 A1 | 9/2017 | Patel et al. |
| 2017/0264419 A1 | 9/2017 | Fakoorian et al. |
| 2017/0264466 A1 | 9/2017 | Hosseini et al. |
| 2017/0264613 A1 | 9/2017 | Phillips et al. |
| 2017/0265083 A1 | 9/2017 | Khojastepour et al. |
| 2017/0265095 A1 | 9/2017 | Harada et al. |
| 2017/0265096 A1 | 9/2017 | Goto et al. |
| 2017/0265104 A1 | 9/2017 | Arslan et al. |
| 2017/0265106 A1 | 9/2017 | Andreoli-Fang et al. |
| 2017/0265168 A1 | 9/2017 | Wang et al. |
| 2017/0265172 A1 | 9/2017 | Futaki |
| 2017/0265187 A1 | 9/2017 | Chen et al. |
| 2017/0265193 A1 | 9/2017 | Wang et al. |
| 2017/0265205 A1 | 9/2017 | HomChaudhuri et al. |
| 2017/0265206 A1 | 9/2017 | Andreoli-Fang et al. |
| 2017/0265220 A1 | 9/2017 | Andreoli-Fang et al. |
| 2017/0265225 A1 | 9/2017 | Takeda et al. |
| 2017/0272291 A1 | 9/2017 | Naim et al. |
| 2017/0272345 A1 | 9/2017 | Viorel et al. |
| 2017/0272931 A1 | 9/2017 | Bottari et al. |
| 2017/0272957 A1 | 9/2017 | Xu et al. |
| 2017/0272988 A1 | 9/2017 | Hoidis et al. |
| 2017/0273055 A1 | 9/2017 | Xu et al. |
| 2017/0273084 A1 | 9/2017 | Yi et al. |
| 2017/0273086 A1 | 9/2017 | Ngo et al. |
| 2017/0273108 A1 | 9/2017 | Damnjanovic et al. |
| 2017/0273110 A1 | 9/2017 | Chen |
| 2017/0273111 A1 | 9/2017 | Wong et al. |
| 2017/0273128 A1 | 9/2017 | Abedini et al. |
| 2017/0273130 A1 | 9/2017 | Panteleev et al. |
| 2017/0279512 A1 | 9/2017 | Wang |
| 2017/0279564 A1 | 9/2017 | Nord et al. |
| 2017/0279565 A1 | 9/2017 | Han et al. |
| 2017/0279957 A1 | 9/2017 | Abramson et al. |
| 2017/0280330 A1 | 9/2017 | Martin |
| 2017/0280336 A1 | 9/2017 | Sun et al. |
| 2017/0280341 A1 | 9/2017 | Nigam et al. |
| 2017/0280399 A1 | 9/2017 | Chrisikos et al. |
| 2017/0280425 A1 | 9/2017 | Yang et al. |
| 2017/0280440 A1 | 9/2017 | Oh et al. |
| 2017/0280445 A1 | 9/2017 | Jiang et al. |
| 2017/0280448 A1 | 9/2017 | Takeda et al. |
| 2017/0280468 A1 | 9/2017 | Harada et al. |
| 2017/0280480 A1 | 9/2017 | Wong et al. |
| 2017/0280506 A1 | 9/2017 | Kim |
| 2017/0288794 A1 | 10/2017 | Yerramalli et al. |
| 2017/0288813 A1 | 10/2017 | Khan et al. |
| 2017/0288823 A1 | 10/2017 | Bhushan et al. |
| 2017/0288848 A1 | 10/2017 | Lei et al. |
| 2017/0288888 A1 | 10/2017 | Rico Alvarino et al. |
| 2017/0288962 A1 | 10/2017 | Yi et al. |
| 2017/0289167 A1 | 10/2017 | Kasilya Sudarsan et al. |
| 2017/0289818 A1 | 10/2017 | Ng et al. |
| 2017/0289829 A1 | 10/2017 | Rico Alvarino et al. |
| 2017/0289833 A1 | 10/2017 | Heinikoski et al. |
| 2017/0289853 A1 | 10/2017 | Ahn et al. |
| 2017/0289936 A1 | 10/2017 | Chae et al. |
| 2017/0289937 A1 | 10/2017 | Urabayashi et al. |
| 2017/0289938 A1 | 10/2017 | Yoo et al. |
| 2017/0289957 A1 | 10/2017 | Zhang et al. |
| 2017/0289966 A1 | 10/2017 | Islam et al. |
| 2017/0289993 A1 | 10/2017 | Yerramalli et al. |
| 2017/0290002 A1 | 10/2017 | Subramanian et al. |
| 2017/0290037 A1 | 10/2017 | Goel et al. |
| 2017/0290047 A1 | 10/2017 | Islam et al. |
| 2017/0290048 A1 | 10/2017 | Amuru et al. |
| 2017/0290059 A1 | 10/2017 | Karaki et al. |
| 2017/0294958 A1 | 10/2017 | Ahn et al. |
| 2017/0294997 A1 | 10/2017 | Lee et al. |
| 2017/0295000 A1 | 10/2017 | Yoo et al. |
| 2017/0295046 A1 | 10/2017 | Ahn et al. |
| 2017/0295069 A1 | 10/2017 | Sweet et al. |
| 2017/0295178 A1 | 10/2017 | Cheng et al. |
| 2017/0295498 A1 | 10/2017 | Han et al. |
| 2017/0295500 A1 | 10/2017 | Sun et al. |
| 2017/0295510 A1 | 10/2017 | Sharma et al. |
| 2017/0295576 A1 | 10/2017 | Fukuta et al. |
| 2017/0296436 A1 | 10/2017 | Ziv et al. |
| 2017/0300659 A1 | 10/2017 | Ziv et al. |
| 2017/0300660 A1 | 10/2017 | Ziv et al. |
| 2017/0302354 A1 | 10/2017 | Islam et al. |
| 2017/0302414 A1 | 10/2017 | Islam et al. |
| 2017/0302495 A1 | 10/2017 | Islam et al. |
| 2017/0302496 A1 | 10/2017 | Xu et al. |
| 2017/0303136 A1 | 10/2017 | Park et al. |
| 2017/0303141 A1 | 10/2017 | Islam et al. |
| 2017/0303158 A1 | 10/2017 | Yang et al. |
| 2017/0303163 A1 | 10/2017 | Sharma et al. |
| 2017/0303220 A1 | 10/2017 | Sadeghi et al. |
| 2017/0303236 A1 | 10/2017 | Sun et al. |
| 2017/0303246 A1 | 10/2017 | Wang et al. |
| 2017/0303263 A1 | 10/2017 | Islam et al. |
| 2017/0303304 A1 | 10/2017 | Lee et al. |
| 2017/0303306 A1 | 10/2017 | Lee et al. |
| 2017/0303312 A1 | 10/2017 | Agiwal et al. |
| 2017/0310385 A1 | 10/2017 | Hwang et al. |
| 2017/0310422 A1 | 10/2017 | Baker et al. |
| 2017/0310434 A1 | 10/2017 | Harada et al. |
| 2017/0310439 A1 | 10/2017 | Yang et al. |
| 2017/0310452 A1 | 10/2017 | Lee et al. |
| 2017/0311024 A1 | 10/2017 | Zhou et al. |
| 2017/0311168 A1 | 10/2017 | Khawer et al. |
| 2017/0311169 A1 | 10/2017 | Cai et al. |
| 2017/0311191 A1 | 10/2017 | Khawer et al. |
| 2017/0311194 A1 | 10/2017 | Martin |
| 2017/0311195 A1 | 10/2017 | Martin et al. |
| 2017/0311206 A1 | 10/2017 | Ryoo et al. |
| 2017/0311320 A1 | 10/2017 | Lunttila et al. |
| 2017/0311322 A1 | 10/2017 | Kim et al. |
| 2017/0311339 A1 | 10/2017 | Xu et al. |
| 2017/0316233 A1 | 11/2017 | Kherani et al. |
| 2017/0317798 A1 | 11/2017 | Kim et al. |
| 2017/0317816 A1 | 11/2017 | Lei et al. |
| 2017/0317863 A1 | 11/2017 | Agiwal et al. |
| 2017/0317938 A1 | 11/2017 | Abraham et al. |
| 2017/0318471 A1 | 11/2017 | Wang |
| 2017/0318473 A1 | 11/2017 | Futaki |
| 2017/0318550 A1 | 11/2017 | Wang |
| 2017/0318568 A1 | 11/2017 | Nimbalker et al. |
| 2017/0318585 A1 | 11/2017 | Wang |
| 2017/0324528 A1 | 11/2017 | Rico Alvarino et al. |
| 2017/0325109 A1 | 11/2017 | Cummings |

(56) References Cited

U.S. PATENT DOCUMENTS

| | | |
|---|---|---|
| 2017/0325184 A1 | 11/2017 | Kwan et al. |
| 2017/0325201 A1 | 11/2017 | Chen et al. |
| 2017/0325215 A1 | 11/2017 | Takeda et al. |
| 2017/0325241 A1 | 11/2017 | Toskala et al. |
| 2017/0325253 A1 | 11/2017 | Wang et al. |
| 2017/0331758 A1 | 11/2017 | Trichias et al. |
| 2017/0332192 A1 | 11/2017 | Edge |
| 2017/0332246 A1 | 11/2017 | Zhang et al. |
| 2017/0332255 A1 | 11/2017 | Gupta et al. |
| 2017/0332256 A1 | 11/2017 | Gupta et al. |
| 2017/0332267 A1 | 11/2017 | Kim et al. |
| 2017/0332316 A1 | 11/2017 | Itatsu |
| 2017/0332353 A1 | 11/2017 | Viorel et al. |
| 2017/0332358 A1 | 11/2017 | Park et al. |
| 2017/0332374 A1 | 11/2017 | Koorapaty et al. |
| 2017/0332379 A1 | 11/2017 | Wang et al. |
| 2017/0332388 A1 | 11/2017 | Xu et al. |
| 2017/0338912 A1 | 11/2017 | Nigam et al. |
| 2017/0339568 A1 | 11/2017 | Wang et al. |
| 2017/0339580 A1 | 11/2017 | Martin et al. |
| 2017/0339592 A1 | 11/2017 | Yi et al. |
| 2017/0339626 A1 | 11/2017 | Mustajarvi et al. |
| 2017/0339641 A1 | 11/2017 | Nigam et al. |
| 2017/0339648 A1 | 11/2017 | Wang et al. |
| 2017/0339683 A1 | 11/2017 | Chen et al. |
| 2017/0339693 A1 | 11/2017 | Cierny et al. |
| 2017/0339696 A1 | 11/2017 | Xu et al. |
| 2017/0339706 A1 | 11/2017 | Andreoli-Fang et al. |
| 2017/0339717 A1 | 11/2017 | Futaki |
| 2017/0339719 A1 | 11/2017 | Xu et al. |
| 2017/0339720 A1 | 11/2017 | Kim et al. |
| 2017/0344224 A1 | 11/2017 | Kay et al. |
| 2017/0346534 A1 | 11/2017 | Islam et al. |
| 2017/0346535 A1 | 11/2017 | Islam et al. |
| 2017/0346539 A1 | 11/2017 | Islam et al. |
| 2017/0346543 A1 | 11/2017 | Islam et al. |
| 2017/0346544 A1 | 11/2017 | Islam et al. |
| 2017/0346545 A1 | 11/2017 | Islam et al. |
| 2017/0346609 A1 | 11/2017 | Li et al. |
| 2017/0346769 A1 | 11/2017 | McCray et al. |
| 2017/0347270 A1 | 11/2017 | Iouchi et al. |
| 2017/0347272 A1 | 11/2017 | Ahmavaara et al. |
| 2017/0347297 A1 | 11/2017 | Li et al. |
| 2017/0347307 A1 | 11/2017 | Mehta et al. |
| 2017/0347311 A1 | 11/2017 | Iyer et al. |
| 2017/0347341 A1 | 11/2017 | Zhang et al. |
| 2017/0347347 A1 | 11/2017 | Yang |
| 2017/0347359 A1 | 11/2017 | Yang et al. |
| 2017/0347365 A1 | 11/2017 | Xu et al. |
| 2017/0347366 A1 | 11/2017 | Ling et al. |
| 2017/0347378 A1 | 11/2017 | Le-Ngoc et al. |
| 2017/0347379 A1 | 11/2017 | Islam et al. |
| 2017/0347380 A1 | 11/2017 | Islam et al. |
| 2017/0347382 A1 | 11/2017 | Ji et al. |
| 2017/0353234 A1 | 12/2017 | Islam et al. |
| 2017/0353842 A1 | 12/2017 | Waddell |
| 2017/0353865 A1 | 12/2017 | Li et al. |
| 2017/0353867 A1 | 12/2017 | Baboescu et al. |
| 2017/0353874 A1 | 12/2017 | Harrang et al. |
| 2017/0353975 A1 | 12/2017 | Khawer et al. |
| 2017/0359114 A1 | 12/2017 | Akkarakaran et al. |
| 2017/0359155 A1 | 12/2017 | Harada et al. |
| 2017/0359728 A1 | 12/2017 | Jiang et al. |
| 2017/0359737 A1 | 12/2017 | Singh et al. |
| 2017/0359745 A1 | 12/2017 | Lee et al. |
| 2017/0359746 A1 | 12/2017 | Lee et al. |
| 2017/0359747 A1 | 12/2017 | Lunden et al. |
| 2017/0359764 A1 | 12/2017 | Yamamoto |
| 2017/0359806 A1 | 12/2017 | Takeda et al. |
| 2017/0359817 A1 | 12/2017 | Wittenmark et al. |
| 2017/0359826 A1 | 12/2017 | Islam et al. |
| 2017/0359828 A1 | 12/2017 | Ben Ami et al. |
| 2017/0366943 A1 | 12/2017 | Yoon et al. |
| 2017/0366961 A1 | 12/2017 | Sabeur |
| 2017/0366997 A1 | 12/2017 | Kim et al. |
| 2017/0366998 A1 | 12/2017 | Lee et al. |
| 2017/0367025 A1 | 12/2017 | Ahn et al. |
| 2017/0367056 A1 | 12/2017 | Wei |
| 2017/0367073 A1 | 12/2017 | Murugan et al. |
| 2017/0367092 A1 | 12/2017 | Kim et al. |
| 2017/0367106 A1 | 12/2017 | Kim et al. |
| 2017/0373741 A1 | 12/2017 | Yang et al. |
| 2017/0373780 A1 | 12/2017 | Ahn et al. |
| 2017/0373792 A1 | 12/2017 | Lunttila et al. |
| 2017/0373914 A1 | 12/2017 | Harada et al. |
| 2017/0374569 A1 | 12/2017 | Lee et al. |
| 2017/0374623 A1 | 12/2017 | Dhar et al. |
| 2017/0374653 A1 | 12/2017 | Lee et al. |
| 2017/0374704 A1 | 12/2017 | Sharma et al. |
| 2017/0374706 A1 | 12/2017 | Sharma et al. |
| 2018/0006670 A1 | 1/2018 | Liu et al. |
| 2018/0006776 A1 | 1/2018 | Fwu et al. |
| 2018/0006788 A1 | 1/2018 | Lee et al. |
| 2018/0006867 A1 | 1/2018 | Yi et al. |
| 2018/0006954 A1 | 1/2018 | Arora et al. |
| 2018/0007212 A1 | 1/2018 | Sirotkin et al. |
| 2018/0007551 A1 | 1/2018 | Wang et al. |
| 2018/0007576 A1 | 1/2018 | Lee et al. |
| 2018/0007587 A1 | 1/2018 | Feldman et al. |
| 2018/0007634 A1 | 1/2018 | Pereira |
| 2018/0007643 A1 | 1/2018 | Tiirola et al. |
| 2018/0007681 A1 | 1/2018 | Yang et al. |
| 2018/0007708 A1 | 1/2018 | Ke et al. |
| 2018/0007731 A1 | 1/2018 | Park et al. |
| 2018/0013533 A1 | 1/2018 | Yang et al. |
| 2018/0013897 A1 | 1/2018 | Kumar et al. |
| 2018/0014146 A1 | 1/2018 | Gulati et al. |
| 2018/0014205 A1 | 1/2018 | Tsai et al. |
| 2018/0014211 A1 | 1/2018 | Ngo et al. |
| 2018/0014304 A1 | 1/2018 | Khoshnevisan et al. |
| 2018/0014317 A1 | 1/2018 | Gulati et al. |
| 2018/0014324 A1 | 1/2018 | Gu et al. |
| 2018/0014326 A1 | 1/2018 | Wang et al. |
| 2018/0014341 A1 | 1/2018 | Jung |
| 2018/0019802 A1 | 1/2018 | Teague |
| 2018/0019836 A1 | 1/2018 | Kim et al. |
| 2018/0019900 A1 | 1/2018 | Sun et al. |
| 2018/0020081 A1 | 1/2018 | Teague |
| 2018/0020355 A1 | 1/2018 | Targali et al. |
| 2018/0020359 A1 | 1/2018 | Belghoul et al. |
| 2018/0020360 A1 | 1/2018 | Yerramalli et al. |
| 2018/0020371 A1 | 1/2018 | Prasad et al. |
| 2018/0020376 A1 | 1/2018 | Belghoul et al. |
| 2018/0020396 A1 | 1/2018 | Yoshimura et al. |
| 2018/0020443 A1 | 1/2018 | Lee et al. |
| 2018/0020445 A1 | 1/2018 | Harada et al. |
| 2018/0020452 A1 | 1/2018 | Yerramalli et al. |
| 2018/0020453 A1 | 1/2018 | Lin et al. |
| 2018/0020479 A1 | 1/2018 | Harada et al. |
| 2018/0026670 A1 | 1/2018 | Homchaudhuri et al. |
| 2018/0027481 A1 | 1/2018 | Xu et al. |
| 2018/0027549 A1 | 1/2018 | Wang et al. |
| 2018/0027559 A1 | 1/2018 | Iyer et al. |
| 2018/0027568 A1 | 1/2018 | Harada et al. |
| 2018/0027574 A1 | 1/2018 | Lee et al. |
| 2018/0027590 A1 | 1/2018 | Yerramalli et al. |
| 2018/0027597 A1 | 1/2018 | Ahn et al. |
| 2018/0034526 A1 | 2/2018 | Lee et al. |
| 2018/0034610 A1 | 2/2018 | He et al. |
| 2018/0034695 A1 | 2/2018 | Balasubramanian et al. |
| 2018/0035300 A1 | 2/2018 | Noellert et al. |
| 2018/0035393 A1 | 2/2018 | Kazmi et al. |
| 2018/0035429 A1 | 2/2018 | Jiaqing et al. |
| 2018/0035436 A1 | 2/2018 | Sharma et al. |
| 2018/0035444 A1 | 2/2018 | Wu et al. |
| 2018/0035457 A1 | 2/2018 | Ngo et al. |
| 2018/0035463 A1 | 2/2018 | Mallik et al. |
| 2018/0035465 A1 | 2/2018 | Ahn et al. |
| 2018/0041190 A1 | 2/2018 | Yoshimura et al. |
| 2018/0041314 A1 | 2/2018 | Lin et al. |
| 2018/0041415 A1 | 2/2018 | Nitinawarat et al. |
| 2018/0041981 A1 | 2/2018 | Wu |
| 2018/0041999 A1 | 2/2018 | Jackson et al. |
| 2018/0042012 A1 | 2/2018 | Yerramalli et al. |

(56) References Cited

U.S. PATENT DOCUMENTS

| | | |
|---|---|---|
| 2018/0042018 A1 | 2/2018 | Bhushan et al. |
| 2018/0042065 A1 | 2/2018 | Jackson et al. |
| 2018/0047414 A1 | 2/2018 | Kasilya Sudarsan et al. |
| 2018/0047417 A1 | 2/2018 | Gummadi et al. |
| 2018/0048271 A1 | 2/2018 | Patel et al. |
| 2018/0048293 A1 | 2/2018 | Gathman et al. |
| 2018/0048366 A1 | 2/2018 | Sundararajan et al. |
| 2018/0048403 A1 | 2/2018 | Kim et al. |
| 2018/0048433 A1 | 2/2018 | Martin et al. |
| 2018/0048498 A1 | 2/2018 | Stern-Berkowitz et al. |
| 2018/0048512 A1 | 2/2018 | Zeng et al. |
| 2018/0048572 A1 | 2/2018 | Gulati et al. |
| 2018/0048577 A1 | 2/2018 | Gulati et al. |
| 2018/0048700 A1 | 2/2018 | Gummadi et al. |
| 2018/0049037 A1 | 2/2018 | Lopez-Perez et al. |
| 2018/0049045 A1 | 2/2018 | Wang et al. |
| 2018/0049079 A1 | 2/2018 | Ozturk et al. |
| 2018/0049143 A1 | 2/2018 | Gupta et al. |
| 2018/0049162 A1 | 2/2018 | Patil et al. |
| 2018/0049175 A1 | 2/2018 | Bagheri et al. |
| 2018/0049190 A1 | 2/2018 | Abedini et al. |
| 2018/0049206 A1 | 2/2018 | Yerramalli et al. |
| 2018/0049209 A1 | 2/2018 | Hu et al. |
| 2018/0049220 A1 | 2/2018 | Patil et al. |
| 2018/0049241 A1 | 2/2018 | Heo et al. |
| 2018/0053392 A1 | 2/2018 | White et al. |
| 2018/0053393 A1 | 2/2018 | White et al. |
| 2018/0054276 A1 | 2/2018 | Islam et al. |
| 2018/0054340 A1 | 2/2018 | Rico Alvarino et al. |
| 2018/0054740 A1 | 2/2018 | Furuichi |
| 2018/0054750 A1 | 2/2018 | Lee et al. |
| 2018/0054765 A1 | 2/2018 | Kim et al. |
| 2018/0054767 A1 | 2/2018 | Gholmieh et al. |
| 2018/0054780 A1 | 2/2018 | Radulescu et al. |
| 2018/0054790 A1 | 2/2018 | Islam et al. |
| 2018/0054792 A1 | 2/2018 | Lee et al. |
| 2018/0054797 A1 | 2/2018 | Islam et al. |
| 2018/0054822 A1 | 2/2018 | Kim et al. |
| 2018/0054835 A1 | 2/2018 | Fodor et al. |
| 2018/0054837 A1 | 2/2018 | Islam et al. |
| 2018/0062709 A1 | 3/2018 | Vaze et al. |
| 2018/0062720 A1 | 3/2018 | Islam et al. |
| 2018/0062807 A1 | 3/2018 | Seo et al. |
| 2018/0063031 A1 | 3/2018 | Wloczysiak et al. |
| 2018/0063693 A1 | 3/2018 | Chakraborty et al. |
| 2018/0063728 A1 | 3/2018 | Andreoli-Fang et al. |
| 2018/0063736 A1 | 3/2018 | Sadeghi et al. |
| 2018/0063753 A1 | 3/2018 | Cao et al. |
| 2018/0063754 A1 | 3/2018 | Wang et al. |
| 2018/0063788 A1 | 3/2018 | Yang et al. |
| 2018/0063799 A1 | 3/2018 | Sadek et al. |
| 2018/0063824 A1 | 3/2018 | Kim et al. |
| 2018/0063834 A1 | 3/2018 | Abedini et al. |
| 2018/0063835 A1 | 3/2018 | Abedini et al. |
| 2018/0063868 A1 | 3/2018 | Abedini et al. |
| 2018/0063878 A1 | 3/2018 | Amerga et al. |
| 2018/0069589 A1 | 3/2018 | Liu et al. |
| 2018/0069639 A1 | 3/2018 | Chakraborty et al. |
| 2018/0069653 A1 | 3/2018 | Fujishiro et al. |
| 2018/0069660 A1 | 3/2018 | Yi et al. |
| 2018/0069681 A1 | 3/2018 | Chakraborty et al. |
| 2018/0070243 A1 | 3/2018 | Liu et al. |
| 2018/0070252 A1 | 3/2018 | Gupta et al. |
| 2018/0070280 A1 | 3/2018 | Nittala et al. |
| 2018/0070322 A1 | 3/2018 | Ahn et al. |
| 2018/0070355 A1 | 3/2018 | Wang et al. |
| 2018/0070363 A1 | 3/2018 | Chakraborty et al. |
| 2018/0076662 A1 | 3/2018 | Maheshwari et al. |
| 2018/0077156 A1 | 3/2018 | Ellingson et al. |
| 2018/0077518 A1 | 3/2018 | Nguyen et al. |
| 2018/0077581 A1 | 3/2018 | Ahn et al. |
| 2018/0077724 A1 | 3/2018 | Kim et al. |
| 2018/0077725 A1 | 3/2018 | Sun et al. |
| 2018/0080762 A1 | 3/2018 | Dubost et al. |
| 2018/0082634 A1 | 3/2018 | Wang et al. |
| 2018/0082638 A1 | 3/2018 | Shaeffer et al. |
| 2018/0083684 A1 | 3/2018 | He et al. |
| 2018/0083812 A1 | 3/2018 | Williams |
| 2018/0084395 A1 | 3/2018 | Noor |
| 2018/0084419 A1 | 3/2018 | Sun et al. |
| 2018/0084429 A1 | 3/2018 | Guo et al. |
| 2018/0084432 A1 | 3/2018 | Kwak et al. |
| 2018/0084447 A1 | 3/2018 | Seo et al. |
| 2018/0084487 A1 | 3/2018 | Arumugam et al. |
| 2018/0084518 A1 | 3/2018 | Cattoni et al. |
| 2018/0084540 A1 | 3/2018 | Takeda et al. |
| 2018/0084547 A1 | 3/2018 | Gupta et al. |
| 2018/0084577 A1 | 3/2018 | Li et al. |
| 2018/0084587 A1 | 3/2018 | Noor |
| 2018/0090825 A1 | 3/2018 | Jiang et al. |
| 2018/0090970 A1 | 3/2018 | Radchenko et al. |
| 2018/0091108 A1 | 3/2018 | Zhao et al. |
| 2018/0091264 A1 | 3/2018 | Laselva et al. |
| 2018/0091285 A1 | 3/2018 | Hosseini et al. |
| 2018/0091341 A1 | 3/2018 | Sadiq et al. |
| 2018/0091350 A1 | 3/2018 | Akkarakaran et al. |
| 2018/0091526 A1 | 3/2018 | Cammarota et al. |
| 2018/0091952 A1 | 3/2018 | Sant et al. |
| 2018/0091979 A1 | 3/2018 | Yang et al. |
| 2018/0091994 A1 | 3/2018 | Ozturk et al. |
| 2018/0092109 A1 | 3/2018 | Belghoul et al. |
| 2018/0092128 A1 | 3/2018 | Um et al. |
| 2018/0096174 A1 | 4/2018 | Finger et al. |
| 2018/0097603 A1 | 4/2018 | Lee et al. |
| 2018/0097934 A1 | 4/2018 | Yalamanchili |
| 2018/0097935 A1 | 4/2018 | Yalamanchili |
| 2018/0098223 A1 | 4/2018 | Hugl et al. |
| 2018/0098237 A1 | 4/2018 | Kim et al. |
| 2018/0098317 A1 | 4/2018 | Akkarakaran et al. |
| 2018/0098335 A1 | 4/2018 | Sun et al. |
| 2018/0098336 A1 | 4/2018 | Alpert |
| 2018/0102860 A1 | 4/2018 | Emmanuel et al. |
| 2018/0102887 A1 | 4/2018 | Chen et al. |
| 2018/0102915 A1 | 4/2018 | Rico Alvarino et al. |
| 2018/0102930 A1 | 4/2018 | Wang et al. |
| 2018/0103128 A1 | 4/2018 | Muscariello et al. |
| 2018/0103364 A1 | 4/2018 | Gholmieh et al. |
| 2018/0103458 A1 | 4/2018 | Tooher et al. |
| 2018/0109987 A1 | 4/2018 | Xu et al. |
| 2018/0110032 A1 | 4/2018 | Viorel et al. |
| 2018/0110057 A1 | 4/2018 | Park et al. |
| 2018/0110071 A1 | 4/2018 | Mukherjee et al. |
| 2018/0110072 A1 | 4/2018 | Sabapathi et al. |
| 2018/0110088 A1 | 4/2018 | Zhu et al. |
| 2018/0115305 A1 | 4/2018 | Islam et al. |
| 2018/0115394 A1 | 4/2018 | Harada et al. |
| 2018/0115438 A1 | 4/2018 | Park et al. |
| 2018/0115929 A1 | 4/2018 | Wu |
| 2018/0115933 A1 | 4/2018 | Radulescu et al. |
| 2018/0115964 A1 | 4/2018 | Lin et al. |
| 2018/0115967 A1 | 4/2018 | Ahn et al. |
| 2018/0115975 A1 | 4/2018 | Takeda et al. |
| 2018/0115981 A1 | 4/2018 | Kim et al. |
| 2018/0115991 A1 | 4/2018 | Yang et al. |
| 2018/0115996 A1 | 4/2018 | Si et al. |
| 2018/0123517 A1 | 5/2018 | Kim |
| 2018/0123751 A1 | 5/2018 | Narasimha et al. |
| 2018/0124613 A1 | 5/2018 | Kang et al. |
| 2018/0124622 A1 | 5/2018 | Van Der Velde et al. |
| 2018/0124643 A1 | 5/2018 | Gupta et al. |
| 2018/0124680 A1 | 5/2018 | Dhanda et al. |
| 2018/0124695 A1 | 5/2018 | Gupta et al. |
| 2018/0124711 A1 | 5/2018 | Hosseini et al. |
| 2018/0124749 A1 | 5/2018 | Park et al. |
| 2018/0124790 A1 | 5/2018 | Yenamalli |
| 2018/0124807 A1 | 5/2018 | Smith et al. |
| 2018/0124820 A1 | 5/2018 | Sun et al. |
| 2018/0124828 A1 | 5/2018 | Kim et al. |
| 2018/0124865 A1 | 5/2018 | Lee et al. |
| 2018/0130057 A1 | 5/2018 | Fisher |
| 2018/0131427 A9 | 5/2018 | Nimbalker et al. |
| 2018/0131467 A1 | 5/2018 | Sankar et al. |
| 2018/0131490 A1 | 5/2018 | Patel et al. |
| 2018/0131498 A1 | 5/2018 | Chen et al. |

(56) References Cited

U.S. PATENT DOCUMENTS

| | | |
|---|---|---|
| 2018/0131526 A1 | 5/2018 | Ellingson et al. |
| 2018/0132114 A1 | 5/2018 | Sun et al. |
| 2018/0132137 A1 | 5/2018 | Dai et al. |
| 2018/0132145 A1 | 5/2018 | Cao et al. |
| 2018/0132193 A1 | 5/2018 | Misener et al. |
| 2018/0132228 A1 | 5/2018 | Lan et al. |
| 2018/0132235 A1 | 5/2018 | Hosseini et al. |
| 2018/0132243 A1 | 5/2018 | Yang et al. |
| 2018/0132245 A1 | 5/2018 | Yerramalli et al. |
| 2018/0132259 A1 | 5/2018 | Yi et al. |
| 2018/0132260 A1 | 5/2018 | Harada et al. |
| 2018/0132272 A1 | 5/2018 | Sun et al. |
| 2018/0132288 A1 | 5/2018 | Aguirre et al. |
| 2018/0132292 A1 | 5/2018 | Yang et al. |
| 2018/0136669 A1 | 5/2018 | Turpin et al. |
| 2018/0139020 A1 | 5/2018 | Takeda et al. |
| 2018/0139083 A1 | 5/2018 | Hosseini et al. |
| 2018/0139617 A1 | 5/2018 | Belghoul et al. |
| 2018/0139621 A1 | 5/2018 | Boudreau et al. |
| 2018/0139695 A1 | 5/2018 | Gupta et al. |
| 2018/0139742 A1 | 5/2018 | Sun et al. |
| 2018/0139747 A1 | 5/2018 | Hosseini et al. |
| 2018/0139767 A1 | 5/2018 | Lee et al. |
| 2018/0139770 A1 | 5/2018 | Ozturk et al. |
| 2018/0139772 A1 | 5/2018 | Ozturk et al. |
| 2018/0139775 A1 | 5/2018 | Ahn et al. |
| 2018/0139779 A1 | 5/2018 | Kim et al. |
| 2018/0139780 A1 | 5/2018 | Kang et al. |
| 2018/0145741 A1 | 5/2018 | Zhao et al. |
| 2018/0145805 A1 | 5/2018 | Maaref |
| 2018/0146381 A1 | 5/2018 | Yoo et al. |
| 2018/0146487 A1 | 5/2018 | Zhu |
| 2018/0146488 A1 | 5/2018 | Li et al. |
| 2018/0146498 A1 | 5/2018 | Sahlin et al. |
| 2018/0152267 A1 | 5/2018 | Andreoli-Fang et al. |
| 2018/0152275 A1 | 5/2018 | Cho et al. |
| 2018/0152847 A1 | 5/2018 | Yang et al. |
| 2018/0152848 A1 | 5/2018 | Egner et al. |
| 2018/0152865 A1 | 5/2018 | Atri et al. |
| 2018/0152919 A9 | 5/2018 | Viorel et al. |
| 2018/0152955 A1 | 5/2018 | Park et al. |
| 2018/0152962 A1 | 5/2018 | Lee et al. |
| 2018/0159649 A1 | 6/2018 | Sun et al. |
| 2018/0159915 A1 | 6/2018 | Westphal et al. |
| 2018/0159926 A1 | 6/2018 | Sun et al. |
| 2018/0160348 A1 | 6/2018 | Wu |
| 2018/0160389 A1 | 6/2018 | Yerramalli et al. |
| 2018/0160440 A1 | 6/2018 | Hosseini et al. |
| 2018/0160441 A1 | 6/2018 | Egner et al. |
| 2018/0160447 A1 | 6/2018 | Noh et al. |
| 2018/0160450 A1 | 6/2018 | Sivanesan et al. |
| 2018/0160452 A1 | 6/2018 | Patil et al. |
| 2018/0160458 A1 | 6/2018 | Wu |
| 2018/0161530 A1 | 6/2018 | Ganton et al. |
| 2018/0167040 A1 | 6/2018 | Sayilir et al. |
| 2018/0167155 A1 | 6/2018 | Sun et al. |
| 2018/0167172 A1 | 6/2018 | Hosseini et al. |
| 2018/0167825 A1 | 6/2018 | Egner et al. |
| 2018/0167901 A1 | 6/2018 | Wang et al. |
| 2018/0167911 A1 | 6/2018 | Kota et al. |
| 2018/0167948 A1 | 6/2018 | Egner et al. |
| 2018/0167957 A1 | 6/2018 | Noh et al. |
| 2018/0167968 A1 | 6/2018 | Liu et al. |
| 2018/0167972 A1 | 6/2018 | Egner et al. |
| 2018/0167993 A1 | 6/2018 | Thakkar et al. |
| 2018/0175805 A1 | 6/2018 | Sayilir et al. |
| 2018/0175806 A1 | 6/2018 | Mehrjoo et al. |
| 2018/0176747 A1 | 6/2018 | Li et al. |
| 2018/0176785 A1 | 6/2018 | Chuang |
| 2018/0176791 A1 | 6/2018 | Hedayat et al. |
| 2018/0176792 A1 | 6/2018 | Egner et al. |
| 2018/0176799 A1 | 6/2018 | Lange et al. |
| 2018/0176819 A1 | 6/2018 | Papa et al. |
| 2018/0176890 A1 | 6/2018 | Moon et al. |
| 2018/0176922 A1 | 6/2018 | Li et al. |
| 2018/0176932 A1 | 6/2018 | Karimli et al. |
| 2018/0176948 A1 | 6/2018 | Islam et al. |
| 2018/0176949 A1 | 6/2018 | Islam et al. |
| 2018/0176956 A1 | 6/2018 | Koutsimanis et al. |
| 2018/0183552 A1 | 6/2018 | Hosseini et al. |
| 2018/0183770 A1 | 6/2018 | Wu |
| 2018/0184231 A1 | 6/2018 | Egner et al. |
| 2018/0184303 A1 | 6/2018 | Egner et al. |
| 2018/0184330 A1 | 6/2018 | Egner et al. |
| 2018/0184383 A1 | 6/2018 | Reddy et al. |
| 2018/0184406 A1 | 6/2018 | Yang |
| 2018/0184410 A1 | 6/2018 | John Wilson et al. |
| 2018/0184443 A1 | 6/2018 | Li et al. |
| 2018/0184444 A1 | 6/2018 | Li et al. |
| 2018/0184457 A1 | 6/2018 | Islam et al. |
| 2018/0184459 A1 | 6/2018 | Kim et al. |
| 2018/0189971 A1 | 7/2018 | Hildreth |
| 2018/0191547 A1 | 7/2018 | Mukherjee et al. |
| 2018/0192264 A1 | 7/2018 | Kwok et al. |
| 2018/0192295 A1 | 7/2018 | Mueck et al. |
| 2018/0192340 A1 | 7/2018 | Karimli et al. |
| 2018/0192355 A1 | 7/2018 | Kim et al. |
| 2018/0192370 A1 | 7/2018 | Nam et al. |
| 2018/0192409 A1 | 7/2018 | Yang et al. |
| 2018/0192422 A1 | 7/2018 | Yi et al. |
| 2018/0192437 A1 | 7/2018 | Verma et al. |
| 2018/0192449 A1 | 7/2018 | Mueck et al. |
| 2018/0192921 A1 | 7/2018 | Ganton et al. |
| 2018/0196715 A1 | 7/2018 | Balasubramanian et al. |
| 2018/0197177 A1 | 7/2018 | Lee et al. |
| 2018/0198469 A1 | 7/2018 | Sarkis et al. |
| 2018/0198648 A1 | 7/2018 | Sun et al. |
| 2018/0198660 A1 | 7/2018 | Huang et al. |
| 2018/0198763 A1 | 7/2018 | Bryson et al. |
| 2018/0199157 A1 | 7/2018 | Talluri et al. |
| 2018/0199158 A1 | 7/2018 | Talluri et al. |
| 2018/0199309 A1 | 7/2018 | Islam et al. |
| 2018/0199310 A1 | 7/2018 | Islam et al. |
| 2018/0199353 A1 | 7/2018 | Ahn et al. |
| 2018/0199374 A1 | 7/2018 | Ahn |
| 2018/0199376 A1 | 7/2018 | Kim et al. |
| 2018/0199380 A1 | 7/2018 | Itagaki et al. |
| 2018/0205507 A1 | 7/2018 | John Wilson et al. |
| 2018/0205526 A1 | 7/2018 | Kim et al. |
| 2018/0205585 A1 | 7/2018 | Sadiq et al. |
| 2018/0205764 A1 | 7/2018 | Jeon et al. |
| 2018/0206097 A1 | 7/2018 | Michaud et al. |
| 2018/0206129 A1 | 7/2018 | Choi et al. |
| 2018/0206229 A1 | 7/2018 | Zeng et al. |
| 2018/0211897 A1 | 7/2018 | Yang et al. |
| 2018/0212728 A1 | 7/2018 | Wang et al. |
| 2018/0213386 A1 | 7/2018 | Kim et al. |
| 2018/0213407 A1 | 7/2018 | Miao et al. |
| 2018/0213421 A1 | 7/2018 | Horvitz et al. |
| 2018/0213454 A1 | 7/2018 | Santhanam et al. |
| 2018/0213477 A1 | 7/2018 | John Wilson et al. |
| 2018/0213503 A1 | 7/2018 | Garg |
| 2018/0213512 A1 | 7/2018 | Ryu et al. |
| 2018/0213532 A1 | 7/2018 | Hosseini et al. |
| 2018/0213560 A1 | 7/2018 | Naghshvar et al. |
| 2018/0213562 A1 | 7/2018 | Cierny et al. |
| 2018/0213564 A1 | 7/2018 | Xu et al. |
| 2018/0213571 A1 | 7/2018 | Wang et al. |
| 2018/0213594 A1 | 7/2018 | You et al. |
| 2018/0219599 A1 | 8/2018 | Lee et al. |
| 2018/0219667 A1 | 8/2018 | Zhao et al. |
| 2018/0219711 A1 | 8/2018 | Laporte et al. |
| 2018/0219729 A1 | 8/2018 | Garg et al. |
| 2018/0220257 A1 | 8/2018 | Bhattad et al. |
| 2018/0220269 A1 | 8/2018 | Katakam et al. |
| 2018/0220280 A1 | 8/2018 | Baghel |
| 2018/0220303 A1 | 8/2018 | Futaki |
| 2018/0220323 A1 | 8/2018 | Chen et al. |
| 2018/0220410 A1 | 8/2018 | Baghel et al. |
| 2018/0220420 A1 | 8/2018 | Harada et al. |
| 2018/0220428 A1 | 8/2018 | Sun et al. |
| 2018/0220431 A1 | 8/2018 | Nagaraja et al. |
| 2018/0220434 A1 | 8/2018 | Takeda et al. |
| 2018/0220441 A1 | 8/2018 | Akula et al. |

(56) References Cited

U.S. PATENT DOCUMENTS

| | | |
|---|---|---|
| 2018/0220447 A1 | 8/2018 | Kim et al. |
| 2018/0220451 A1 | 8/2018 | Bhushan et al. |
| 2018/0220457 A1 | 8/2018 | Koorapaty et al. |
| 2018/0220464 A1 | 8/2018 | Wang et al. |
| 2018/0227011 A1 | 8/2018 | Yerramalli et al. |
| 2018/0227074 A1 | 8/2018 | Sun et al. |
| 2018/0227082 A1 | 8/2018 | Harada et al. |
| 2018/0227102 A1 | 8/2018 | John Wilson et al. |
| 2018/0227106 A1 | 8/2018 | Kim et al. |
| 2018/0227302 A1 | 8/2018 | Lee et al. |
| 2018/0227383 A1 | 8/2018 | Vasanthasenan et al. |
| 2018/0227723 A1 | 8/2018 | Takahashi et al. |
| 2018/0227767 A1 | 8/2018 | Yamazaki et al. |
| 2018/0227802 A1 | 8/2018 | Lehmann et al. |
| 2018/0227848 A1 | 8/2018 | Lee et al. |
| 2018/0227878 A1 | 8/2018 | Lashkarian et al. |
| 2018/0227908 A1 | 8/2018 | Wang et al. |
| 2018/0227912 A1 | 8/2018 | Chen et al. |
| 2018/0227936 A1 | 8/2018 | Yerramalli et al. |
| 2018/0227944 A1 | 8/2018 | Yerramalli et al. |
| 2018/0234140 A1 | 8/2018 | Chen et al. |
| 2018/0234524 A1 | 8/2018 | Cheng et al. |
| 2018/0234857 A1 | 8/2018 | Morioka |
| 2018/0234863 A1 | 8/2018 | Li et al. |
| 2018/0234870 A1 | 8/2018 | Lee et al. |
| 2018/0234871 A1 | 8/2018 | Ahn et al. |
| 2018/0234886 A1 | 8/2018 | Bhorkar et al. |
| 2018/0234960 A1 | 8/2018 | Nagaraja et al. |
| 2018/0234965 A1 | 8/2018 | Ahn et al. |
| 2018/0234974 A1 | 8/2018 | Ngo et al. |
| 2018/0235005 A1 | 8/2018 | Ansari et al. |
| 2018/0235008 A1 | 8/2018 | Park et al. |
| 2018/0235010 A1 | 8/2018 | Harada et al. |
| 2018/0235020 A1 | 8/2018 | Maaref |
| 2018/0239425 A1 | 8/2018 | Jang |
| 2018/0239754 A1 | 8/2018 | Chung et al. |
| 2018/0241453 A1 | 8/2018 | Lee et al. |
| 2018/0241486 A1 | 8/2018 | Heo et al. |
| 2018/0241494 A1 | 8/2018 | Chendamarai Kannan et al. |
| 2018/0241511 A1 | 8/2018 | Harada et al. |
| 2018/0241526 A1 | 8/2018 | Chendamarai Kannan et al. |
| 2018/0241588 A1 | 8/2018 | Harada et al. |
| 2018/0241602 A1 | 8/2018 | Bhorkar et al. |
| 2018/0241626 A1 | 8/2018 | Kumar et al. |
| 2018/0241669 A1 | 8/2018 | Muscariello et al. |
| 2018/0241679 A1 | 8/2018 | Muscariello et al. |
| 2018/0242159 A1 | 8/2018 | Lundborg |
| 2018/0242182 A1 | 8/2018 | Rashid et al. |
| 2018/0242186 A1 | 8/2018 | Muscariello et al. |
| 2018/0242218 A1 | 8/2018 | Muscariello et al. |
| 2018/0242232 A1 | 8/2018 | Chendamarai Kannan et al. |
| 2018/0242276 A1 | 8/2018 | Patel et al. |
| 2018/0242319 A1 | 8/2018 | Akkarakaran et al. |
| 2018/0242328 A1 | 8/2018 | Chen et al. |
| 2018/0242340 A1 | 8/2018 | Pu et al. |
| 2018/0242360 A1 | 8/2018 | Noh et al. |
| 2018/0242364 A1 | 8/2018 | Park et al. |
| 2018/0242374 A1 | 8/2018 | Harada et al. |
| 2018/0246508 A1 | 8/2018 | Choi et al. |
| 2018/0248983 A1 | 8/2018 | Mohebbi et al. |
| 2018/0249303 A1 | 8/2018 | Li et al. |
| 2018/0249339 A1 | 8/2018 | Noh et al. |
| 2018/0249469 A1 | 8/2018 | Park et al. |
| 2018/0249484 A1 | 8/2018 | Kim et al. |
| 2018/0249496 A1 | 8/2018 | Radulescu et al. |
| 2018/0249497 A1 | 8/2018 | Noh et al. |
| 2018/0249499 A1 | 8/2018 | Kim et al. |
| 2018/0249526 A1 | 8/2018 | Nagaraja et al. |

* cited by examiner

EMM = Evolved Mobility Management, a NAS level protocol used for UE authentication

UE Initiated Detach

MME Initiated Detach

Active to Idle Transition

Network Initiated Idle to Active Transition

LONG TERM EVOLUTION-PRIMARY WIFI (LTE-PW)

CROSS REFERENCE TO RELATED APPLICATIONS

The present application is a non-provisional of, and claims benefit of priority under 35 U.S.C. § 119(e) from U.S. Provisional Patent Application No. 62/385,647, filed Sep. 9, 2016, and U.S. Provisional Patent Application No. 62/356,951, filed Jun. 30, 2016, each of which is expressly incorporated herein by reference in its entirety.

BACKGROUND OF THE INVENTION

Wi-Fi and other technologies that operate on unlicensed and/or lite-licensed spectrum such as Citizens Broadband Radio (3.5 GHz Band, see FCC Rulemaking 12-354) has advantages over legacy designed licensed cellular networks when operating a facilities based network including: cost and ability to utilize spectrum nationwide; reduced infrastructure costs (e.g. inexpensive and highly flexible access points vs. expensive stationary cellular towers and proprietary radio access network equipment); more flexible design criteria and superior data speed when in close range when compared to legacy cellular technology. Wi-Fi and other unlicensed or lite-licensed use in supporting what have been traditionally primary cellular devices, called mobile stations, is thus positioned to disrupt an industry that is ripe for change. As used herein, it is understood that unless particular features of the IEEE-802.11 family of standards are being exploited, that reference to WiFi also contemplates use of other wireless radio frequency, infrared, and optical digital communication technologies.

Wi-Fi is growing fast. U.S. consumers are near some type of Wi-Fi more than 80% of the time they connect to the Internet on a mobile device. Global hotspots have grown to over 7.1 million in 2015 from 4.2 million in 2013. Initiatives like CableWiFi and Hotspot 2.0 are making Wi-Fi more readily available and easier to connect to. Further, operating systems such as current Android, CyanogenMod and Apple IOS supporting smartphones are now designed to, with carrier permission settings on the device, use data connectivity for voice, SMS and MMS thus allowing Wi-Fi to replace the primary need for legacy licensed network infrastructure to be used to support mobile stations.

Wi-Fi First refers to the operation of a mobile network where mobile stations use a managed Wi-Fi network or other unlicensed or lite-licensed network protocol as the primary network for talk, text and data, and only use expensive cellular networks to fill the gaps. This type of service aligns much more closely to consumer behavior and enables disruptive business models which are poised to change the wireless industry forever. Wi-Fi First also positions the multi-service operators (MSOs) and existing campus and enterprise networks to play a significant role in the future design, sales, servicing and deployment of mobile stations, whereas today they are largely being pushed aside by the large Mobile Network Operators ("MNO") via business practices designed to limit market entry and innovation when large MNOs utilize unlicensed and lite-licensed spectrum. The large MNO's support an alternative technology described as LTE-U which, as a prerequisite for deployment and use, requires the concurrent use of a licensed network along-side an unlicensed network, and also removes management and control of the unlicensed spectrum and its supported applications when using a mobile station from the MSO and/or campus/enterprise networks.

Unlike LTE-U, LTE-PW or WiFi First managed networks permissively share control of LTE capable mobile stations with the MSO and or campus enterprise network, thereby creating a more valuable service and network.

Two equations can be used to quantify in mathematical terms the total utility or societal value of interconnected networks based on a concept commonly described as "Network Effects." The first is called "Metcalf's Law" and the second is "Reed's law."

Robert Metcalf was the first to describe a "Network Effect." He theorized that that each added Node ("n") to a network becomes more valuable. Metcalfe's law states that the value of a network is proportional to the square of the number of connected users of the system, thus a network becomes far more valuable from a societal vantage point as it gets larger, approximating $n^2$. Whether the exponent is two is not critical; it generally accepted that the value of communication node as a result of connection to a communications network does not decrease, and the value and functionality of the network increases at least as the reach of the network increases.

David Reed followed up by asserting that Metcalf's expression was correct in concept, but it undervalued the aggregate network by not capturing the value from what are known as Group Forming Networks. Reed theorized that each "n" is not just part of one network; it is in fact part of multiple different groups of subnetworks within the larger whole, and the value is represented by the sum value of all these subgroups within the whole. Therefore, the whole far exceeds the value calculated by Metcalf. One way to think about a Group Forming Network is having a node on the larger network "join" with other nodes on the network that have a common interest. The mathematical expression of Reed's Law is $2^n$.

The primary difference in the Network Effect is that Metcalf's law scales quadratically, but Reed's scales exponentially. The advent of Social Networks (Facebook) and Business Networks (LinkedIn) networks within the larger "Internet" (which has always been known as a "network of networks") have basically proven Reed's extension. Reed's extension means that while D is functionally zero for two node-networks, D is on the order of $10^{30}$ for just 100 nodes. For a realistic N, the number is truly astronomical. That is why, despite the intuitive nature of the postulates behind Metcalf and Reed, some still dismiss the idea that simply adding a single N to an existing network can double (or increase the exponent of) the value of the "Network" as a whole.

The principal criticism is that they assume that each N leads to equal value and benefit when that is not true. The mathematical equations measure potential contact but the greatest social utility comes from actual contact rather than mere potential contact. Some users may not be present on the network or able to navigate the process when communication seeks them or they want to make contact. Some users may not have desired content. Some users' Nodes may not have adequate bandwidth to the network. Some networks may be cost prohibitive to the point that the cost of adding the node outweighs the value added by that node. In addition, a single added "node" may not have a one-to-one relationship with each user. For example one FAX machine may serve 50 workers, while the second one serves 25 and the fourth one only 12, with the result that an additional FAX connection will correspond to a wide variety of user groups and thus contacts. Likewise, in social networks, if users that join later use the network less than early adopters, then the benefit of each additional user may lessen, making the overall network less efficient if costs per users are fixed. Finally, some argue that both Reed's Law and Metcalfe's Law overstate network value because they fail to account for the restrictive impact of human cognitive limits on network formation which implies a limit on the number of inbound and outbound connections a human in a group-forming network can manage, with the result that the actual maximum-value structure is much sparser than the set-of-subsets measured by Reed's law or the complete graph measured by Metcalfe's Law.

Most of these arguments reduce to a point regarding the relative inefficiency (e) of the "Node" or the network(s). Reduced to its mathematical properties by assuming inefficient users and networks are a combined "e"; a revised Metcalf's Law reads (N−e)*(N−e−1), and a revised Reed's Law $2^{n-e}$.

Over the last decade, many of these anecdotally described "nodal" inefficiencies of the "nodes" have been and are being overcome by technology advancements. For example, Google greatly assists the ability of any ordinary person to become a network whiz in locating other nodes. From a network perspective, Google, and many other user friendly focused software and hardware companies are node amplifiers that elevate the ordinary person from only being able to receive and send email to a selected few to being able to surf (web-aided by Google), watch (Netflix), add content (YouTube), conduct commerce (E-Bay, Amazon, etc.), and communicate (Skype) as a fully functioning node. This clearly has the effect of reducing the "negative value" of "e" when applying to the Metcalf concept. More importantly, these advancements also move the value of the "Internet" to the Reed model, by enabling the edge to self-form and self-identify the sub-groups it wishes to join. The easier a user can join groups, form groups, and manage additions to its group, the more group forming a network becomes, and thus the more value it represents.

As these self-forming networks evolve and become more sophisticated, they begin to replace the original applications for which the original network was built and designed. For example, VoIP has replaced landline phone, video streaming has replaced network and cable TV. But they evolve as well. "Video" was originally one-to-many broadcast but is now increasingly many-to-many (e.g., YouTube). On the other hand, in order to be able to conduct voice conversations a user had to have a publicly-available telephone number within the global numbering system and as a consequence the user was able to reach and be reached by the entire universe of people on the world-wide public switched network that used the global numbering system. Many of the relatively recent "group" networks on the Internet, however, do not directly address using the global IP and domain name system. They employ higher-layer addresses (like a Skype ID or an internal LinkedIn ID or Facebook Username) to directly communicate—with the result that the group becomes more insular and resides within something akin to a walled garden. The latter outcomes attenuate the friction reduction to "e" and once again reduce the network effects.

A device or node must first connect to a host network before it can potentially access the full functionality of the Internet, or, more often, access to a sub-group network of the Internet. Since they functionally serve as a bottleneck last mile access network providers can and do often try to exercise considerable control over what users can do.

Some network providers also impose restrictions and/or costs on the users of the network that also serve to limit total network utility and therefore value. In response, some national or multi-national regulators have responded to these efforts by the legacy network service providers efforts to shape the evolution through limits or rationing how Internet applications and devices can be used. For example, the FCC's Net Neutrality Rules implemented a policy that preserves users' and edge providers' ability to self-form and self-identify associational groups. In essence, the FCC recognized that an "Edge Controlled" network has a far greater public utility than a centrally controlled network of the resulting "virtuous cycle" of innovation and use and then value creation without needing to obtain permission from the entity providing last mile network access and who has the most incentive and ability to deny permission until the edge shares some of the resulting added value with the last mile provider. The FCC imposed rules mandating mostly "neutral" management of the Internet access portion, with the result that the access provider judge or prioritize individual specific uses of the network over others in order to capture pecuniary gains over and above the simple cost of providing network access and fulfilling basic network demand.

"Net neutrality" rules reduce the incentive for broadband networks to increase their intelligence in the core of the network and apply a type of created resistance to, or interference with, access to and through their network. In the network build-out model prior to FCC Net Neutrality, this purposeful injection of rules could be described as an internet "$\Omega$", leading to a network value of $2^{n-\Omega}$ according to the Metcalf analysis. In this model a large network provider would insert a measure of control and resistance technically outside of the Edge's control, reducing the value of the Internet to the Edge.

Prior to Net Neutrality, the business plan of many large network operators was to sell back the $\Omega$ to the certain applications, making those applications more valuable at the "Edge." An Example would be in prioritizing the "Netflix" video stream over a "Hulu" video stream. In essence the network provider would create a type of scarcity and then charge to have the scarcity removed.

For the last several years technologies such as "deep packet inspection" (DPI)—when modified and used within the packet "core" of a network through what is known as "Policy and Charging Rules Function" (PCRF)—have been deployed in choke points in the various networks. This is particularly so with regard to Mobile Broadband Providers (MBPs), who have gone the farthest with implementing DPI-based control, and who also have relief or exemptions from many of the so called "Net Neutrality" rules imposed by the FCC. Data is collected by the MBP at these choke points and that then allow the MBP to become application and service aware in order for the MBP to be able to manage the delivery of some services through prioritization over other services and applications in return for payments.

The MBP's focus on control and management of the network coupled with the expectation of ration-based toll points at the location where resource demand is greater than supply reinforces the natural incentive a company with market power has to ration rather than increase available supply at the choke point because the net profit is higher than would be obtained if supply is increased but the price is allowed to go toward incremental cost.

While the FCC's net neutrality rules now make many business plans that rely on choke point rationing far more difficult, the MBPs' response, however, has not been quite what the FCC desired. Rather than move to open networks and price for only access and demand the major providers have begun to consolidate through mergers or teaming and through attempts to control what has been termed the "Eco-System" additional controls or types of the a From a technical perspective they have found ways to push "Ω" out from just the core more towards the edge while still finding new ways to implement rationing and differential charges based on application or service, or the group forming network that is being used. This is most obvious from the MBPs' industry-wide cooperative creation and implementation of what are known as "LTE-U" and LTE-LAA," and the some specific network outcomes of the recently announced "5G" initiatives coupled with access and use limitations written into software that controls mobile stations' ability to freely switch from fully-licensed to quasi-licensed or unlicensed spectrum when using data-based services and applications, including voice and many of the freshly imagined M2M and IoT applications. The plain goal is the re-imposition of scarcity for network resources even though, in reality, abundant network resources exist. The scarcity is, however, artificial since there are alternative network resources available that could be easily accessed if the MBPs' cartel-like standards-based or software restrictions can be avoided or removed.

The new scarcity takes many forms. Some network access design requires software on the phone to favor using Cell Towers instead of smaller Nodes or non MBP operated distributed antenna systems of femtocells. So called voluntary industry groups try to establish and enforce geographic licensing restrictions in order to use a technology (which is the case for LTE-U and LTE-LAA). The larger providers require device manufacturers through unique "certification" processes to limit the device's functions through customizations in the OS (even though the hardware and software often still technically resides in the device to enable unlicensed use). Devices are often tied to individual providers—each with their own self-imposed limits that in many instances survive unlocking and porting requirements that may have been imposed by regulators. The larger MNOs use similar scarcity based pricing models for applications and bandwidth for both retail and wholesale relationships through adhesion-based business practices. Compatible use of unlicensed spectrum is not only tied to and only works with concurrent use of licensed spectrum under the current LTE-U and LTE-LAA designs, but also prohibits and/or interferes with the actual network management of the unlicensed spectrum by the MSO, campus or enterprise network when a competing small MNO uses the unlicensed network. So called efforts attempting to impose "listen before talk" techniques do not actually address the fact that the network control of the unlicensed spectrum is being tied to the licensed network management, it only reduces the incidents of encroachment. All of these restrictions contribute to creating artificial restrictions on access between a mobile station and another edge point or node via control asserted by the access network host.

The FCC's net neutrality rules have led to additional unintended consequences. While they prohibit some DPI/PCRF network management for express gain, the FCC has unintentionally dampened investment in the ability for groups to "manage" their own network resources via coordinated access between the core, the network nodes and the mobile station. When artfully managed with DPI and PCRF type functions data, voice, video and texting can be fully enabled and allowed to become more flexible and more valuable through a direct and cooperative grant of delegation and control to the individual sub-groups who can then co-manage their own sub-networks and the devices attached to that sub-network.

LTE is powerful. When the 3GPP began to document its goals for LTE it stated:

"The following are the main objectives for LTE:
Increased downlink and uplink peak data rates.
Scalable bandwidth
Improved spectral efficiency
All IP network
A standard's based interface that can support a multitude of user types.

LTE networks are intended to bridge the functional data exchange gap between very high data rate fixed wireless Local Area Networks (LAN) and very high mobility cellular networks."

However, the current wielding of some LTE initiatives such as the LTE-U initiative appears to change the original purpose of LTE to instead design a use that allows imposition of scarcity. LTE can maintain spectrum dependence for some use cases, but it can also encourage and allow spectrum flexibility if the operator of the core chooses to fully adopt the open network principles and policies behind the FCC's net neutrality rules and again re-embraces the original intent of LTE, namely "to bridge the functional data exchange gap between very high data rate Local Area Networks (LAN) and very high mobility cellular networks."

FIG. 6A shows a prior art Evolved Packet System LTE system diagram.

The Evolved Packet System (EPS) contains following network elements:

UE: The User Equipment.

Evolved UTRAN (eNodeB): The eNodeB supports the LTE air interface and includes following functions:

Functions for Radio Resource Management: Radio Bearer Control, Radio Admission Control, Connection Mobility Control, Dynamic allocation of resources to UEs in both uplink and downlink (scheduling);

Selection of an mobility management entity (MME) at UE attachment when no routing to an MME can be determined from the information provided by the UE;

Routing of User Plane data towards Serving Gateway;

Scheduling and transmission of paging messages (originated from the MME);

Scheduling and transmission of broadcast information (originated from the MME or O&M);

Measurement and measurement reporting configuration for mobility and scheduling.

Mobility Management Entity (MME): The MME manages mobility, UE identities and security parameters. It includes following functions:

Non Access Stratum (NAS) signaling and security;
Idle mode UE reachability (including control and execution of paging retransmission);
Tracking Area list management (for UE in idle and active mode);
PDN GW and Serving GW selection;
MME selection for handovers with MME change;
Roaming; (terminating S6a towards home HSS)
Authentication;
Bearer management functions including dedicated bearer establishment.

Serving Gateway (SGW): The Serving Gateway is the node that terminates the interface towards EUTRAN. For each UE associated with the EPS, at a given point of time, there is one single Serving Gateway. Functions include:

Packet Routing and Forwarding

The local Mobility Anchor point for inter-eNB handover;

E-UTRAN idle mode downlink packet buffering and initiation of network triggered service request procedure;

E-UTRAN idle mode downlink packet buffering and initiation of network triggered service request procedure;

Accounting on user and QoS Class Identifier (QCI) granularity for inter-operator charging;

UL and DL charging per UE, PDN, and QCI.

End marker handling

Packet Filtering with TFT

PDN Gateway (PGW): The PGW is the node that terminates the SGi interface towards the PDN. If a UE is accessing multiple PDNs, there may be more than one PGW for that UE. The PGW provides connectivity to the UE to external packet data networks by being the point of exit and entry of traffic for the UE. The PGW performs policy enforcement, packet filtering for each user, charging support, lawful Interception and packet screening. PDN GW functions include:

Mobility anchor for mobility between 3GPP access systems and non-3GPP access systems. This is sometimes referred to as the SAE Anchor function.

Policy enforcement (gating and rate enforcement)

Per-user based packet filtering (by e.g. deep packet inspection) Charging support Lawful Interception (out of scope for phase 4) UE IP address allocation Packet screening Transport level packet marking in the downlink;

DL rate enforcement based on APN Aggregate Maximum Bit Rate (APN-AMBR)

PCRF: PCRF is the policy and charging control element. PCRF functions include:

Policy (QoS and gating) control

Charging control

In non-roaming scenario, there is only a single PCRF in the HPLMN associated with one UE's IP-CAN session. The PCRF terminates the Gx, Gxc and Gxa interfaces.

Evolved Packet System (EPS) contains following network elements:

S1-C: Reference point for the control plane protocol between E-UTRAN and MME.

S1-U: Reference point between E-UTRAN and Serving GW for the per bearer user plane tunnelling and inter eNodeB path switching during handover.

S5: It provides user plane tunneling and tunnel management between Serving GW and PDN GW. It is used for Serving GW relocation due to UE mobility and if the Serving GW needs to connect to a non-collocated PDN GW for the required PDN connectivity.

S6a: It enables transfer of subscription and authentication data for authenticating/authorizing user access to the evolved system (AAA interface) between MME and HSS.

Gx: It provides transfer of (QoS) policy and charging rules from PCRF to Policy and Charging Enforcement Function (PCEF) in the PDN GW. The interface is based on the Gx interface.

Gxa It provides transfer of (QoS) policy information from PCRF to the Trusted Non-3GPP accesses.

Gxc It provides transfer of (QoS) policy information from PCRF to the Serving Gateway S9: It provides transfer of (QoS) policy and charging control information between the Home PCRF and the Visited PCRF in order to support local breakout function.

S10: Reference point between MMEs for MME relocation and MME to MME information transfer.

S11: Reference point between MME and Serving GW

SGi: It is the reference point between the PDN GW and the packet data network. Packet data network may be an operator external public or private packet data network or an intra operator packet data network, e.g. for provision of IP Multimedia subsystem (IMS) services. This reference point corresponds to Gi for 3GPP accesses.

X2 The X2 reference point resides between the source and target eNodeB.

FIG. 5 shows a prior art state transition diagram for user equipment. Upon power on, the enterprise mobility management (EMM) state is deregistered, the radio resource control (RCC) is in idle mode, the UE location is unknown, the mobility mode is based on the public land mobile network (PLMN) cell selection, and data communication is off. After registration and bearer setup, the EMM is registered, the RCC is connected, the UE location is E-Node B, the mobility mode is in a handover mode, and data communication is on. After data inactivity, the the mobile terminal remains registered, the RCC is in idle mode, the UE location is based on a TA list, the mobility mode is in cell reselection mode, and data communication is in standby. Data activity reverts the mobile communication device to Active UL/DL data mode.

FIG. 7 shows a prior art LTE initial call setup diagram.

System Acquisition: UE performs frequency synchronization and reads MIB/SIBs from PBCH to acquire system information. It then camps on the most suitable cell.

RRC Connection Setup: The UE and eNodeB exchange signaling to set up an RRC connection. The UE then sends RRC Connection Setup Complete message to the eNodeB.

Attach Request: The UE includes in the ATTACH REQUEST message a valid GUTI together with the last visited registered TAI, if available. If there is no valid GUTI available, the UE shall include the International Mobile Subscriber Identity (IMSI) in the ATTACH REQUEST message.

eNodeB forwards the Attach Request message (including: Message Type, eNB UE ID, TAI, CGI etc.) to the MME.

Identity Procedure: In the case of the first Attach, MME sends an Identity Request to the UE. Identity procedure is required only if attach request contains GUTI/last-TAI and the TAI is not local to MME The UE responds with Identity Response including Mobile Identity that is set to IMSI.

Authentication/Security: In case of initial attach when there is no UE context on the network, authentication is performed. The MME sends an Authentication Information Request to the HSS and receives an Authentication Information Answer which is used to send Authentication Request to the UE. Authentication procedure is optional. UE then sends an Authentication Response to the MME Update Location Request: The MME sends the Update Location Request including the IMSI. The HSS replies with Update Location Answer. Subscription Data shall be present when the Result is Success.

Create Session Request: The MME sends a Create Session Request to SGW which is followed by confirmation.

Initial Context Setup Request/Attach Accept: Attach Accept is sent as NAS PDU in the Initial Context Setup (Message Type, E-RAB ID, QoS parameters, Transport Layer Address, NAS-PDU, UE Security Capabilities, Security key) from MME to eNodeB.

Attach Accept message contains new GUTI if the attach request contained IMSI or foreign/non-local GUTI. This completes Attach Request.

Security procedure and UE Capability exchange is then performed.

RRC Connection Re-configuration: The eNodeB sends the RRC Connection Reconfiguration message including the EPS Radio Bearer Identity to the UE, and the Attach Accept message to the UE. The APN is provided to the UE for which the activated default bearer is associated.

Initial Context Setup Response: The eNodeB sends Initial Context Setup Response to the MME Uplink Information Transfer: The UE sends an Uplink Information Transfer message. This message includes the Attach Complete message for MME Attach Complete: eNodeB encapsulates the Attach Complete message and transfers it to MME.

Modify Bearer Message: One receiving both Context Setup Response and Attach Complete, the MME sends a Modify Bearer Request to SGW. SGW sends the response and starts sending the DL packets.

FIG. 8 shows a prior art LTE initiated UE detach diagram.

UE can be detached either from Idle or Connected mode. If it is Idle, RRC connection setup is completed before detach message.

UE sends Detach Request message to MME which responds with confirmation after exchanging Delete Session messages with SGW.

FIG. 9 shows a prior art LTE initial call MME initiated detach diagram.

Delete session request can be send when UE is in Idle or Connected mode. If a UE is in Idle mode, it may be paged. MME exchanges Delete Session messages with SGW. Detach request is conditional on successful page to the UE.

FIG. 10 shows a prior art LTE active to idle mode transition diagram.

User inactivity is detected based on parameter settings (Inactivity timer). eNB requests MME to release the UE Context. MME then informs SGW that UE is no longer available for DL traffic by sending Modify Bearer Request message. After getting the response from SGW, MME sends Context Release command to eNB. After responding to MME, eNB releases RRC Connection.

FIG. 11 shows a prior art LTE Network Initiated Idle to Active Transition diagram.

Incoming data from PGW is forwarded to SGW which notifies MME be sending Downlink data notification. After acknowledgement MME pages all eNBs in the TA by sending the Paging message to these eNBs. The eNBs pages the UE in all cells in the TA.

If the UE receives the page, it responds by initiating the UE Triggered Connection Re-activation.

FIG. 12 shows a prior art LTE UE Initiated Service Request diagram.

UE reads the system information broadcast in the cell and performs DL/UL synchronization.

UE then requests RRC Connection setup. Once completed, eNB then forwards NAS Service Request in Initial UE Message to MME. MME then carries out Authentication process (optional) and requests eNB to establish the S1 UE context. eNB then activates security functions.

Later Radio Bearers are setup to support EPS bearers in RRC Connection Reconfiguration messages.

After successfully establishing the bearers, eNB responds to the MME with Initial Context Setup Response MME then sends Modify Bearer Request to update SGW with IP address etc. for the DL of the user plane.

FIG. 13 shows a prior art LTE S1 Based Inter eNodeB Handover diagram.

Based on UE reports, source eNB decides to initiate S1-based handover to target eNB if there is no X2 connectivity to target eNB.

eNB sends Handover Required (handover type, target Id, cause etc.) message to MME.

MME verifies that source SGW can continue to serve UE and sends Handover Request message to target eNB.

Admission Control is performed by target eNB and target eNB configured the required resources according to the received E-RAB QoS information.

Target eNB sends Handover Request Acknowledge message to MME.

If indirect forwarding applies MME sets up Create Indirect Data Forwarding Tunnel Request to SGW. SGW responds with confirmation.

MME sends HO command (Handover Type, ERABs forwarding (optional) etc.) message to source eNB.

Source eNB sends RRC Connection Reconfiguration message to UE with necessary parameters (target eNB security algorithm, SIBs etc.).

Source eNB sends Status Transfer message via MME to target eNB regarding downlink and uplink transmitter status.

Once UE successfully synchronizes to the target cell, it sends an RRC Connection Reconfiguration Complete message to target eNB. DL packets forwarded from source eNB can be sent to the UE. Also uplink packets can be sent from UE, which are forwarded to SGW.

Target eNB sends Handover Notify message to target MME. MME starts a timer to supervise when resources in Source eNB and data forwarding resources in SGW shall be released.

MME sends Modify Bearer Request (Bearers contexts to be removed, bearers need to be deactivated, etc.) message to SGW.

SGW sends "end marker" packet to source eNB and then releases resources towards it. Once "end marker" reaches target eNB, SGW can start sending DL payload data coming from PGW. It also sends Modify Bearer Response message to MME.

FIG. 14 shows a prior art LTE X2 Based Inter eNodeB Handover diagram.

Source eNB uses X2 interface to initiate handover with target eNB. Process is somewhat similar to S1 based handover with difference that Handover request, data forwarding, End marker messages etc. are exchanged over X2 interface directly between Source and Target eNBs.

The following references are expressly incorporated herein by reference in their entirety: U.S. Pat. Nos. 7,440,472; 7,492,266; 7,738,488; 7,945,477; 7,995,728; 8,005,114; 8,019,289; 8,023,931; 8,027,335; 8,027,444; 8,027,456; 8,050,627; 8,073,400; 8,073,401; 8,078,119; 8,135,355; 8,140,025; 8,175,541; 8,265,567; 8,265,589; 8,295,851; 8,301,084; 8,325,632; 8,405,471; 8,417,286; 8,445,826; 8,467,738; 8,472,462; 8,503,340; 8,559,369; 8,565,793; 8,601,146; 8,611,893; 8,630,637; 8,649,739; 8,649,830; 8,669,903; 8,682,729; 8,744,537; 8,811,187; 8,819,219; 8,831,694; 8,880,047; 8,903,381; 8,904,017; 8,971,898; 8,983,497; 8,989,825; 9,042,306; 9,093,967; 9,100,384; 9,100,494; 9,125,065; 9,137,171; 9,143,184; 9,175,967; 9,178,991; 9,202,244; 9,210,728; 9,219,525; 9,231,680; 9,253,333; 9,280,978; 9,294,609; 9,307,449; 9,319,943; 9,326,208; 9,350,770; 9,351,255; 9,386,057; 9,386,615; 9,392,508; 9,408,067; 9,408,177; 9,420,089; 9,509,853; 9,516,688; 9,529,761; 9,553,913; 9,560,579; 9,628,521; 9,638,537; 20040068441; 20050030224; 20050080718; 20050249196; 20050286452; 20060019659; 20060111112; 20060294245; 20070032225; 20070198748;

20070252695; 20080096553; 20080146155; 20080146156; 20080146172; 20080205414; 20080207184; 20080214143; 20080254845; 20090286534; 20090296671; 20090296672; 20090296673; 20100067546; 20100251331; 20100296441; 20100296466; 20110106958; 20110131337; 20110153818; 20110173092; 20110202645; 20110221544; 20120040606; 20120112964; 20120278199; 20120302203; 20130044603; 20130079011; 20130115972; 20130155849; 20130155851; 20130155965; 20130198642; 20130210472; 20130238994; 20130262122; 20140086101; 20140113623; 20140136601; 20140185581; 20140247740; 20140286308; 20140324952; 20140362729; 20150024781; 20150026008; 20150065110; 20150071229; 20150079982; 20150141043; 20150146799; 20150155891; 20150163811; 20150168174; 20150168175; 20150172986; 20150177010; 20150201358; 20150241231; 20150242353; 20150249639; 20150271849; 20150281691; 20150282013; 20150288734; 20150293592; 20150304262; 20150350290; 20150350598; 20150365989; 20160021487; 20160044065; 20160080433; 20160088642; 20160095130; 20160103201; 20160112096; 20160127989; 20160142447; 20160156783; 20160157162; 20160157173; 20160183131; 20160183313; 20160216130; 20160226923; 20160255664; 20160261904; 20160269460; 20160291665; 20160309309; 20160334837; 20160337279; 20160345284; 20160358394; 20160360556; 20160366623; 20160373944; 20160381536; 20170004665; 20170019291; 20170019315; 20170041803; 20170069963; 20170094535; 20170094574; 20170099198; 20170099338; 20170105193; 20170139485; 20170141463; 20170149846; 20170164195; 20170169833; 20170171783; and 20170181213.

SUMMARY OF THE INVENTION

The present technology provides systems and methods for WiFi-First voice, SMS, MMS and data service on cellphones and other mobile stations, and more generally to systems and methods which provide wireless network voice, SMS, MMS and data communications using unlicensed and lite-licensed radios combined with Internet technologies that allow for network growth and design in cooperation with and co-managed with user groups who can add, with permission from the WiFi First MNO, campus or enterprise (herein called the "sub-group") co-managed facilities based networks.

When a wireless device joins a local area network (LAN) established by a wireless access point, it is assigned an Internet Protocol (IP) address by which that device is identified within the local area network. Communications from the device pass through a network address translation (NAT) by which the address assigned or maintained by the LAN is translated into a public IP address which designates the LAN in general. Devices on LANs typically do not have public IP addresses, though in the case where this is supported, the system is preferably compatible with this option as well. The device, with the translated public IP address, communicates with the communication server to establish a voice call. A key distinction between a voice call and data communications is that in a voice call, latency must be tightly controlled to ensure quality. The device, in addition to the LAN IP address, which may change, for example when the device hands-off to another LAN, maintains a universal identifier, such as its telephone number, IMEI, or other unique information. The communications server therefore inspects packets not only for their IP address information, which is important for maintaining connections under conditions of low mobility, but also the identification code, in case the IP address for the device is changed during the communication session. If a device leaves one network and joins another, it sends a packet to the server identifying its new address information, to permit inbound calling.

As an option, when the device is not as member of a LAN, or where a user overrides the WiFi-First protocol, the device may connect to the communication server through a data connection or a regular cellular voice connection. Typically, for seamless transitions between WiFi and cellular networks, data connections are preferred; however, seamless handoff between cellular voice and WiFi-First modes is also possible.

It is noted that the system architecture also permits simultaneous voice and data connections, cellular and WiFi communications, and communications through competing cellular, WiFi, or other networks. The technology therefore has two distinct aspects: management of the communications so that rules, limitations, or preferences are respected; and maintained voice communications during various types of network transitions.

Instead of purposefully designing software and technology that limits and controls the edge, as is the case in current cellular carrier networks and current LTE-U initiative, the present technology explicitly allows and is designed to extend a type of joint control to the sub-group. The intended result is to turn what is designed by oligopoly carriers to create scarcity through a negative "$\Omega$" into a positive "$\Omega$" Thus when using the present technology and services, the intended network effect will go from $2^{n-\Omega}$ to $2^{n+\Omega}$.

The present technology aims to eliminate the forced scarcity presently imposed on users and mobile stations by permitting all potential un-licensed and lite-licensed wireless networks and their mangers to fully access and control their nodes and the mobile stations are or connect to their nodes though a network according to the present technology. To understand how we do this, we must first understand the current cellular/LTE Network architecture.

The LTE Network architecture, as shown in FIG. 6A, has three main components:
The User Equipment (UE).
The Evolved UMTS Terrestrial Radio Access Network (E-UTRAN).
The Evolved Packet Core (EPC).

The essence of the invention is to create a parallel unlicensed LTE architecture to the licensed LTE network that is capable of both working (1) in a stand-alone mode; and (2) in a fully interconnected mode to the licensed LTE network. Each network element is designed to operate in parallel and symbiotically with the LTE network (or other future cellular networks), but in contrast to network operation used by the cellular network operator incumbents to create scarcity, the present technology allows parallel operation and control by the Sub-group to create extended control to the edge, removes scarcity and encourages far more unlicensed or lite-licensed network based access through co-management of the entire network.

It is noted that unburdening the cellular networks is not strictly a cost or business issue. By unloading communications which do not require cellular service from these networks, the cellular networks and bands in which they operate become freed for other and potentially more valuable purposes. The strategically located Mobile Bonded Nodes (or MBNodes) may also be enabled with licensed, unlicensed WiFi or other unlicensed spectrum network access points. Thus the new capabilities, while potentially disruptive to a cellular carrier's cellular-only business plan, does not necessarily displace the carriers who evolve to meet consumer expectations and demands, remain competitive, and efficiently allocate their resources. Licensed cellular bands may thus be freed for new services, especially in high density enterprise urban environments and campus environments where WiFi access point density and coverage may be very high.

To achieve this parallel network, as shown in FIG. 6B, first each user equipment or "UE" must be capable to add required software called a Framework Sim. The Framework Sim contains a parallel to what is known as the Carrier Permissions in a licensed LTE network. Often, legacy carriers (also called large MNOs) today to enforce restrictions through a combination of customized OS software placed into what is known as the "Framework" of a UE with the Subscriber Identity Module or "SIM." Typically, large MNOs refuse to extend or allow use of the capabilities inherent to functions related to the "Carrier Settings" thus creating the artificial scarcity. The Framework Sim, however, is designed so that user Sub-groups may obtain all of the permissions needed to allow integrated managed functionality within the UE to eliminate the artificial scarcity. To create interoperability with the Legacy LTE networks, a Framework Sim, which is entirely software based, also has a traditional twin "hard" SIM which, when sponsored by a MNO (small or large), creates all traditional identities, services and abilities (such as getting an MSISDN (phone number), enabling texting and MMS, and even allowing traditional Voice Over LTE or VoLTE to be enabled via the UE's Framework in a traditional manner). Once the full SIM identity and service is created, the present technology permissively allows duplication of the identities and abilities and shared control of the identities and abilities through the application of the Framework SIM on the UE. The application has a one to one relationship with a physical device and is the Framework SIM. The Framework SIM is then given master control and programmable functions through a secure API to the customer sub-group. The primary advantage is the immediate ability all UE's with Framework Sims have to immediately update its abilities to attach and use available unlicensed facilities based networks such as WiFi hotspots. For example, a campus setting can enable each student phone with the ability to not just connect, but to connect specifically to one of many available hotspots and in particular ways. This dramatically enhances the function and reduces the interference in crowded environments such as a stadium environment by extending express control to the network administrator. The Sub-group can now work not only on the network broadcast side to select channels and power settings but also the UE side of the equation—dramatically improving in a dynamic way the ability for UE in a crowded environment to receive stable services. Importantly, the Framework SIM can also have devices pick between many different available technically supported connection methods of the UE (Bluetooth, NFP, WiFi, multiple carrier bands when working in conjunction with a traditional hard SIM, C-Band, and future unlicensed bands as well).

The Framework SIM also creates an always-open encrypted signaling channel labeled the Mobile Continuity Client (MCC) in FIG. 4 (using any available transmission, not just licensed spectrum) between the UE and the Framework SIM Scheduler's MCC Server, through installed custom libraries and user-granted permission to access the libraries and functions of the UE. As a result a Framework SIM can work in conjunction with a traditional hard SIM or work completely independent from the traditional hard SIM. If in conjunction with the traditional hard SIM, the licensed carrier and through permissive extension, the Sub-group operating the hard SIM can permissively allow radio access network connections when and if the Framework SIM determines that is the best method of connection.

One intended result of using the present technology is the result is that the artificial scarcity of bandwidth will be avoided wherever a Framework SIM supported devices is enabled to attach and receive connectivity in its "WiFi First" mode. All groups who wish to provide networks can contribute available unlicensed bandwidth resources to the cellular Carrier Settings controlled alternative.

Similarly, another intended result of use of the technology is to employ the solution in a Framework Sim only state. Because the technology favors utilizing any existing built network that has more favorable economics of bandwidth usage the technology may be employed without a cellular overlay, in order to permit mobility of and use UE across multiple LANs. Such could be the case for supporting low income services which have been subsidized by the government. Full services, including necessary internet bandwidth, can be deployed without use of any cellular network.

In such cases, the present technology can service to replace the E-UTRAN of an LTE cellular network with a Mobile Bonded Node (MBNode). This allows non-LTE networks to supplement and/or replace completely the need for the E-UTRAN without the requirement that the MBNode adhere to LTE-U or LTE-LAA management practices. Management and signaling to the device continues to be via the Framework Sim and not via a required co-existing "licensed network connection" as is the case for LTE-U. The MBNode Sub-group network manager may continue to use its own allocation of IP Addresses, and may also install DPI and PCRF functions onto its user group which then become resident in the Framework SIM and Framework SIM Scheduler. The MBNode identifies each potential connection method and any for which authorization is possible are then "connected" through the back-end of the Framework SIM scheduler via Session Initiation Protocol (SIP), where both updated connectivity information, such as SSID—both advertised and/or hidden, and passwords, are placed with command function to the UE via the Framework SIM app, and for bearer traffic. When connected to the MBNode, the IMEI identity is given a connected state via the management of the MBNode by the self-provided network and reports the connected state through the Framework Sim Scheduler to the P-Gateway of the LTE-Core eliminating the need for a licensed LTE connection.

Yet another use case is to extend the so called "Facilities Based Coverage Area" of an existing MNO or cellular network provider. That is, where an existing MNO is unable to obtain licensed spectrum to expand its own network coverage, it can use LTE-PW method to extend services and still manage the network and customer via the technology. This is of particular importance to comply with regulatory imposed "Roaming Restrictions" whereby the regulator may allow dominant or large MNOs with nationwide networks to limit or restrict "Roaming" access by smaller MNOs. Often such restrictions may take the form of aggregate usage caps, individual service caps and/or service territory definitions. By having a LTE based technology that allows for seamless and managed handoff between unlicensed spectrum and licensed spectrum, smaller MNOs can use the present technology to stay in compliance with regulatory mandated rules.

The present technology supplements the traditional EPC with a Framework SIM Scheduler that again operates in parallel to what are known as the MME and home subscriber server (HSS) functions in an LTE network. The Framework SIM Scheduler is used to update and communicate between the MBNodes and the UE's Framework SIM; and when there is a Hard SIM—to provide over the air (OTA) functions and capacity related to accessing both LTE E-UTRAN networks to the traditional framework and SIM and the LTE—MBNode via the Framework SIM. Importantly, this Scheduler is controlled permissively by the Sub-group customer/network provider and it updates both the UE Framework SIM and MBNode so that the alternative network can be used and secured without access to the "Public Internet" or when accessed through the "Public Internet" can still provide connectivity to the user.

If operated in a standalone mode, full cell phone/M2M functionality is provided via unlicensed and lite licensed self-provided network to the IMEI with a reserved hard SIM. In a fully integrated mode, when and where unlicensed network or lite licensed network is unavailable, the LTE network fully-licensed "scarce resource" use can then supplement access through the Framework SIM scheduler. Importantly, the LTE fully-licensed network can also be utilized in a signal mode only and thereby be on "Standby" without consumption, or the fully licensed LTE network can be used to "update" the Framework SIM and MBNode so that direct Framework SIM and MBNode connection can be established. The fully intended operation and goal is to minimize use of licensed spectrum based LTE access in favor of all other access.

One particular application of the WiFi first technology is security applications. In a typical security system, the alarm system maintains a telephone link to the alarm system service provider call-center. The primary communication is over a POTS line (plain old telephone system), with a cellular backup. However, modern telephony installations typically have accompanying data services, and the data is unmetered or inexpensive. The present technology permits the alarm or security system to communicate via WiFi or wired network as a primary link, and cellular backup as a secondary link. Further, according to the present invention, certain data may be passed over the LTE signaling channel, and as such in many cases would incur no communications charges or metering while passing small messages to the Scheduling Server, which could then be forwarded to the alarm or security service provider. Further, security services could be provided by or through the Scheduling Server.

Indeed, a series of WiFi First security nodes may be implemented which avoid use of any hub or premises control, and provide all monitoring, communications, and access controls through the WiFi First technology using wireless Internet access as a primary communications modality and LTE as a backup/secondary modality. Some or all of the security devices may act as local controllers. This, of course, requires that each node or element of the security system have a cellular phone with WiFi capability built in, but such capabilities are now ubiquitous and generally low in cost.

FIG. 3 shows a logical system-level block diagram according to the present technology. As shown, an Internet-based interface is provided for customer support, marketing, on-line ordering, customer account administration, etc. An enterprise management system is also provided, which supports subscriber management, systems management, revenue management, and reporting & analytics. Both consumer and management interfaces communicate with a mobile gateway, which has an authentication module, which, for example, may use username and password, PKI credentials, challenge-response, two- or three-factor authentication, biometrics, etc., which employs a Lightweight Directory Access Protocol (LDAP) authentication manager The main system interfaces through a REST application programming interface, which in turn, controls order management, product inventory management, phone number management, pass management, a data analytics engine, and a home location registry/home subscriber server (HSS) module. Each of these modules (except perhaps the data analytics engine) also interfaces with a service bus, which in turn communicates with a payment module (which in turn communicates with a billing processor), a member data record (MDR) processor, a charging data record (CDR) homologation engine, a connection manager, and an external fulfillment and logistics unit. The device configuration manager communicates with a configuration API Integration and radio network authorization unit of a Sub-group user, which in turn controls via permission of the mobile network operator (MNO) connection to a licensed network and in its own network unlicensed band radio access. This radio access module communicates with a radio access feed processor, also connected to the service bus.

The mobile gateway communicates, also described as the Mobile Bonded Node (MBNode) in FIG. 6B, with mobile devices through an LTE network and unlicensed, e.g., WiFi network. The connection manager communicates with an intelligent message router, and hence through an IC messaging bridge, to a short message service center (SMSC), and a multimedia messaging service (MMSC), which in turn communicate through an intercarrier text gateway and public switched telephone network (PSTN) and text gateway, respectively. The MMSC also communicates with a wireless application protocol (WAP) gateway. A session initiation protocol (SIP) router interfaces with an intelligent voice call router, which in turn communicates with a dynamic callflow engine, which further communicates with a media server, which interfaces with the service bus, a voicemail server, a PSTN gateway, and the PSTN and text gateway.

As shown in FIG. 4, an Android operating system implementation is provided, which includes operating system patches for radio management, call routing, network access control, OPUS codec, multi-number support, and call handoff. A software operating system "apk" provides device configuration and SMS/MMS support. A software account management user "apk" provides support for activation, data analytics, notification management, pass management, and preference management, and includes a mobile continuity client (MCC) which interfaces with a remote MCC server.

It is therefore an object to provide a method of communication as shown in FIG. 15, comprising: establishing a first connection between the user equipment and a first non-public packet switched network which assigns a first non-public packet switched network address to user equipment; establishing a connection to a remote server, comprising transmitted signaling information, identifying a public switched telephone network address of the user equipment and the first non-public packet switched network address of user equipment to the scheduling server; associating, by the remote server, the public switched telephone network address of the user equipment with the assigned first non-public packet switched network address of the user equipment; commencing a bidirectional real-time voice communication over the first connection using the public switched telephone network address of the user equipment; establishing a second connection between the user equipment and a second switched network; reassociating the public switched telephone network address of the user equipment with an assigned network address of the user equipment by the second switched network; and continuing the bidirectional real-time voice communication over the second connection after discontinuing the bidirectional real-time voice communication over the first connection.

It is therefore an object of the technology to provide a method of communication as shown in FIG. 16, comprising: establishing a first connection between the user equipment and a first non-public packet switched network which assigns a first non-public packet switched network address to user equipment; establishing a second connection between the user equipment and a second packet switched telephone network which communicates with the user equipment according to a public switched telephone network address and International mobile subscriber identity; establishing an open signaling channel between the user equipment and a remote server through the second packet switched telephone network; receiving a request to establish a bidirectional real time voice communication with the user equipment through the signaling channel; establishing the bidirectional real time voice communication with the user equipment over the first non-public packet switched network based on the public switched telephone network address; establishing a third connection between the user equipment and a third non-public packet switched network which assigns a third non-public packet switched network address to user equipment; and transitioning the bidirectional real time voice communication with the user equipment from the first non-public packet switched network to the third non-public packet switched network.

It is also an object to provide a method of communication as shown in FIG. 17, comprising: establishing a first connection between the user equipment and a first non-public packet switched network which assigns a first non-public packet switched network address to user equipment; establishing an open signaling channel which communicates between the user equipment and a remote server through a cellular telephone network according to a public switched telephone network address associated with an International mobile subscriber identity; communicating an identification of the first non-public network and the first non-public packet switched network address over the open signaling channel to the remote server; and establishing a real time voice communication from the remote server to the user equipment through the first connection based on a call routed through the remote server to the public switched telephone network address.

It is a further object to provide a method of communication as shown in FIG. 18, comprising: providing user equipment having an equipment identifier, and a secure execution module; verifying the secure execution module with a cellular network controller; establishing a connection to a scheduling server through a cellular network signaling channel, comprising at least periodically transmitted signaling information, identifying a public switched telephone network address, a non-public packet switched network address, and the equipment identifier of user equipment, to the scheduling server; verifying the secure execution module with the scheduling server; establishing a first connection between the user equipment and a first non-public packet switched network which assigns a first non-public packet switched network address to the user equipment, and from the first non-public packet switched network to the scheduling server; associating the public switched telephone network address of the user equipment with the assigned first non-public packet switched network address of the user equipment by the scheduling server; and initiating a bidirectional real-time voice communication over the first connection.

It is another object to provide corresponding systems and non-transitory computer readable media storing instructions for controlling automated processors to carry out aspects of the methods.

More generally, the present technology permits communications, by whatever means, with a scheduling server, that maintains knowledge of user equipment with respect to its logical addressing on an LTE network by communications over a signaling channel, without incurring data usage of the LTE network itself. Therefore, the user equipment can transition, or "roam", between WiFi type networks (and more generally, non-LTE networks) and LTE networks (or more generally, restricted access telephone carrier networks), using a control system not managed by the telephone carrier. Therefore, to the user, the experience can be relatively seamless, and minimize usage of the carrier networks for voice or data communications, while ensuring that the presence of the user equipment is acknowledged by the LTE/carrier network. The signaling channel of the LTE/carrier network permits standard-compatible communication of various metadata from the user equipment to a Scheduling Server. This system therefore permits control over the user equipment to be delegated to an administrator outside of the telephone carrier, while still permitting carrier network usage when needed.

It is a further object to provide the method further comprising: establishing a second connection between the user equipment and a second switched network; re-associating the public switched telephone network address of the user equipment with the second switched network by the scheduling server; communicating between the scheduling server to the user equipment through the first non-public packet switched network and the second switched network; and continuing the bidirectional real-time voice communication over the second connection.

The identified public switched network address may be an E-164 address. The signaling information may comprise an IMEI. The signally information may be communicated over the first non-public packet switched network, or over the second switched network.

The first non-public packet switched network may communicate according to an IEEE-802.11 protocol, i.e., 802.11 a, b, g, n, ac, ad, s, etc. The second switched network may also communicate according to an IEEE-802.11 protocol, or according to an LTE protocol.

The re-associating may occur during a telephone conversation without interrupting the telephone conversation. The reassociation may be managed by the user equipment, or managed by the scheduling server. The user equipment may have an operating system which defines a plurality of privileged execution types, at least one type of privileged execution being inaccessible to a user, and wherein the reassociation function is executed in the at least one type of privileged execution inaccessible to the user.

The scheduling server may implement a Policy and Charging Rules Function.

The first non-public packet switched network may require login authentication information, and the login authentication information may be communicated under control of the at least one type of privileged execution inaccessible to the user.

The user equipment may be a smartphone. The user equipment and the scheduling server may communicate according to the Session Initiation Protocol.

Network access information for the second switched network may be stored in a hardware SIM and network access information for the first non-public packet switched network is stored in a rewritable memory location inaccessible to the user and accessible to the at least one type of privileged execution inaccessible to the user.

DETAILED DESCRIPTION OF THE PREFERRED EMBODIMENT

The three major Operating Systems used for Mobile Stations (Android, iOS, Microsoft Phone) mimic each other regarding where and how permissions are allowed to access networks and run network-reliant applications or services on the device.

Figure 1:
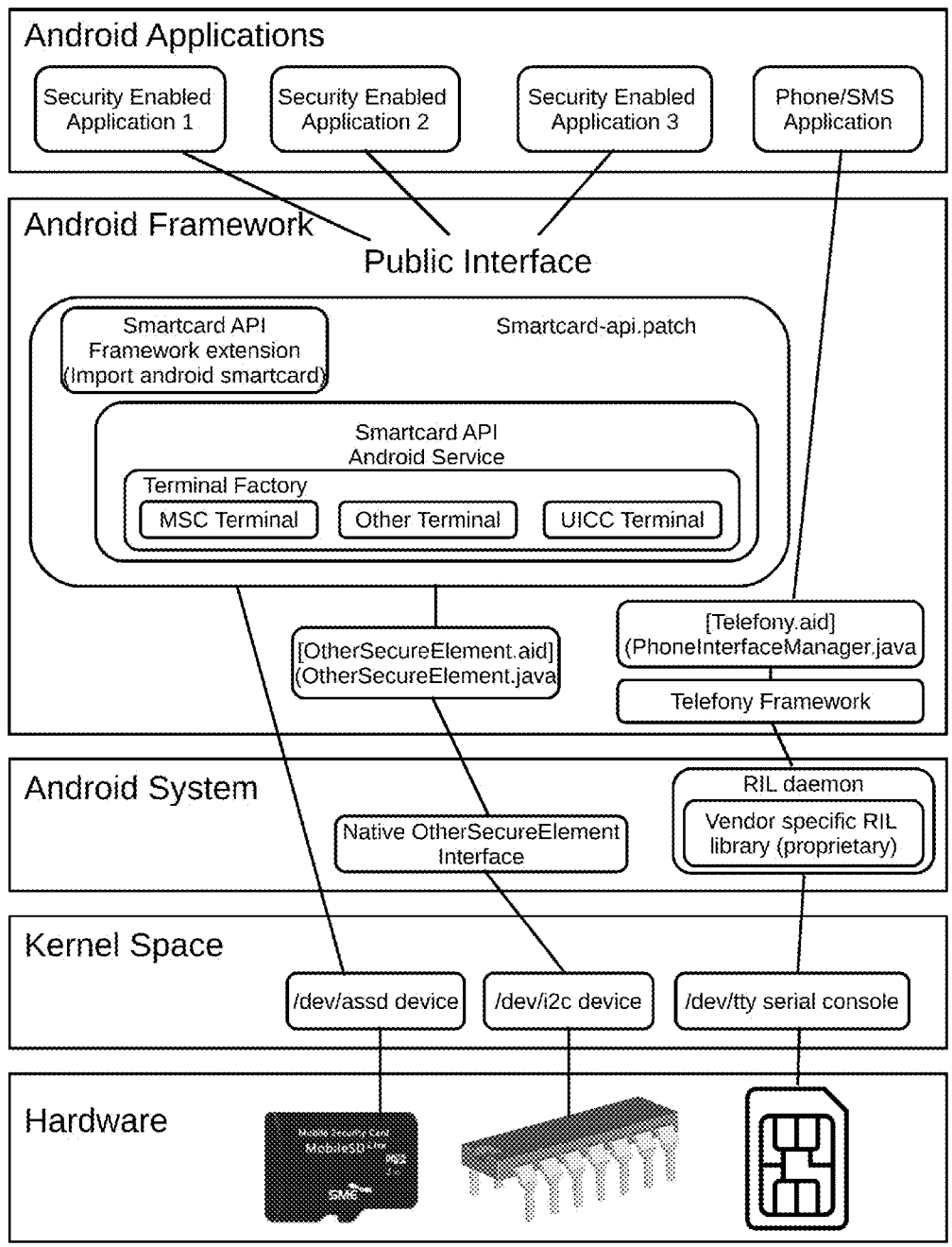
FIG. 1 shows a prior art architectire of an Andoid telephone device.

FIG. 1 shows a well-accepted base diagram of the operations of an Android Phone. A set of security enabled applications at an applications layer interface to an Android framework having a public interface. The Android framework provides a smartcard API, which provides various terminal services, such as MSC, UICC, and other. Beneath the public interface, the Android system provides a native secure interface, as well as a vendor-specific proprietary radio interface layer (RIL) daemon. In the kernel space, various device interfaces are provides, such as ASSD device, I2C device, and TTY serial console device, which in turn communicate with SD memory cards, I2C bus components, and SIM modules.

Figure 2:
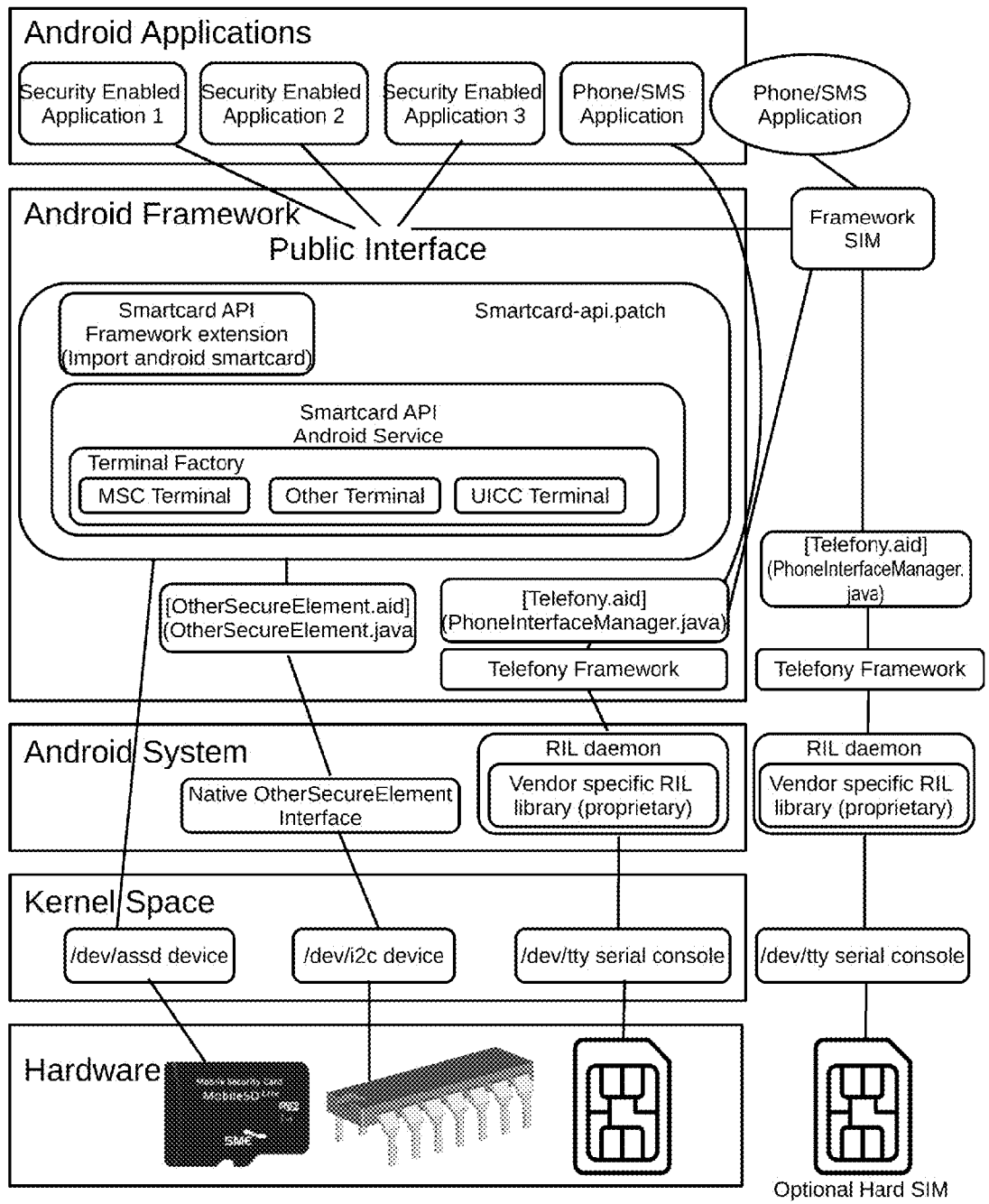
FIG. 2 shows an architectire of an Andoid telephone device according to the present technology.
Figure 3:
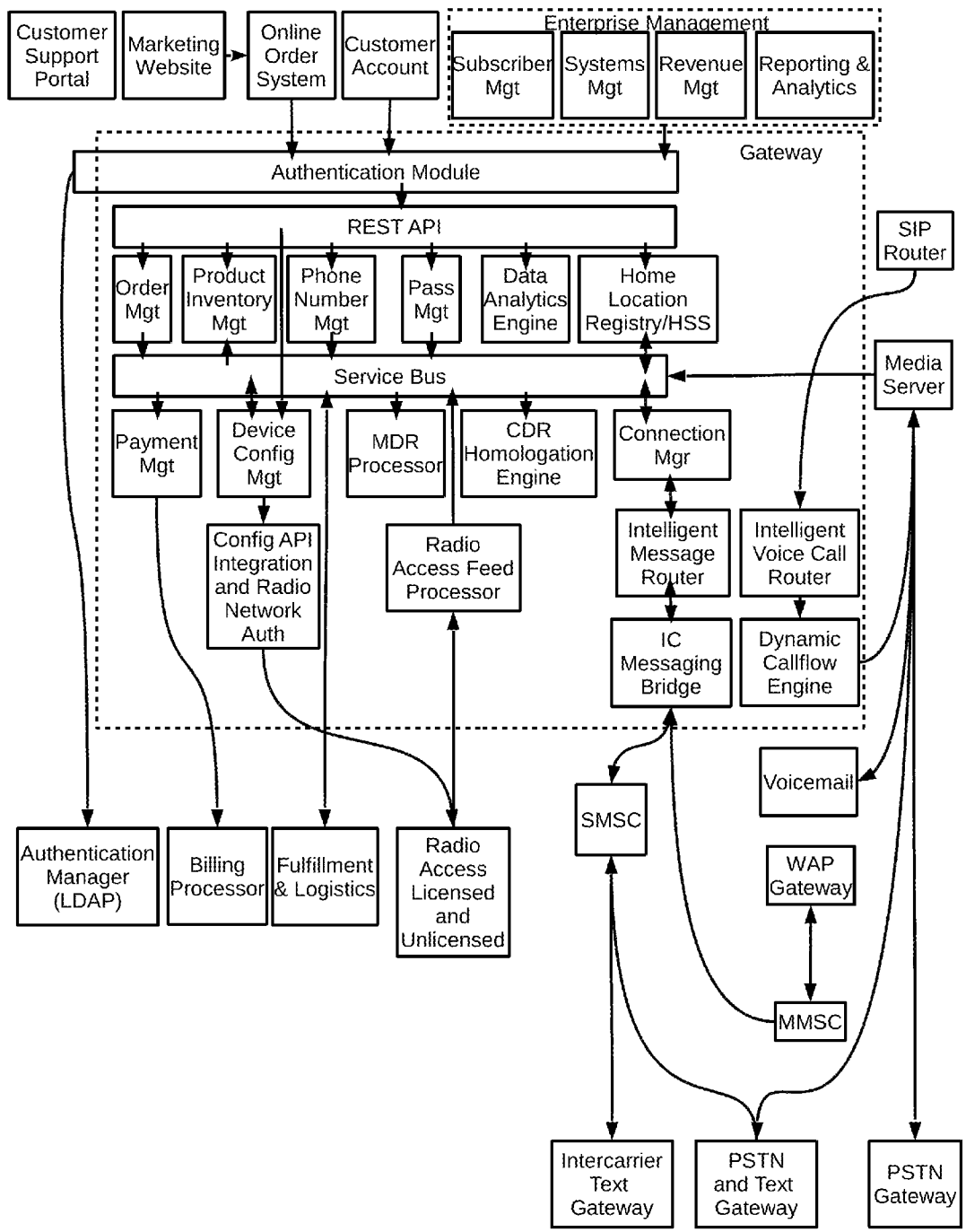
FIG. 3 shows a logical system architecture according to the present technology.
Figure 4:
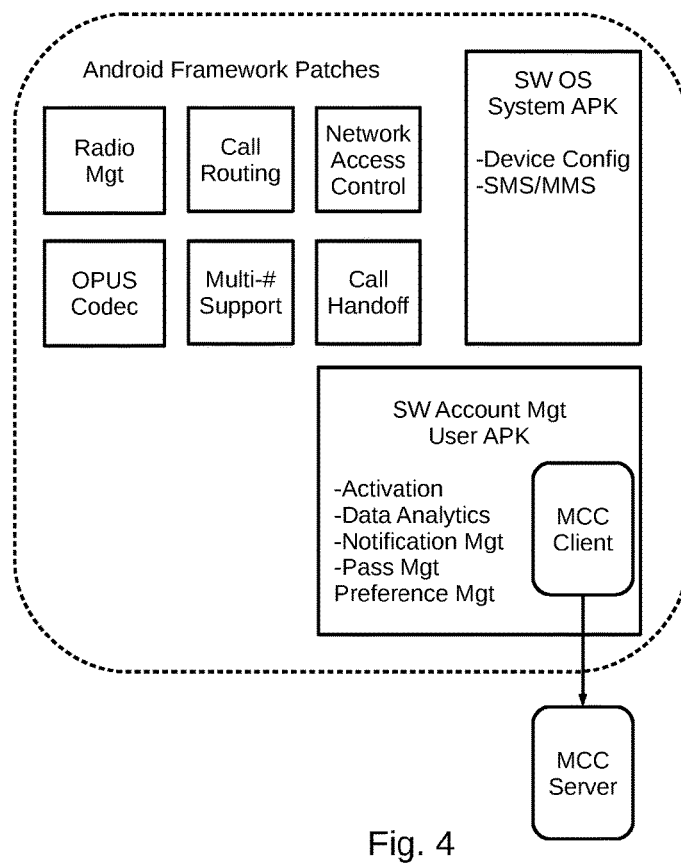
FIG. 4 shows a semichematic diagram of a smartphone according to the present technology.
Figure 5:
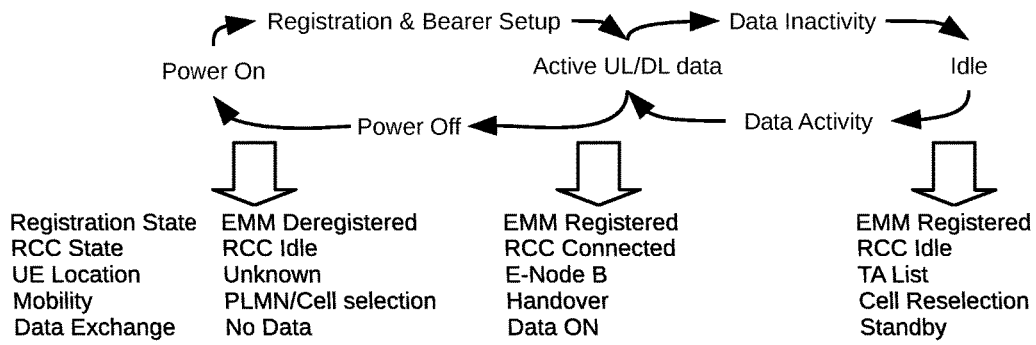
FIG. 5 shows a shows a prior art state transition diagram for an EPS network.
Figure 6A:
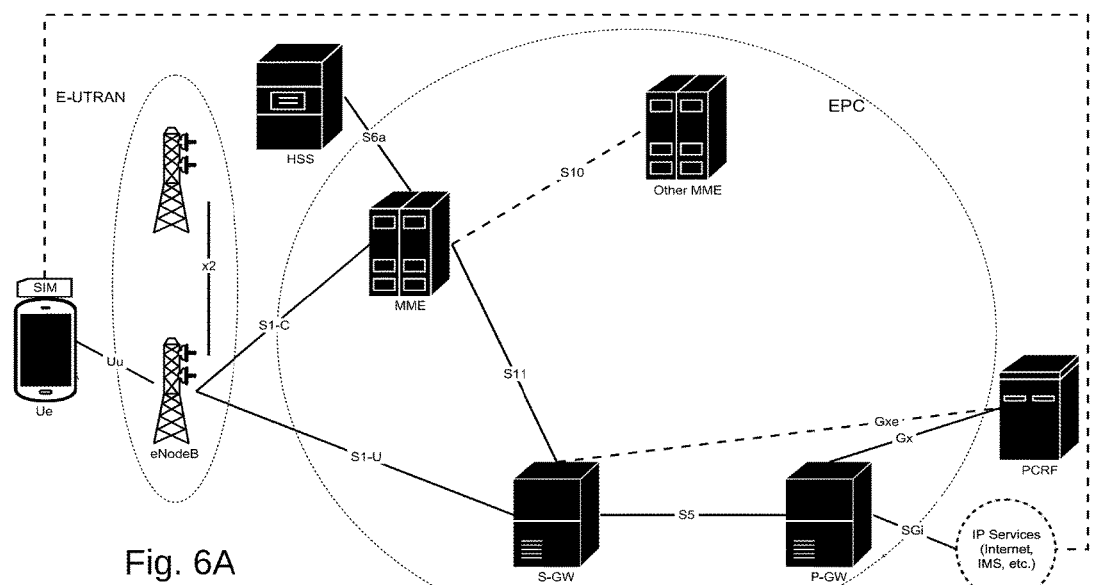
FIG. 6A shows a prior art Evolved Packet System (EPS) network architecture.
Figure 6B:
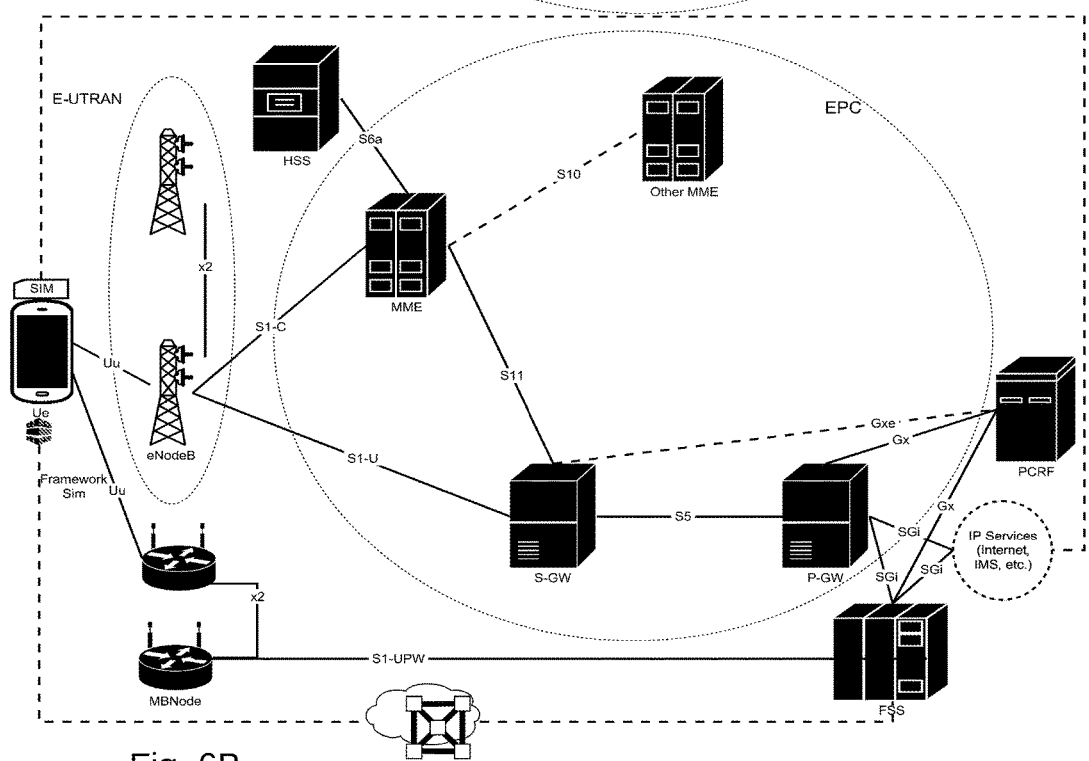
FIG. 6B shows a network architecture according present invention.
Figure 7:
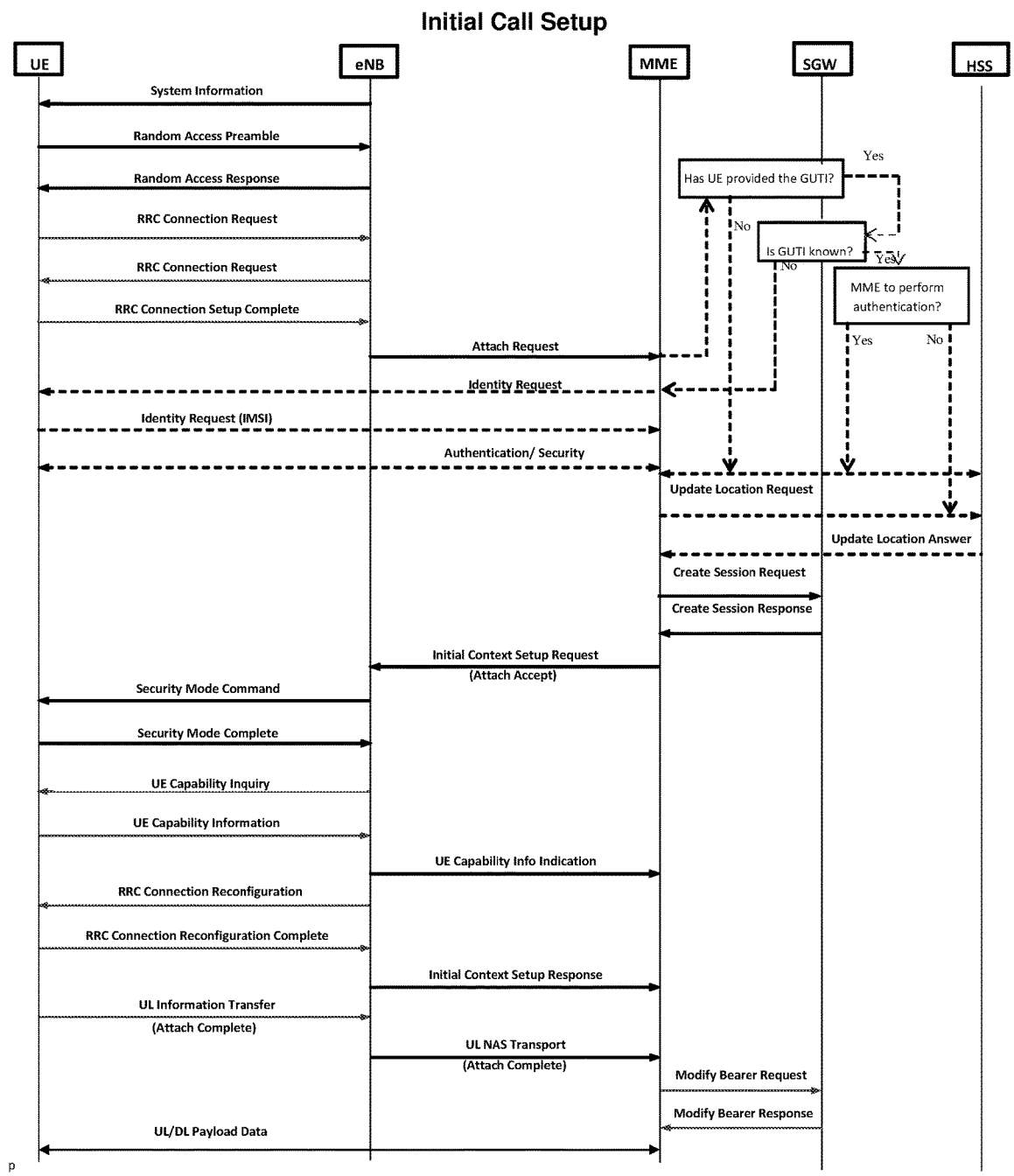
FIG. 7 shows a prior art LTE initial call setup diagram.
Figure 8:
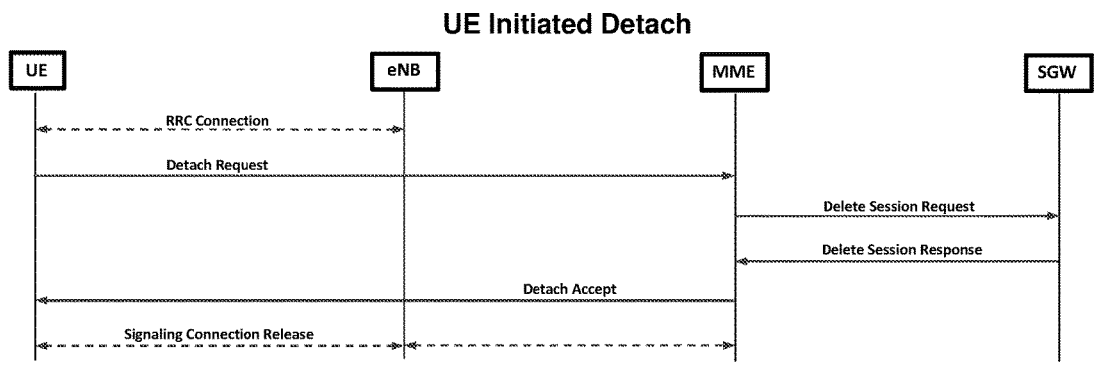
FIG. 8 shows a prior art LTE initiated UE detach diagram.
Figure 9:
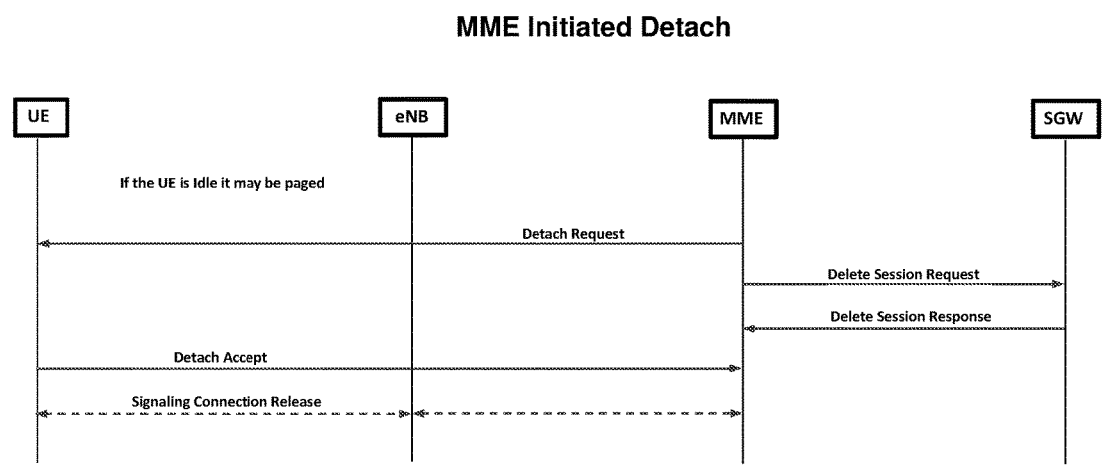
FIG. 9 shows a prior art LTE initial call MME initiated detach diagram.
Figure 10:
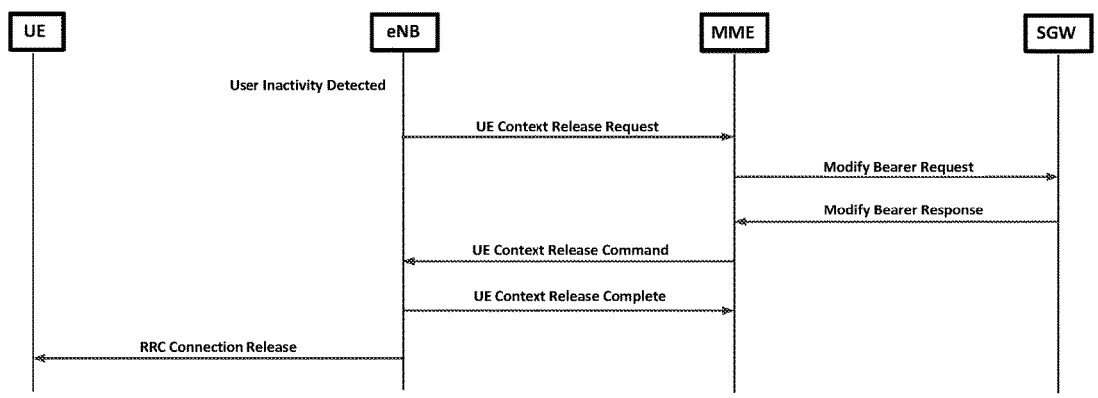
FIG. 10 shows a prior art LTE active to idle mode transition diagram.
Figure 11:
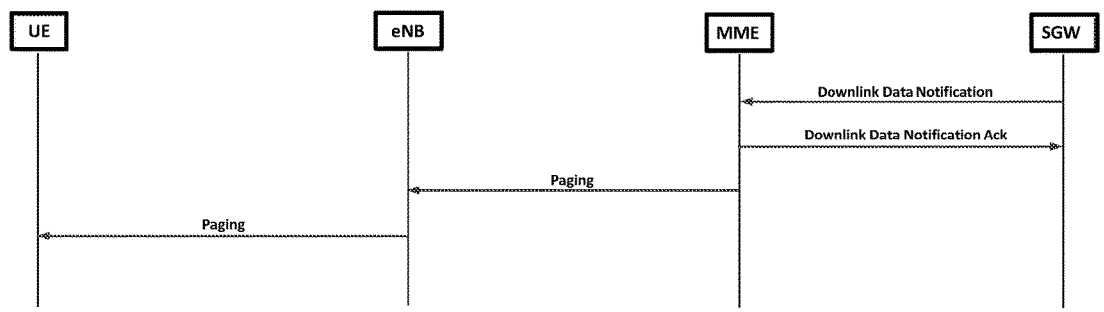
FIG. 11 shows a prior art LTE Network Initiated Idle to Active Transition diagram.
Figure 12:
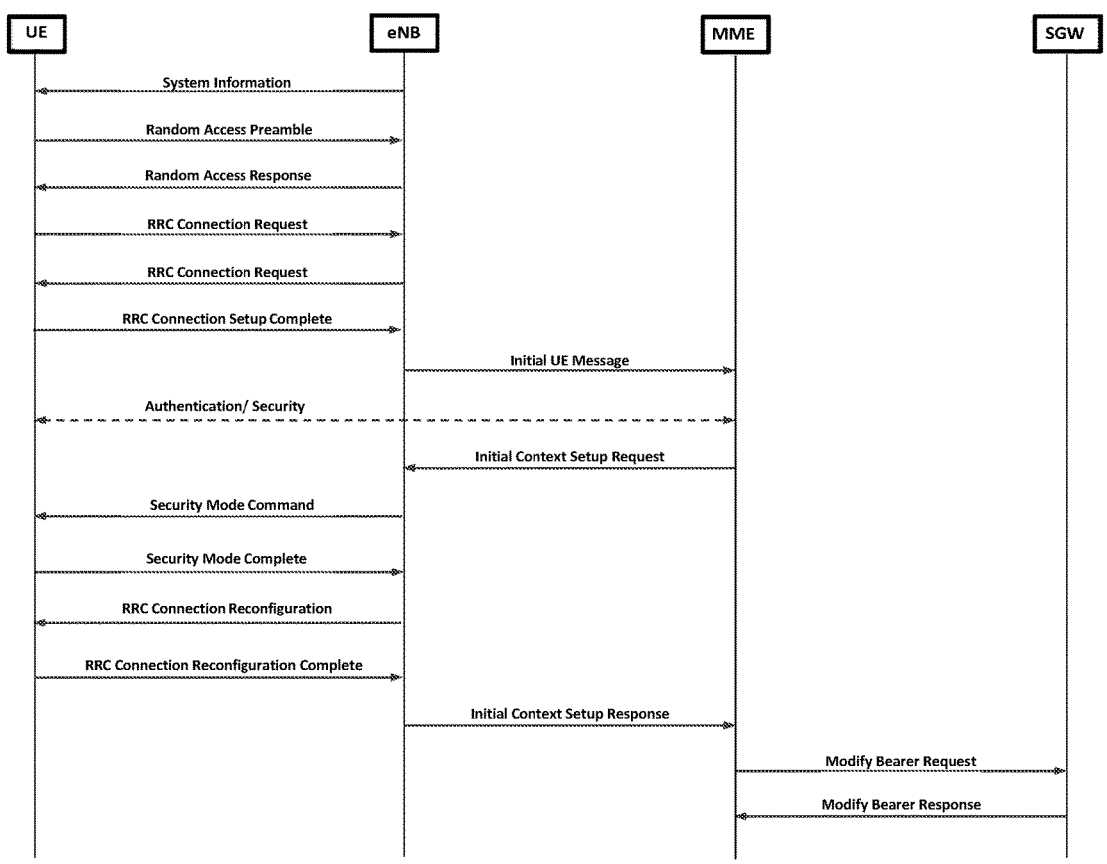
FIG. 12 shows a prior art LTE UE Initiated Service Request diagram.
Figure 13:
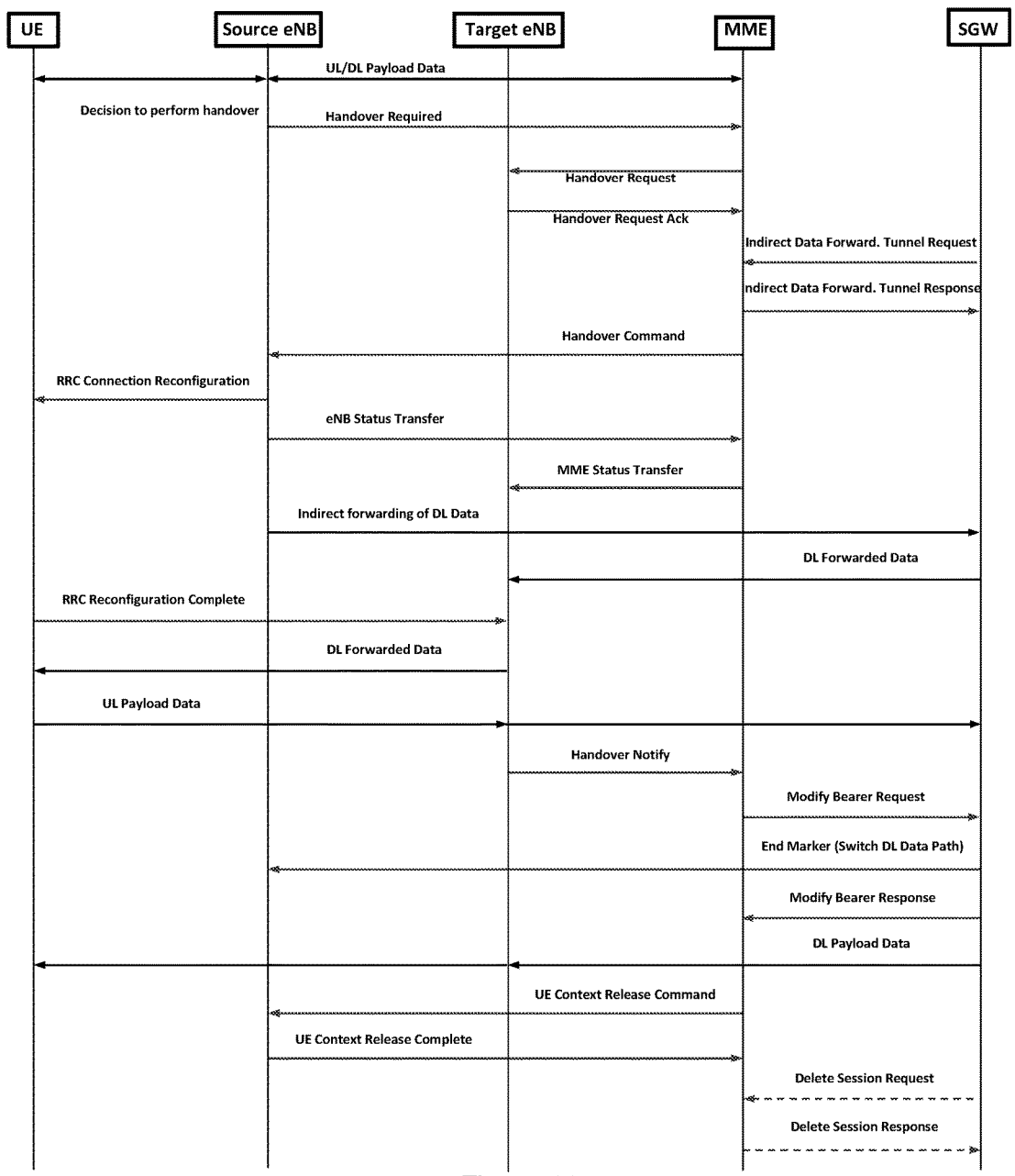
FIG. 13 shows a prior art LTE S1 Based Inter eNodeB Handover diagram.
Figure 14:
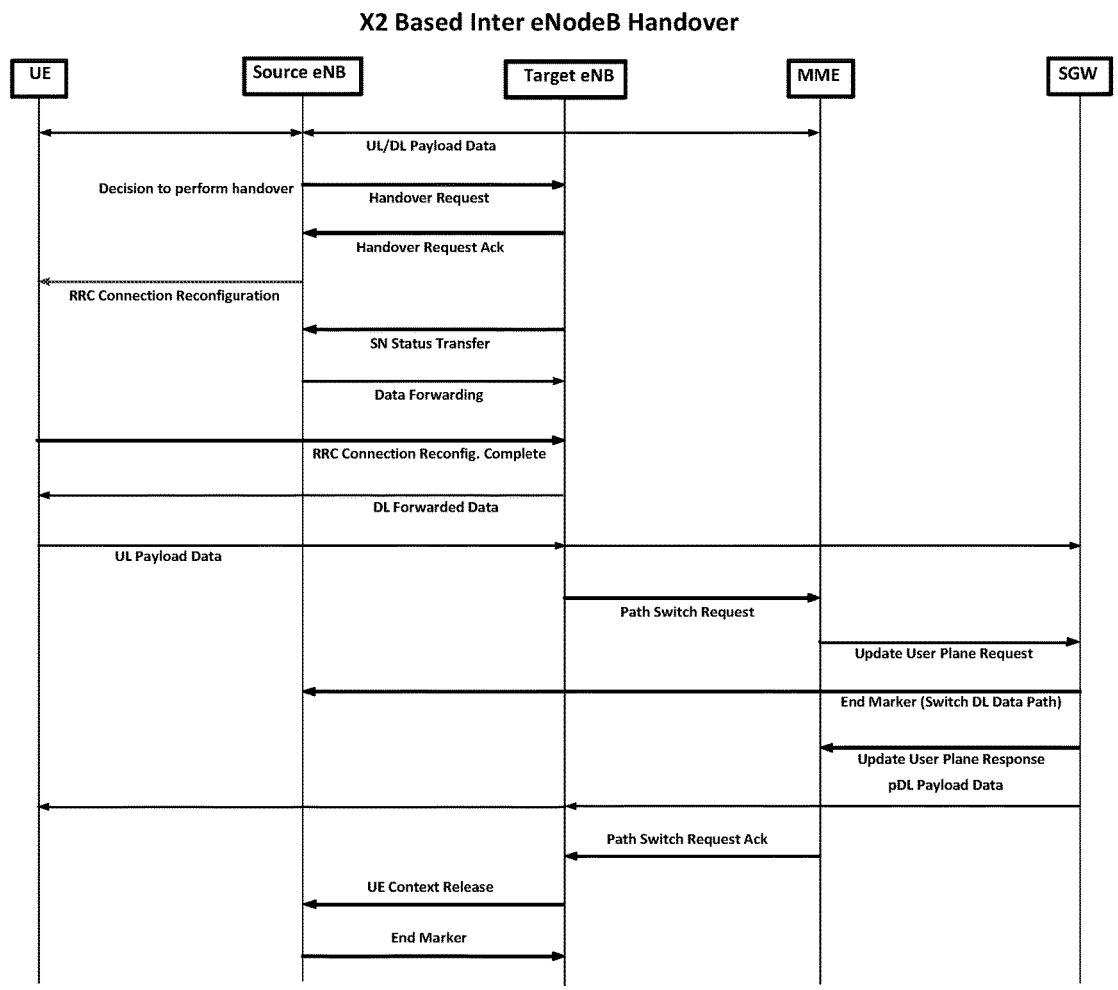
FIG. 14 shows a prior art LTE X2 Based Inter eNodeB Handover diagram.
Figure 15:
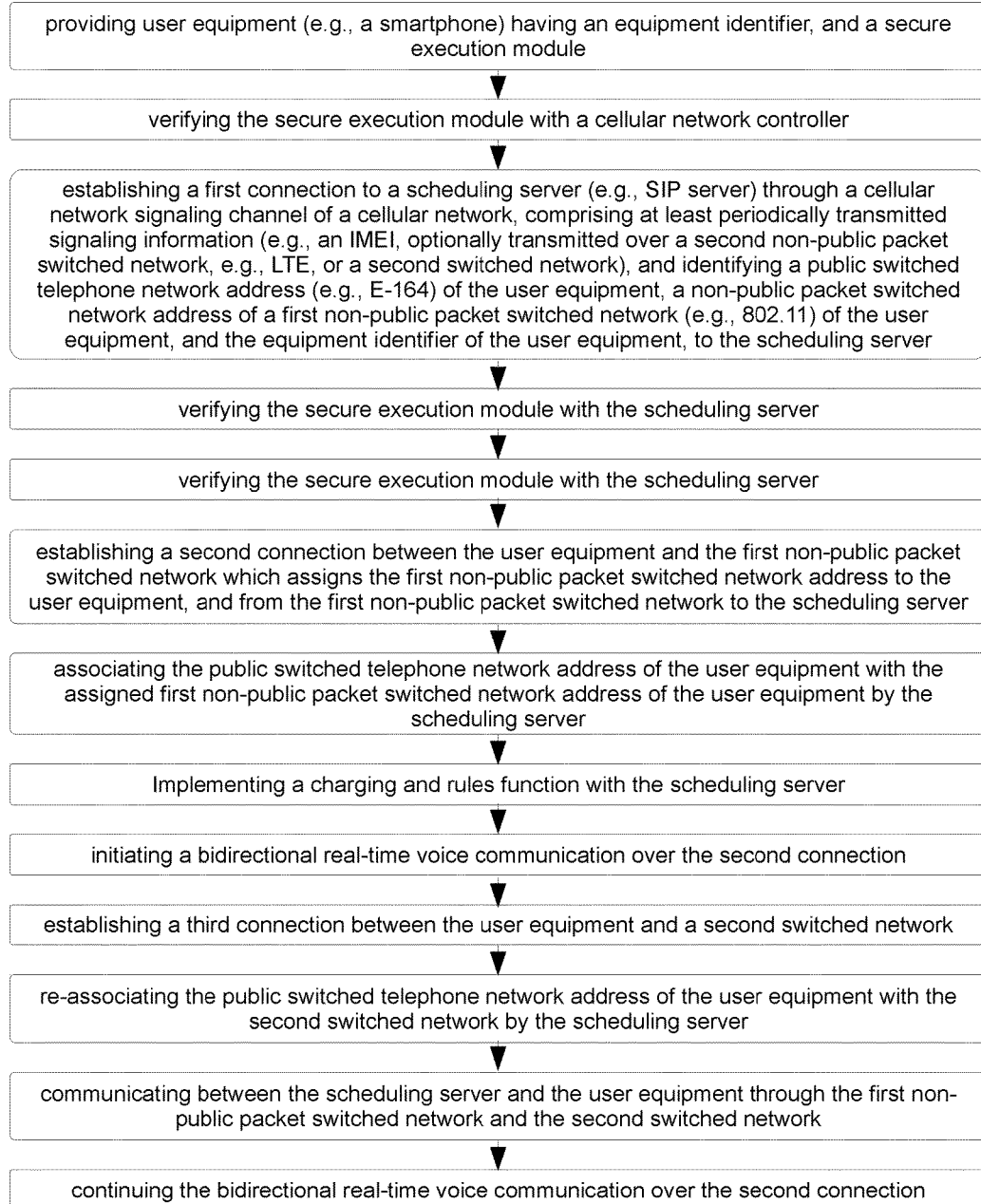
FIG. 15 shows a method according to a first embodiment of the invention.
Figure 16:
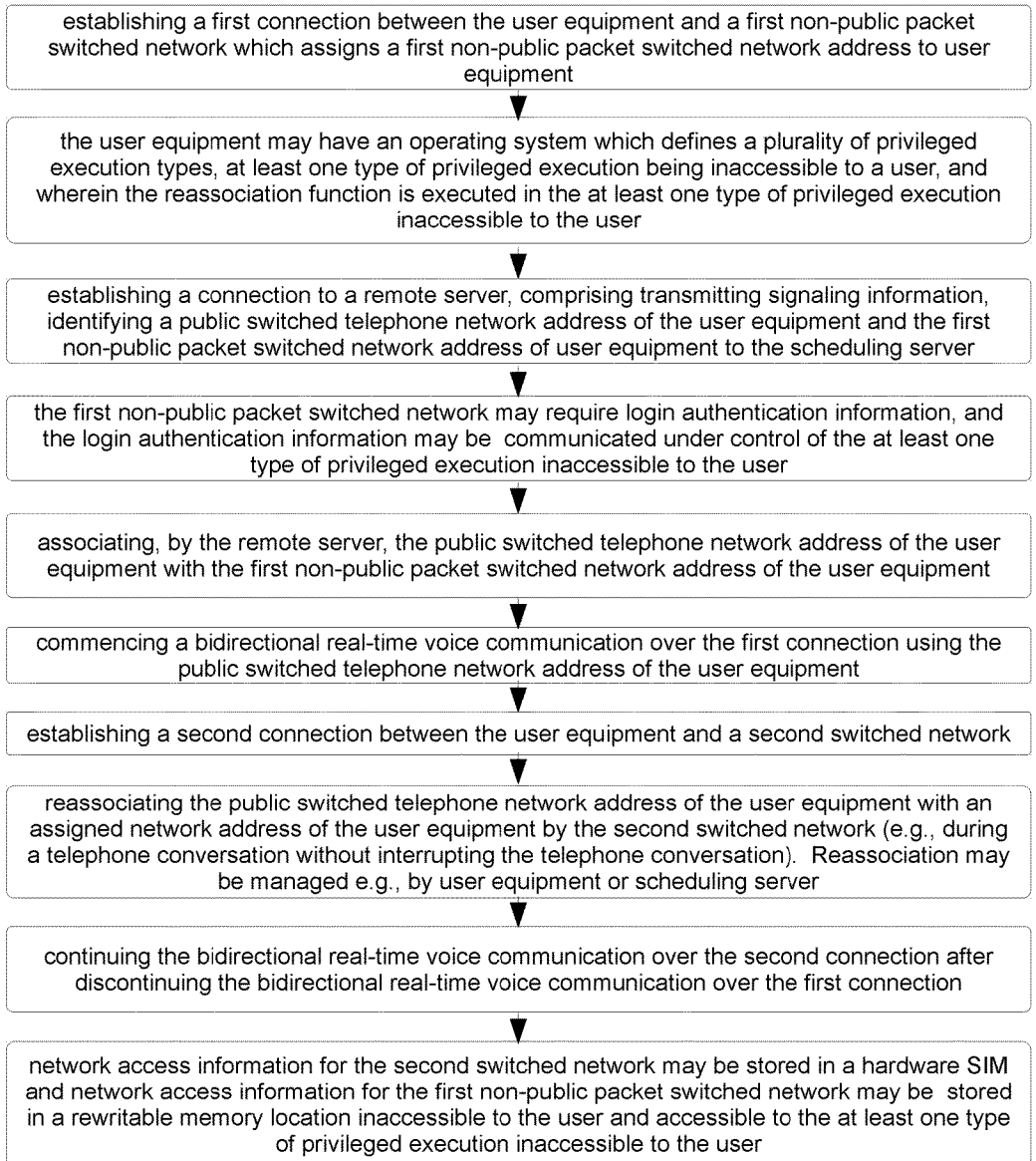
FIG. 16 shows a method according to a first embodiment of the invention.
Figure 17:
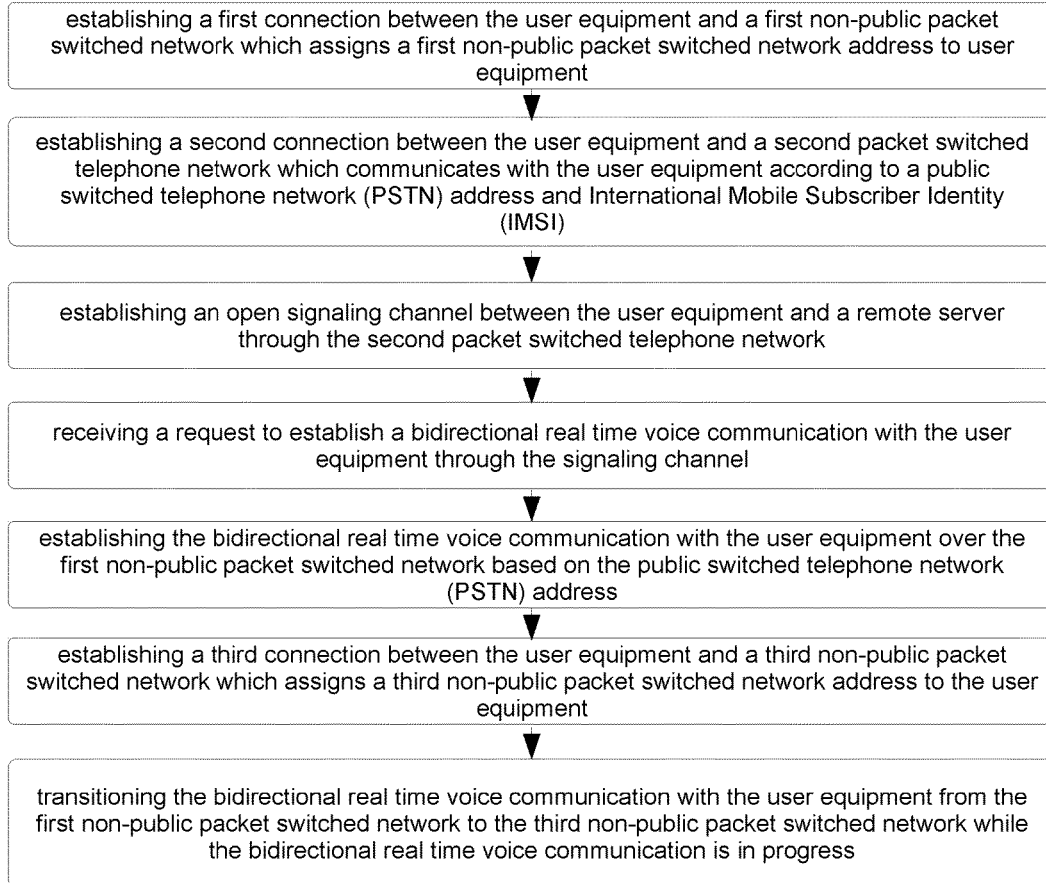
FIG. 17 shows a method according to a first embodiment of the invention.
Figure 18:
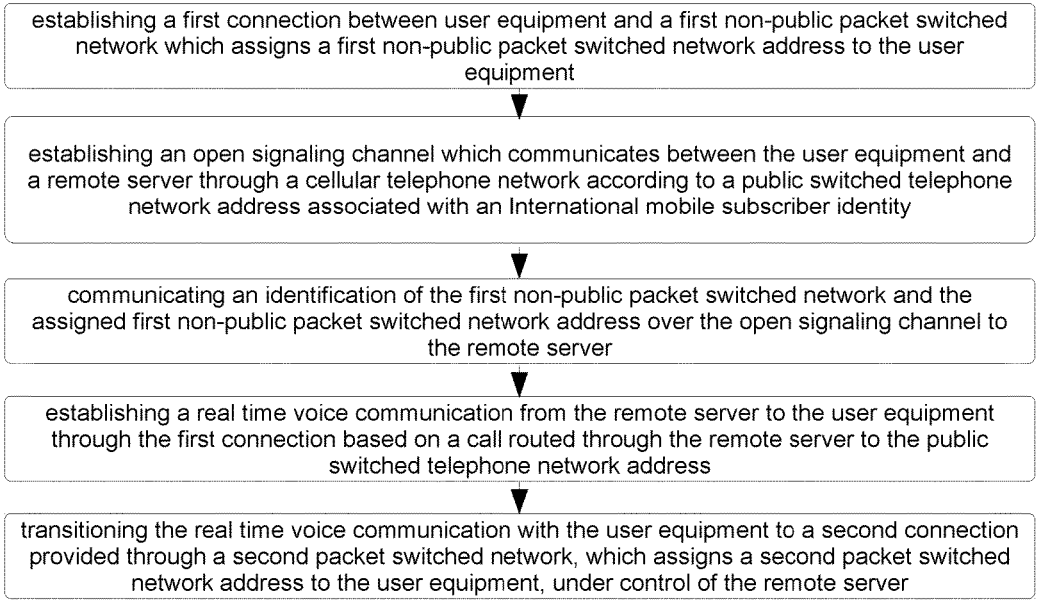
FIG. 18 shows a method according to a first embodiment of the invention.

According to the present technology, the mobile station device will have to load and run additional software, as shown in FIG. 2. That is, a framework SIM (virtual) is provided outside of the typical implementation. This framework SIM communicates with its own phone interface manager module, telephony (telephony) framework, radio interface layer daemon, and may support an optional "hard" (real) SIM through a tty serial console interface in the kernel space.

Notice that the Framework SIM is a standalone application that creates a virtual cellular phone identity which "lives" in the Framework SIM Scheduler (FSS)/LTE/IMS Core according to the present technology, and is paired in a one to one relationship with the mobile station device just like a traditional Subscriber Identity Module (SIM) based device is controlled. The Operational Support System (OSS) verifies and pairs the device by its unique IMSI, and assigns a working E-164 address with all Carrier Permissions through the public interface to continue operations of SMS/MMS/Phone services when and if companion applications are loaded on the device. For example, the device is required to grant permissions to access the necessary items to operate services and an additional proprietary library created which will interoperate between the functions in the core and the capabilities on the phone. Through these permissions, information can be pulled from the phone and its radios and then the phone and its radios required to act in coordination with the Framework SIM, supplementing and/or replacing the instructions usually provided by the hard SIM.

The basic and first example is that of using the Wi-Fi radio present on most smartphones phone to connect the phone to one of two types of Wi-Fi access points. The first type of WiFi access point is one where the user enters a WiFi SSID and password. The second type is when the phone, though the commands pushed to the Framework SIM, connects to an MBNode which has shared its network information with the LTE/IMS Core via the Framework SIM Scheduler.

The Framework SIM also gains permissions to access the LTE radios, as well as the GPS radio and other radios to access other networks both current and future (such as Bluetooth and C-Band). And, when it is coordinated with the hard SIM, the Framework SIM can access the hard SIM and institute commands via OTA.

The result is a total capture of all phone functions necessary to provide legacy cellular services (including Phase II 911) in parallel with the presubscribed hard SIM. Importantly, because Carrier Permissions have been granted, accessing contacts for the dialer or history for the texting lives in parallel and shares storage libraries and functions.

If and when a Hard SIM is desired, that hard SIM and to the extent Carrier Permissions are customized in the Framework of UE, the Framework and hard SIM will then have OTA capability and will match the MSISDN identity in the Framework SIM already on the device. Importantly, the OTA and Framework SIM share responsibility and create flexibility for the sub-group customer through the Framework SIM Scheduler.

The most prevalent network constraints for CMRS currently exist not just in Mobile Broadband Data services, but in all supported services to mobile stations. The stated reason for the constraint is general demand outpacing the available licensed spectrum capacity for any given fully-licensed network access carrier.

Mobile Bonded Nodes (MBNodes) are network provided access points that, through connection and management to an interface on the Framework SIM Scheduler are automatically accessed by EUs which are given instruction regarding network access choices through the Framework SIM.

This method differs from both LTE-U and LTE-LAA schemes in that according to the present technology, the MBNode continues to be managed, not only by the carrier, but by all parties who assist to provide facilities based networks known as sub-groups. This significant difference eliminates the major concerns expressed by those who have expressed reservations about LTE-U and LTE-LAA in various regulatory proceedings. These concerns are basically that large MNOs are attempting to steal unlicensed network and/or their use of unlicensed networks will interfere with existing management of use by sub-groups today. The present technology gives additional permissions, control and tools to the non-LTE Licensed network provider and these work in parallel to the current LTE network architecture. Basically it is not assumed that the device access can only be controlled by a single network provider, but instead that device access can be "scheduled" in real time among and between multiple networks and network managers where needed without the need for services to be disrupted or limited out of fear that the licensed spectrum demand will outstrip available capacity.

The solution concept allows MBNodes and device software (Framework SIM) and the core "Scheduler" to be implemented by a permissive CMRS or MNO that—in contrast to the dominant large MNOs—wants to maximize and allow edge control by the sub-group rather than wrestle away network control. This provides, in essence, a Neutral Network, and offers through the network and software the value of DPI management of unlicensed spectrum in a permissive manner, where each edge device must opt in via the loading and use of an application that is designed to give network information to and from the MBNode which is in turn giving information to the Permissive MNO's Core.

The result is an edge device UE and MBNode defined network managed with the tools provided by the Scheduler and by the Framework SIM. An additional benefit is the ability for the edge defined network to inject additional "non-neutral" rules in the MBNodes that it deploys using unlicensed or lite licensed spectrum (such as Citizens' Band). While the FCC's Net Neutrality rules prohibit retail network access provider discrimination and preferences, they were not intended to also proscribe edge-imposed limits; indeed, the purpose of the Net Neutrality rules was to push control out to the edge, which is exactly what the present technologies are designed to do. For example, if deployed in an educational environment, there may be a desire (perhaps imposed through legislation or a condition of a grant or subsidy) for censoring of particular content. This can now be managed on the students cell phones through a policy control in the MBNodes via the permissive Framework SIM Scheduler, which allows for more fine-grained and targeted discrimination that is presently possible at the edge using today's edge-based tools. However, these Deep Packet based functions will only be implemented by the "Edge" group who deploys and/or co-controls the MBNodes in conjunction with the Framework SIM Scheduler. Control and abilities are delegated permissively to the edge, except in instances where a Carrier function is mandatory (such as CALEA and Enhanced 911).

In order to maximize a cost-benefit of supported devices, the MBNode IP address allocation must also be tied on a one to one basis in a similar fashion as to how each Framework SIM gives a one to one identity between the IMEI and an MSISDN. A software database in the Framework SIM Scheduler holds this pairing. We describe this as a "Static NAT" or "Semi-Static NAT"—again allowing the sub-group network to control access and use.

Each MBNode within a particular group is then given a "sub group" identifier which corresponds to the libraries held under the Framework SIM UE. Thus the unique group of UEs is tied via management to the group's own MBNodes. When updates are made through the Framework SIM Scheduler regarding available MBNodes, connectivity control is automatically extended to the corresponding Framework SIM on each UE.

The Framework SIM Scheduler physically resides within the Core and between the IMS and the P-Gateway and provides the parallel function of the Mobility Management Element or MME and HSS, in the LTE architecture. The Framework SIM Scheduler also has full LTE PCRF control into the P-Gateway when a UE is operated via licensed LTE, but also and simultaneously has full access to and control of the Framework SIMs and MBNodes when the UE is connected to the MBNode. As such, it can instruct the Session Border Controller (SBC) which can provide SIP trunks the MBNode "Sub-Group" to route voice, data, SMS and MMS traffic through its connection allows certain databases to be updated within each "Sub-Group." The result is dynamic control of the Framework SIM by the sub-group when connected through the MBNode for voice, data, SMS and MMS. For example, again turning to a university setting, if a university has an IP-PBX capable of supporting UEs via SIP, then that university can use the present technology not only to provide data to each UE, but can also host directly the UEs with full cell phone functionality—either with or without a parallel hard SIM Likewise in an enterprise environment, new employees simply need to load the "Framework SIM" onto their existing cellphone to be added to the corporate IP-PBX.

A mirror connection based on the IMEI is created in an Idle state if a Hard SIM is also loaded into the UE. In this situation, the mirror or "LTE" connection can operate in a "fall back" state, and—depending on what services are provided by the MBNode Sub-group—similar mirror states can be enabled in the IMS core for voice and texting capabilities. Again turning to the university setting, this means if the students take their phones home when they leave campus, the university can allow use in cell-phone/ LTE mode if paired with a carrier's hard SIM. Alternatively, if no pairing exists, the cell phones will only work on campus when connected to an MBNode. All services in all instances can now be controlled by the University.

This is technically different from existing "Wi-Fi" offerings embedded in other operating systems. Those offerings are limited by Carrier Settings in the Framework or in the SIM with no ability for non-carrier sub-groups to manage the devices and network. In addition, physical device identifiers, not IP Addresses, are used to authenticate, and then ensure "Fall Back." Finally, management, including DPI and PCRF functions, are never extended. The present technology is an improvement and extends by design to the MBNode Sub-Group and corollary software maximum control to the Sub-Group.

There are two essential components to any LTE-PW/Wi-Fi First solution. First, the device must be implemented in a way that supports LTE-PW/Wi-Fi First functionality. Second, LTE-PW/Wi-Fi First must be implemented on the key components of the telecommunications infrastructure in parallel to a Wi-Fi First solution so that via control of the Framework SIM a switch to operations as a hard SIM may be automatically enabled.

This differs from RFC 5944 and its predecessor RFC 3944, which require the he following steps of its outline of operation of the Mobile IP protocol:

Mobility agents (i.e., foreign agents and home agents) advertise their presence via Agent Advertisement messages.

A mobile node may optionally solicit an Agent Advertisement message from any locally attached mobility agents through an Agent Solicitation message.

A mobile node receives these Agent Advertisements and determines whether it is on its home network or a foreign network.

When the mobile node detects that it is located on its home network, it operates without mobility services. If returning to its home network from being registered elsewhere, the mobile node deregisters with its home agent, through exchange of a Registration Request and Registration Reply message with it.

When a mobile node detects that it has moved to a foreign network, it obtains a care-of address on the foreign network. The care-of address can either be determined from a foreign agent's advertisements (a foreign agent care-of address), or by some external assignment mechanism such as DHCP (a co-located care-of address).

The mobile node operating away from home then registers its new care-of address with its home agent through exchange of a Registration Request and Registration Reply message with the home agent, possibly via a foreign agent.

Datagrams sent to the mobile node's home address are intercepted by its home agent, tunneled by the home agent to the mobile node's care-of address, received at the tunnel endpoint (either at a foreign agent or at the mobile node itself), and finally delivered to the mobile node.

In the reverse direction, datagrams sent by the mobile node are generally delivered to their destination using standard IP routing mechanisms, not necessarily passing through the home agent.

When away from home, Mobile IP uses protocol tunneling to hide a mobile node's home address from intervening routers between its home network and its current location. The tunnel terminates at the mobile node's care-of address. The care-of address must be an address to which datagrams can be delivered via conventional IP routing. At the care-of address, the original datagram is removed from the tunnel and delivered to the mobile node."

Unlike the RFC 5944, the IP Address in use to the "world" for all carrier enabled services such as voice, SMS and MMS is always the Carrier Enabled IP Address hosted in the Core of the Carrier's network. This is especially the case for "Roaming" on $3^{rd}$ party cellular networks, where only a preset listing of IP Addresses is approved for Roaming use. As a result there are multiple cases of operation that differ from that of the generic tunneling that is described among and between "mobile nodes" (the RFC 5944 term for the mobile stations) and their host routers. To accommodate these uses cases the Framework SIM and the Hard SIM create a stateful relationship we call the "Static NAT," which basically pairs two IP addresses for both use and management. The Framework SIM Scheduler then allows for control of which IP address is used in which situation, and since the Scheduler is permissively available to the user group and the carrier—services can be enabled appropriately. The result is that for previous "cellular" services that are needed by a particular device that is in range of an unlicensed network controlled by Scheduler, the unlicensed network can be scheduled to provide AND the service can be monitored for connection to the cellular network as a fallback. As discussed later, various techniques can be used to enhance call quality. Alternatively, devices can be given dynamic permission via the Scheduler to disable cellular, or operate in cellular only those entities that also create a "Static NAT" relationship.

First are the instances where the "Home Network" or "Home Networks" which are also MBNode(s) are involved in supporting the mobile station being used. In this instance the IP Address assigned to Mobile Station exists in parallel to any IP Address assigned by any router over the WiFi radio channel. As such the Framework SIM Scheduler acts to control the device through "Home Network." In this instance the Framework SIM Scheduler makes (1) the Home Network part of the Carrier Network including the programming and use of IP Addresses in a shared mode where the IP Addresses are coordinated for use via the Framework SIM Scheduler into and through all supported "Home Networks" or MBNodes. The specific IP address assigned to the Framework SIM is a "Carrier IP Address" and mirrors, for "Carrier" services, the use of IP Addresses as if the Carrier is operating the RAN. If operated in a WiFi only mode, it is necessary that Framework SIM Scheduler also control the MBNode for the communication to be distinguished from RFC 5944.

The second set of instanced is when there is a traditional SIM in addition to the Framework SIM and where there is not a MBNode in which to operate with. Here the traditional or Hard SIM allows for updating the Framework SIM via a Hard SIM data connection. Thus the "tunnel" set-up for communication including all encryption, port assignments, and dynamic NAT capabilities are created and managed "out of band" from the public Internet and the "Foreign Network" or "Foreign Agent." As a result the Framework SIM communications link to the Framework SIM Scheduler can dictate when and if conditions are appropriate to allow for a "Foreign Network" tunnel for communication, or to, in the alternative, Schedule the use of carrier network which is known as Roaming and which does not use and does not expose packets to the public Internet. For example, if the communication or communications group desires communication to be secure, it may enable the data channel to choose an available Licensed LTE network over a "Foreign Agent" WiFi network.

In a LTE-PW/WiFi-First device:

- The device should use the MBNode WiFi network as its primary network for all of its operations.
- The device should be able to fall back onto a cellular network when a MBNode WiFi network is not available.
- The transition between the WiFi and the Cellular network should be a seamless event.
- Voice, Messaging and Internet should all operate and function at a high level over MBNode WiFi when the MBNode WiFi network is activated as the primary network.
- All messaging and voice applications should be able to operate as an "Managed" IP based solution, no longer dependent upon a cellular network as its underlying mode of operation.
- When MBNode WiFi is the active network, calls should be placed over the managed network using the SIP protocol.
- The codec on the device should be optimized to support variations in network latency and bandwidth.
- The user experience should be the same as if it was a non WiFi-First device meaning that the native Android apps need to function normally under the WiFi-First approach.

A number of key changes are implemented on the device in order to provide a satisfactory WiFi-First user experience. The following list calls out the different areas of Android that we have improved to help support this new model:

Management of the Active Radio via the Framework SIM based upon WiFi being the primary network.

Voice/SMS/MMS support via IP with Carrier Permissions being activated via the Framework.

Supporting multiple phone numbers on the device if needed.

Call Routing through the IMS core for correct Caller ID.

Default creation of IMS account for access to servers for voice/SMS/MMS that are permissively controlled by the Sub-Group via a SIP Peer.

UI and API changes that hide the cellular phone number from the user.

Communications mechanism between the Framework SIM Scheduler and the device.

Account Management—Preference/Configuration settings that control communication and services on the device.

When using Android, Carrier Permissions Control of Android to support the access control of these services (Cell calling, SMS/MMS via the designed framework of Android enabling coexisting VoLTE/VoWiFi).

Some UI changes to help support the Wi-Fi-First experience. Dialer, Settings, etc.

Call handoff (Voice continuity) from MBNode Wi-Fi to cell, and when using similar technology from a "Foreign WiFi Network" to cell or MBNode.

Improved Voice technologies to improve call quality and network access.

Additional support for monitoring call and device QOS when on MBNode similar to standard PCRF functions in a Carrier Core.

It is noted that a hybrid schema may also be implemented, in cases where using cellular or another communication paradigm is preferred. For example, MBNode WiFi First or Foreign Network WiFi First may be implemented in preference to roaming on a $3^{rd}$ party carrier's network. Likewise, in cases of high mobility, WiFi access point handoff may be inefficient, and therefore a preference for cellular or other technology imposed. Further, other technologies, such as LoFi (long range WiFi), LiFi (local area networks implemented through ambient lighting devices), ad hoc networks or mobile ad hoc networks may be implemented and controlled as an MBNode as use cases may warrant, this is especially the case for M2M and IoT use cases.

Further, in some cases, WiFi may be economically inefficient. For example, some WiFi access point may have a cellular data backhaul. In that case, the use of WiFi may incur higher cellular data rate charges, instead of lower cellular voice charges. Alternatively, if the retail cellular backhaul is less expensive than a mandated "Roaming" fee, it may be more cost effective. In general, the Framework SIM Scheduler may determine user preferences and/or system preferences, and implement those, rather than a static preference for WiFi in every case. The stated goal of using this technology is to minimize the effect of "created" network scarcity by existing mobile operators.

Further Description of Framework SIM and MBNode

All telecommunications provides operate a number of service delivery systems. Key pieces include the Business Support Systems and Operational Support Systems (BSS/OSS). These combinations of hardware and software enable the delivery of voice, Internet, media, or other services to customers. Typically, BSS and OSS includes the following services:

Business Support Systems: Product Management; Customer Management; Revenue Management; and Order Management.

Operations Support Systems: Network Management; Service Delivery; Service Assurance; Customer Care Rather than modifying or replacing typical service delivery systems, a preferred embodiment according to the present technology adds the essential ingredients of Wi-Fi First to existing service delivery assets.

The Mobile Bonded Node (MBNode) provides those services that are required to for enhancing a service delivery system into a LTE-PW/Wi-Fi First service delivery engine that can be driven both by the carrier and by a Sub-group. The service delivery systems can be changed, enhanced, or completely replaced without damaging service delivery. Furthermore, the MBNode can be interconnected to other service delivery systems or operated separately.

The MBNode is a combination of technologies necessary to enhance a service delivery system sufficient to provide LTE-PW/Wi-Fi First Mobile telephone service and or data connectivity to a Wi-Fi First mobile device.

The MBNode, controlled by the Framework SIM Scheduler may include the following components with a shared control based upon a user/system preference:

Connection Manager (to verify status—active, idle, disconnected)

Device Manager (to update software and permissions)

Intelligent Voice Routing (to allow origination and termination to be controlled by customer's "softswitch" also known as an IP PBX)

Voice Call Continuity (VCC—so calls are not dropped upon handoff between different RAN)

Intelligent Message Routing

Call Detail Record Homologation

Data Analytics

System Management and Reporting

Inventory Management and Logistics

Operator Integration

The Framework SIM is used to maintain a connection between the server infrastructure (Controlled by the Framework SIM Scheduler) and a mobile device regardless of network (WiFi, 3G, LTE, 5G). Its goal is to ensure the device is reachable at all times and provide presence information to the servers about which devices can be reached at any given time.

The Framework SIM may provide the ability to dynamically change the heartbeat interval to optimize for performance and battery life; the ability to create a SIP connection in real time to answer an incoming call without relying on a persistence SIP connection; and/or the ability to intelligently manage the Wi-Fi and cellular radios to optimize for performance and battery life.

Working with the Framework SIM Scheduler, the Framework SIM controls the permissions a device on the network via the Sub-Group manager and including activation, deactivation, calling, texting, WiFi, cellular and roaming privileges. The privileges are maintained over connection to the device and either the Hard SIM, the Framework SIM or both and can be dynamically updated based on the user's account from through the Scheduling Server by the Sub-Group at any time. All interactions are achieved using a REST API between the client and server including: Activation; Deactivation; Phone number updates; Parameter and configuration updates; and Privilege updates including cellular network usage and international calling and texting, and allowed data use.

Intelligent call routing is managed between the client device and the server to direct both inbound and outbound calls over the appropriate networks (Wi-Fi, 3G, 4G/LTE, 5G or any other data network) depending on the current status of the network and the user's account status and while displaying a single phone number for all inbound and outbound calls over Wi-Fi and cellular networks. Real-time decisions are made about how to route inbound calls over SIP on Wi-Fi, SIP on 4G/LTE or traditional cellular channels. Outbound calls can be placed by initiating a VOIP or VoLTE call but. If there is no data connection available, the call can be routed using roaming rights on 2G or 3G or other cellular networks.

The decision on which network to use for the call can be made in real time based on a score that includes information on latency, packet loss, jitter, network speed, signal strength, and desired user profiles relying on echo servers in the network to measure the current conditions. The SIP connection can be tested in real time before connecting an inbound call.

Voice Call Continuity includes the seamless handoff of a call from Wi-Fi to a cellular connection using an attended transfer from the server which is seamless to the user. VCC may include "silent answer" so the user doesn't know a handoff has been made. It may also provide the ability for a user to manually hand off the call to a different type of network if the call quality isn't sufficient. It may further include the ability to automatically hand off a call if the call quality or network conditions deteriorate during the call or are predicted to deteriorate. A manual handoff mechanism may be provided such that a user can force a handoff to cellular assuming they have those privileges.

All SMS and MMS messages are delivered over IP using SMSC and MMSC with an interconnect for interoperation with other mobile operators. The MSG routing engine works by intercepting inbound and outbound SMS and MMS messages from the operating system queue to route the messages over IP connections rather than using SS7.

CDR Homologation describes the process to unify and clean up all device and server call logs to show a consistent call log to the user or sub-group and to report to the network on all call activity. A call that is handed off between Wi-Fi and cellular connections actually includes multiple phone calls being bridged, transferred and disconnected at the appropriate times but to the user it is a single phone call.

Operator/Customer integration is provided by activating and de-activating a device on the carrier network and/or by assigning additional phone number(s). Data feeds on cellular usage (minutes and MBs). Access may be enabled and disabled. IP addresses may be white listed to keep certain services lit up even when cellular service has not been purchased.

Call and network data may be obtained to accomplish a variety of tasks. The types of data collected may include: Voice Network Quality; Data usage; Location based activity; Device Statistics; Network Statistics; Call Quality Survey.

The WiFi-First architecture can be broken down into the following three sections:

Framework SIM—Also Known as a "Virtual IMSI"

The Framework SIM is a user identity which, when on an Android Phone is an application that runs, according to one embodiment, as a user level Android operating system "apk" with maximum device permissions and serves the following functions:

Responsible for device activation and provisioning on the various supported—networks including a "Hard SIM" if available.

Manages the main connection point between the device and the network. This provides support for all SMS/MMS messaging, device notifications, etc.

Account status with up to date usage metrics.

Real time cellular connectivity management (both as Roaming and/or in use of resold services).

Data Analytics, customer experience surveys and access to online customer service help system.

Manages access to voice and data services based upon a user's current account standing and or Sub-group management practices.

Network Status Indication

In a preferred implementation, the Framework SIM is added to the Android build image and requires system level permissions, but it may be downloaded in Lollypop (Android version 5) or more recent and be given "Permissions" upon download. It functions as the gateway between the Android framework level WiFi-First functionality. This Framework SIM serves two main functions. In order to control certain aspects of the Android framework, the controlling module needs to obtain system level permissions. This allows updating of the majority of the functionality which lives in the user level Account Management APK without having to provide a complete OTA system update. Since the platform works with multiple devices, any specific device management requirements in this module may be abstracted while maintaining one version of the Account Management APK. This also provides flexibility with how the solution is derived and delivered for each Sub-group customer or network.

At the core of the Wi-Fi first experience is the selection of the primary radio for data communications and management by the Sub-group. Normal devices today generally default to using the cellular radio and only fall back to the Wi-Fi when instructed by the user. In the Wi-Fi First approach, the device defaults to using the Wi-Fi radio as its primary source, is co-managed by the sub-group and falls back to the cellular radio when a sufficient Wi-Fi network is not available. However, the device also exists as a full cellular device via the Framework SIM Scheduler provisioning a full CMRS/GSM identity for each installed Framework SIM.

Each device is assigned a unique telephone numbers (TNs) and a unique IMSI. The IMSI is assigned by the Mobile Network Operator. The TN is assigned by the WiFi-First proprietor and can be an MNO TN or may also be a self-provided TN by the Sub-group. The Framework SIM Scheduler will disassociate upon request the TN from the Device allowing it to live as a full application in the cloud so that the voice/SMS and MMS capabilities can be directly controlled by the sub-group. For example the Framework SIM can be reallocated by the MBNode or any other permissive Application Server controlled by the Sub-Group.

A normal telephone number is also assigned to the device as a WiFi-First telephone number is routed abstractly from the device. Settings include dual ring, silent ring and forward and are controlled via an API by the user over the Framework SIM Scheduler. The WiFi-First telephone number is generally used for all SMS, MMS and SIP communications. The underlying carriers route all data associated with the WiFi-First telephone numbers to the appropriate WiFi-First server which is then controlled by the sub-group and may be forwarded to the device.

Access to device resources such as voice, data, SMS, MMS, etc. are controlled via the designated WiFi-First defined preference settings. These settings are managed via the Framework SIM Scheduler and are set in the defined preference settings location on the device via the Framework SIM. Mobile originating SMS are allowed/disallowed based on the current data network type and the associated preference setting. Mobile originating SIP calls are allowed/ disallowed based on the current data network type and the associated preference setting. Mobile originating cell calls are allowed/disallowed based on the associated preference setting. Internet access is allowed/disallowed based on the current data network type and the associated preference setting. Scripts that configure the device IP tables are used to filter Internet access. MMS features are enabled/disabled based on the associated preference setting.

When calls are received via the device, they arrive with an appended IP address in the caller ID. All incoming calls from the WiFi-First telephone servers appear in the caller ID as standard E.164 formatted numbers. To do this, all of the active IP addresses of the media servers are set in a device preference titled, e.g., "Call Log Filtering". If any call has one of the WiFi-First telephone server IP addresses in the caller ID, the IP address is stripped off for proper display on the device and in the call log.

On standard Android devices, the cell radio is always used to transmit/receive SMS over the cell radio. If operated with a corresponding Hard SIM, the carrier preferences are changed to prefer VoLTE and VoWiFi. If operating without a Hard Sim, before a WiFi-First device has been activated, the normal Android SMS processing path is changed to prefer going through the Framework SIM. Once the phone has been activated, the SMS is then transmitted/received as IP data.

MMS is managed in a similar process as SMS messaging. MMS messages are delivered to the device via the Framework SIM application and passed down to the framework so that it can be injected into the main Android messaging flow with in the Android framework. This allows any messaging app that the user chooses as their primary app to continue to work as desired.

MMS messages are directed to the WiFi-First MMSC by updating the appropriate Access Point on the device.

Cell calls are enabled only either by integrating a self-purchased access to a cellular network or by acquiring and using a "Hard SIM" and having the appropriate carrier preference set by the "Hard SIM." Carrier Permission unique to SIM are then loaded into the Framework SIM Scheduler so that the Cell calls are routed as desired by the sub-group.

SIP calls over a WIFI network do not require a cellular network. The Framework SIM always enables the appropriate preference for this feature. SIP calls over a Cellular data network are only allowed when a Hard SIM pass has been purchased and the appropriate preference has been set by the WiFi-First telephone server. This is known as VoLTE.

A WiFi-First SIP profile is automatically generated and maintained on the device. This profile is also locked down so that the user cannot access its contents and deem the phone unusable on the network.

One of the important elements to a fully functional WiFi first device is the ability keep a call connected if a user transitions from a WiFi network to a cellular network, or between WiFi access points. This can occur for a couple of different reasons, e.g.: The User initiates a call from a WiFi location and relocates to a location in which the original WiFi signal is no longer present; or the User initiates a call in a WiFi hotspot in which its signal degrades over time to a level that is determined insufficient to continue the call.

In order to provide this level of functionality, a number of things should to occur: The device monitors the current network status in real time to determine whether or not it should request that a call hand occur. A request is issued from the device to the WiFi-First telephone Gateway which is part of the IMS behind the Framework SIM Scheduler that will initiate and manage the entire hand off process. The Android SIP stack is modified to provide the ability to deliver this request. Functional changes are implemented within Android in order to manage the transition between multiple call lines in a way that is seamless and non-detectable to the user.

It is noted that the rules may be modified to meet different paradigms. For example, in a "locked down" facility, the WiFi-First device may be used to control and/or monitor all external communications within the facility, but permit use of the same device external to the facility. By providing a mandated use of WiFi where available, and ensuring that within the facility that WiFi is available, the rules are self-enforcing. Thus, within the facility, the WiFi usage may be authenticated, monitored, filtered, logged, and secured, all without intentional user involvement.

One of the interesting challenges that occur with any device that relies on network access via WiFi hotspots is the ability to maintain constant communication between that device and the home network. This is often complicated when dealing with different WiFi network environments, security policies, etc. In order to accomplish this, a mechanism is created between the device and the mobile gateway that is responsible for learning the characteristics of a WiFi network as well as provide an efficient means for delivering continuous device reachability independent of the different network conditions and without placing a heavy burden on the device resources. One example is to define a method that will discover a network access points ARP (Address Resolution Protocol) timeout value thus allowing for a networked mobile device to most efficiently maintain an open connection with the mobile gateway.

The Framework SIM typically needs to efficiently maintain a connection with the Framework SIM Scheduler. The real time nature of mobile communication requires that a request can be delivered to a mobile device at the time the request is issued. Since a mobile device does not contain a static IP address, it is the responsibility of the mobile device to notify the data center each time it's registered IP address changes. Due to constraints imposed by network design for security reasons, a networked client is responsible for establishing the initial networked connection. Once the initial connection has been established, both parties will be able to communicate for an indeterminate amount of time. The amount of time varies based upon network activity, the transmission protocol used and the ARP timeout rules imposed by various network devices found in the path. If the path is closed by the network, it is the responsibility of the client to re-open the connection.

Since the mobile device is ultimately responsible for maintaining an open network connection, there has to be a balance between the frequency of generated network activity used to keep the network connection open and the amount of battery consumption that can occur on the mobile device. The mobile device needs to determine what the maximum amount time an inactive network connection will stay open for. Doing so will instruct the mobile device on how frequently it will need to issue a heartbeat in order to maintain an open network connection. The device typically supports the "Connection Manager" component of the Framework SIM to manage optimal device reachability.

Environment of Operation

Aspects of the present technology other than the smartphone can be executed in an arbitrary program execution environment, or on customized processors or integrated circuits. The data processing may be local to the camera, in a remote appliance, or in the "cloud".

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented within a wireless network, which may include cellular networks (e.g., CDMA, FDMA, TDMA, OFDM, LTE, 3GPP, 3G, 4G, 5G), local area networks (e.g., WiFi IEEE-802.11 family of protocols, Zigbee, ZWave, Bluetooth, 802.15 family of protocols, LiFi, etc.), mesh, or other networks types.

The methods, programs codes, and instructions described herein and elsewhere may be implemented on or through mobile devices. The mobile devices may include navigation devices, cell phones, smart phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The technology may also be implemented using security cameras, and as such may provide premises security and/or homeland security, and may further be implemented as part of a stress analyzer or "lie detector". The technology may be implemented as part of a videophone or personal feedback, or athletic training device. The technology may be employed within an interview context to determine interviewee heart rate. The technology may further be used in medical facilities to monitor patients' heart rates. Likewise, the technology may be used in retail and media environments to assess customer excitement.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

According to software or hardware engineering practices, the functions may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions. The technology may be implemented on single core, multiple core, RISC, CISC, SIMD, SISD, DSP, GPGPU, ASIC, CPLD, or other computational environments.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby expressly incorporated by reference in their entirety.

What is claimed is:

1. A method of communication, comprising:
providing user equipment having an equipment identifier, and a secure execution module;
verifying the secure execution module with a cellular network controller;
establishing a first connection to a scheduling server through a cellular network signaling channel of a cellular network, comprising at least periodically transmitting signaling information, and identifying a public switched telephone network address of the user equipment, a non-public packet switched network address of a first non-public packet switched network of the user equipment, and the equipment identifier of the user equipment, to the scheduling server, the cellular network and the first non-public packet switched network being distinct;
verifying the secure execution module with the scheduling server;
establishing a second connection between the user equipment and the first non-public packet switched network which assigns the first non-public packet switched network address to the user equipment, and communicating from the first non-public packet switched network to the scheduling server;
associating the public switched telephone network address of the user equipment with the assigned first non-public packet switched network address of the user equipment by the scheduling server; and
initiating a bidirectional real-time voice communication over the second connection.

2. The method according to claim 1, further comprising:
establishing a third connection between the user equipment and a second switched network;
re-associating the public switched telephone network address of the user equipment with the second switched network by the scheduling server;
communicating between the scheduling server and the user equipment through the first non-public packet switched network and the second switched network; and
continuing the bidirectional real-time voice communication over the third connection.

3. The method according to claim 2, wherein the signaling information is communicated over the second switched network.

4. The method according to claim 2, wherein the second switched network communicates according to a Long Term Evolution (LTE) protocol.

5. The method according to claim 1, wherein the signaling information comprises an International Mobile Equipment Identity (IMEI).

6. The method according to claim 1, wherein the identified public switched telephone network address of the user equipment is an E-164 address.

7. The method according to claim 1, wherein the user equipment is a smartphone.

8. The method according to claim 1, wherein the first non-public packet switched network communicates according to an IEEE-802.11 protocol and the second switched network communicates according to an IEEE-802.11 protocol.

9. The method according to claim 1, wherein the user equipment and the scheduling server communicate with each other according to the Session Initiation Protocol.

10. The method according to claim 1, wherein the scheduling server implements a Policy and Charging Rules Function.

11. A method of communication, comprising:
establishing a first connection between user equipment having a secure execution module and a first non-public packet switched network which assigns a first non-public packet switched network address to the user equipment;
establishing communications to a remote server, comprising verifying the secure execution module with the remote server, transmitting signaling information, identifying a public switched telephone network address of the user equipment and identifying the first non-public packet switched network address of user equipment to the remote server;
associating, by the remote server, the public switched telephone network address of the user equipment with the first non-public packet switched network address of the user equipment;
commencing a bidirectional real-time voice communication over the first connection using the public switched telephone network address of the user equipment;
establishing a second connection between the user equipment and a second switched network, the first connection and the second connection being physically distinct;
reassociating, by the remote server, the public switched telephone network address of the user equipment with an assigned second network address of the user equipment by the second switched network; and
continuing the bidirectional real-time voice communication over the second connection after discontinuing the bidirectional real-time voice communication over the first connection, wherein the reassociating occurs during a telephone conversation without interruption of the telephone conversation.

12. The method according to claim 11, wherein the reassociation is managed by the user equipment.

13. The method according to claim 11, wherein the reassociation is managed by the remote server comprising a scheduling server.

14. The method according to claim 13, wherein network access information for the second switched network is stored in a hardware Subscriber Identity Module (SIM) and network access information for the first non-public packet switched network is stored in a rewritable memory location inaccessible to the user and accessible to the at least one type of privileged execution inaccessible to the user.

15. The method according to claim 11, wherein the user equipment has an operating system which defines a plurality of privileged execution types, at least one type of privileged execution being inaccessible to a user, and wherein the reassociation function is executed in the at least one type of privileged execution inaccessible to the user.

16. The method according to claim 15, wherein the first non-public packet switched network requires login authentication information, and the login authentication information is communicated under control of the at least one type of privileged execution inaccessible to the user.

17. A method of communication, comprising:
establishing a first connection between user equipment having a secure execution module and a first non-public packet switched network which assigns a first non-public packet switched network address to the user equipment;
establishing a second connection between the user equipment and a second packet switched telephone network which communicates with the user equipment according to a public switched telephone network (PSTN) address and International Mobile Subscriber Identity (IMSI), the first connection and the second connection not sharing a common communication pathway;
establishing an open signaling channel between the user equipment and a remote server through the second packet switched telephone network;
verifying the secure execution module with the remote server
receiving a request to establish a bidirectional real time voice communication with the user equipment through the signaling channel;
establishing the bidirectional real time voice communication with the user equipment over the first non-public packet switched network based on the public switched telephone network (PSTN) address;
establishing a third connection between the user equipment and a third non-public packet switched network which assigns a third non-public packet switched network address to the user equipment; and
transitioning the bidirectional real time voice communication with the user equipment from the first non-public packet switched network to the third non-public packet switched network while the bidirectional real time voice communication is in progress without interruption of the bidirectional real time voice communication, wherein the bidirectional real time voice communication comprises a telephone conversation.

18. A method of communication, comprising:
establishing a first connection between user equipment having a secure execution module and a first non-public packet switched network which assigns a first non-public packet switched network address to the user equipment;
establishing a second connection between the user equipment and a second non-public packet switched network which assigns a second non-public packet switched network address to the user equipment;
establishing a third connection between user equipment and a cellular telephone network;
verifying the secure execution module with a cellular network controller of the cellular telephone network;
establishing an open signaling channel which communicates between the user equipment and a remote server which implements a Policy and Charging Rules Function, through the cellular telephone network, according to a public switched telephone network address associated with an international mobile subscriber identity;
verifying the secure execution module with the remote server;
wherein the first connection and the third connection are established independent of each other;
communicating an identification of the first non-public packet switched network and the assigned first non-public packet switched network address over the open signaling channel to the remote server;
establishing a real time voice communication from the remote server to the user equipment through the first connection based on a call routed to the remote server based on the public switched telephone network address;
communicating an identification of the second non-public packet switched network and the assigned second non-public packet switched network address over the open signaling channel to the remote server; and
transitioning the real time voice communication from the remote server to the user equipment through the second connection, without interruption of the real time voice communication, wherein the real time voice communication comprises a telephone conversation.

19. The method according to claim 18, further comprising transitioning the real time voice communication with the user equipment to a second connection provided through a second packet switched network, which assigns a second packet switched network address to the user equipment, under control of the remote server.

* * * * *